United States Patent
Watanabe et al.

(10) Patent No.: US 9,894,392 B2
(45) Date of Patent: Feb. 13, 2018

(54) DISTRIBUTION DEVICE, REPRODUCTION DEVICE, DATA STRUCTURE, DISTRIBUTION METHOD, CONTROL PROGRAM, AND RECORDING MEDIUM

(71) Applicant: Sharp Kabushiki Kaisha, Osaka-shi, Osaka (JP)

(72) Inventors: Shuichi Watanabe, Osaka (JP); Maki Takahashi, Osaka (JP)

(73) Assignee: Sharp Kabushiki Kaisha, Sakai (JP)

( * ) Notice: Subject to any disclaimer, the term of this patent is extended or adjusted under 35 U.S.C. 154(b) by 0 days.

(21) Appl. No.: 14/396,106

(22) PCT Filed: Apr. 19, 2013

(86) PCT No.: PCT/JP2013/061587
§ 371 (c)(1),
(2) Date: Oct. 22, 2014

(87) PCT Pub. No.: WO2013/161688
PCT Pub. Date: Oct. 31, 2013

(65) Prior Publication Data
US 2015/0106862 A1  Apr. 16, 2015

(30) Foreign Application Priority Data

Apr. 24, 2012 (JP) ................. 2012-099294
Jul. 10, 2012 (JP) ................. 2012-155079

(51) Int. Cl.
*H04N 5/445* (2011.01)
*H04N 21/235* (2011.01)
(Continued)

(52) U.S. Cl.
CPC ... *H04N 21/2353* (2013.01); *H04N 21/23614* (2013.01); *H04N 21/26603* (2013.01);
(Continued)

(58) Field of Classification Search
CPC .................................................. H04N 7/17318
(Continued)

(56) References Cited

U.S. PATENT DOCUMENTS 6,487,543 B1 * 11/2002 Ozaki .................... H04H 20/93
348/E7.061
2008/0155626 A1 * 6/2008 Matsumoto .......... G11B 27/322
725/109
(Continued)

FOREIGN PATENT DOCUMENTS

JP  10-173612 A  6/1998
JP  2007-166365 A  6/2007

*Primary Examiner* — Michael Hong
(74) *Attorney, Agent, or Firm* — Keating & Bennett, LLP

(57) ABSTRACT

A distribution server (1) according to the present invention acquires composition information (17) including information specifying each of a plurality of components included in acquired content and information indicating a reproduction mode of the components, and includes a composition information generation unit (15) rewriting a part of the information included in the composition information (17) in a reference format to generate main composition information and to generate sub-composition information including the information referred to with the main composition information and a distribution control unit (16) distributing the main composition information and the sub-composition information generated by the composition information generation unit (15). Thus, the composition information can be distributed with high efficiency without using on-demand distribution.

5 Claims, 33 Drawing Sheets

(51) Int. Cl.
    *H04N 21/6332*    (2011.01)
    *H04N 21/236*     (2011.01)
    *H04N 21/266*     (2011.01)
    *H04N 21/854*     (2011.01)
    *H04N 7/173*      (2011.01)

(52) U.S. Cl.
    CPC ... *H04N 21/6332* (2013.01); *H04N 21/85403* (2013.01); *H04N 21/85406* (2013.01); *H04N 7/17318* (2013.01)

(58) Field of Classification Search
    USPC .......................................................... 725/50
    See application file for complete search history.

(56) References Cited

U.S. PATENT DOCUMENTS

| | | | | |
|---|---|---|---|---|
| 2010/0083336 A1* | 4/2010 | Hwang | ............ | H04N 21/23412 725/131 |
| 2010/0186058 A1* | 7/2010 | Suh | ...................... | H04N 21/235 725/110 |

* cited by examiner

FIG. 2

COMPOSITION
INFORMATION: CI <main>

```
<ci version="1">
<components>
...
<comp href="sub#s1"/>
</components>
<compositions>
...
<par href="sub#p1"/>
</compositions>
</ci>
```

COMPOSITION
INFORMATION: CI <sub>

```
<ci version="1">
<comp id="s1">
<comp id="c1">...</comp><comp id="c2">...</comp>
<comp id="c3">...</comp><comp id="c4">...</comp>
</comp>
<par id="p1">
<video comp="c1"/><audio comp="c2"/>
<excl optional="true">
<text comp="c3"/><text comp="c4"/>
</excl>
</par>
</ci>
```

COMPOSITION
INFORMATION: CI <sub>

```
<ci version="2">
<comp id="s1">
<comp id="c5">...</comp><comp id="c6">...</comp>
<comp id="c7">...</comp><comp id="c8">...</comp>
</comp>
<par id="p1">
<video comp="c5"/><audio comp="c6"/>
<excl optional="true">
<text comp="c7"/><text comp="c8"/>
</excl>
</par>
</ci>
```

FIG. 8

COMPOSITION
INFORMATION: CI <main>

```
<ci version="1">
<components>
....
<comp href="sub1#s1"/>
</components>
<layouts>
 <region id="reg_1" top="0px"
  left="0px" width="1920px"
  height="1080px"/>
 <region id="reg_2" top="1420px"
  left="790px" width="480px"
  height="270px"/>
</layouts>
<compositions>
<excl>
<par href="sub2#layout1">
 <video comp="v1" region="reg_1"/>
 <video comp="v2" region="reg_2"/>
 <audio comp="a1"/>
</par>
<par id="layout2">
 <video comp="v1" region="reg_1"/>
 <video comp="v2" region="reg_2"/>
 <audio comp="a1"/>
</par>
<par id="layout3">
 <video comp="v1" region="reg_1"/>
 <video comp="v2" region="reg_2"/>
 <audio comp="a1"/>
</par>
</excl>
</compositions>
</ci>
```

COMPOSITION
INFORMATION: CI <sub1>

```
<ci version="1">
<components>
<comp id="s1">
<comp id="v1">...</comp>
<comp id="v2">...</comp>
<comp id="a1">...</comp>
</comp>
</ci>
```

COMPOSITION
INFORMATION: CI <sub2>

```
<ci version="1">
<par id="layout1">
 <video comp="v1" region="reg_1"/>
 <video comp="v2" region="reg_2"/>
 <audio comp="a1"/>
</par>
</ci>
```

COMPOSITION
INFORMATION: CI <sub2>

```
<ci version="2">
<par id="layout1">
 <video comp="v1" region="reg_2"/>
 <video comp="v2" region="reg_1"/>
 <audio comp="a1"/>
</par>
</ci>
```

COMPOSITION
INFORMATION: CI <sub2>

```
<ci version="3">
<par id="layout1">
 <video comp="v1" region="reg_1"/>
 <video comp="v2" region="reg_2"/>
 <audio comp="a1"/>
</par>
</ci>
```

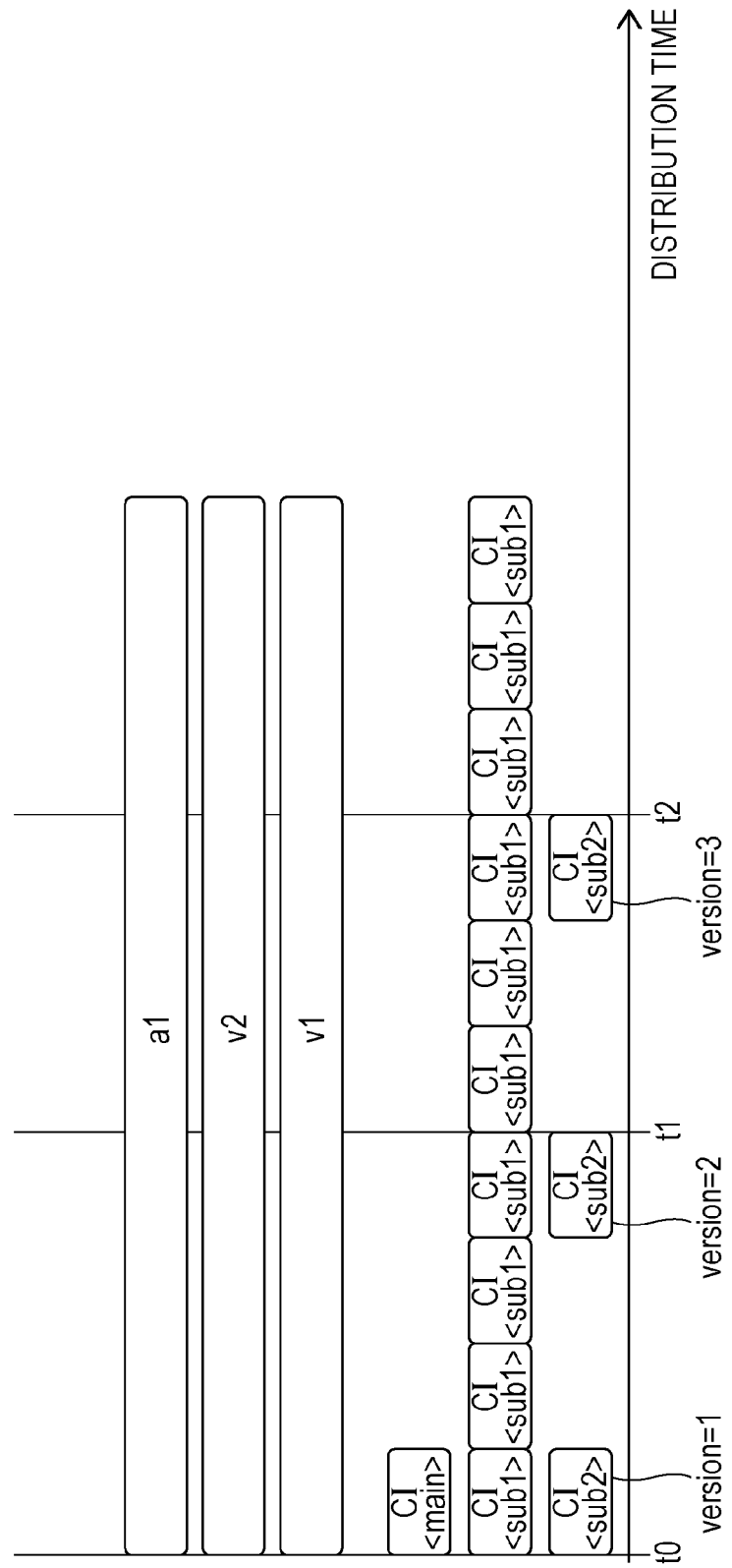

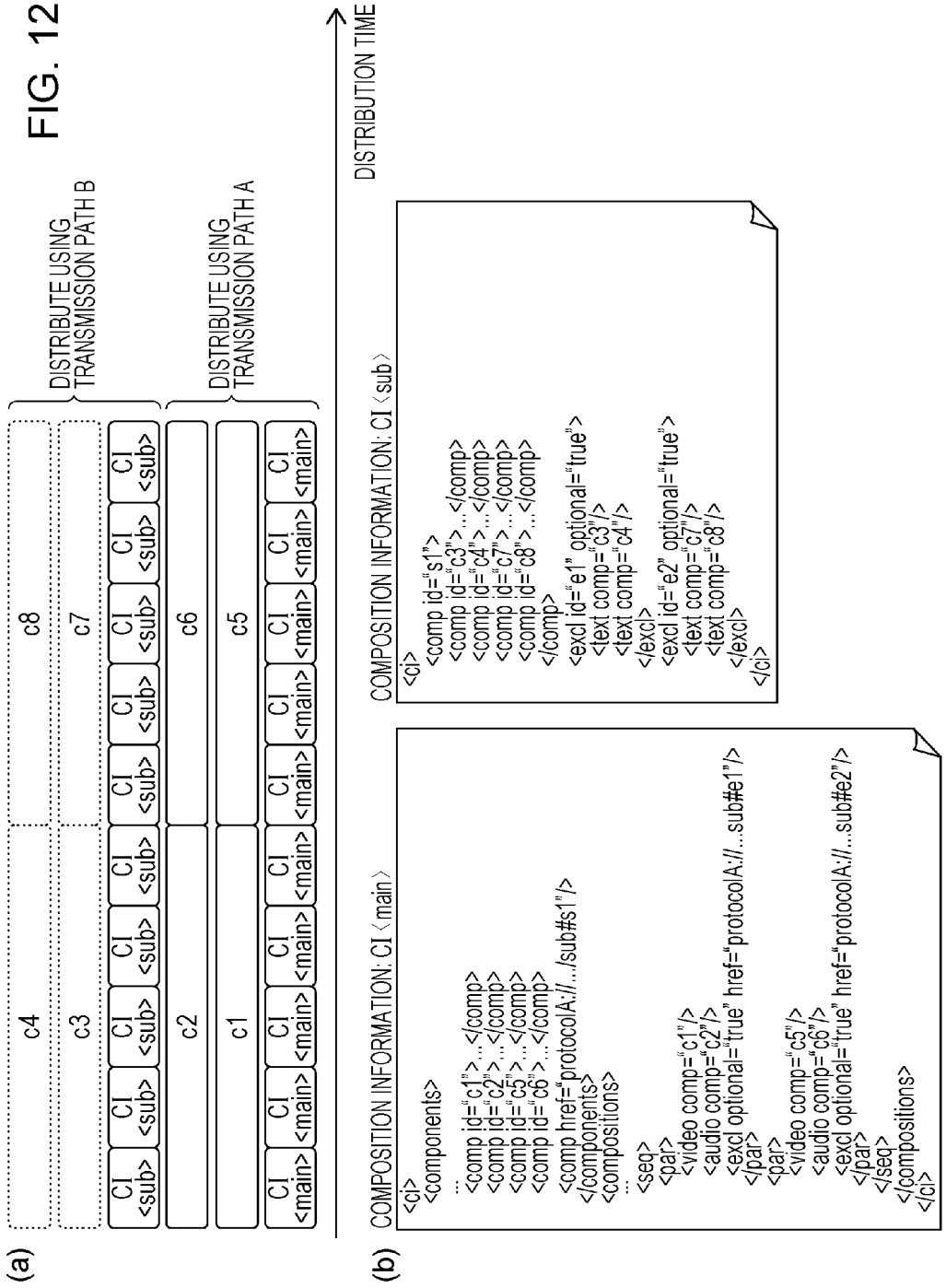

FIG. 13

(a) COMPOSITION INFORMATION: CI <main>

```
<ci>
 <components>
  ...
  <comp id="c1">...</comp>
  <comp id="c2">...</comp>
  <comp href="protocolA://.../sub#s1"/>
 </components>
 <compositions>
  ...
  <par>
   <video comp="c1"/>
   <audio comp="c2"/>
   <par optional="true" href="protocolA://.../sub#p1"/>
  </par>
 </compositions>
</ci>
```

(b) COMPOSITION INFORMATION: CI <sub>

```
<ci>
 <comp id="s1">
  <comp id="c5">...</comp>
  <comp id="c6">...</comp>
  <comp id="c7">...</comp>
 </comp>
 <par id="p1" optional="true">
  <text comp="c5"/>
  <image comp="c6"/>
 </par>
 <par id="p2" optional="true">
  <text comp="c5"/>
  <image comp="c7"/>
 </par>
</ci>
```

(c) COMPOSITION INFORMATION: CI <main2>

```
<ci>
 <components>
  ...
  <comp id="c3">...</comp>
  <comp id="c4">...</comp>
  <comp href="protocolA://.../sub#s1"/>
 </components>
 <compositions>
  ...
  <par>
   <video comp="c3"/>
   <audio comp="c4"/>
   <par optional="true" href="protocolA://.../sub#p2"/>
  </par>
 </compositions>
</ci>
```

FIG. 18

(a)
COMPOSITION
INFORMATION: CI <main>  17a(25)

```
<ci>
<components id="cpn1">
<comp id="c1"> ... </comp>
<comp id="c2"> ... </comp>
</components>
<compositions>
<seq>
<par id="par1">
<video comp="c1"/>
<audio comp="c2"/>
</par>
</seq>
</compositions>
</ci>
```

(b)
COMPOSITION
INFORMATION: CI <sub>  17b

```
<ci>
<insert ref_id="cpn1">
<comp id="c3"> ... </comp>
</insert>
<insert ref_id="par1">
<text comp="c3"/>
</insert>
</ci>
```

(c)  25

```
<ci>
<components id="cpn1">
<comp id="c1"> ... </comp>
<comp id="c2"> ... </comp>
<comp id="c3"> ... </comp>
</components>
<compositions>
<seq>
<par id="par1">
<video comp="c1"/>
<audio comp="c2"/>
<text comp="c3"/>
</par>
</seq>
</compositions>
</ci>
```

FIG. 19

(a)
COMPOSITION
INFORMATION: CI <main>  17a(25)

```
<ci>
<components id="cpn1">
<comp id="c1"> ... </comp>
<comp id="c2"> ... </comp>
</components>
<compositions>
<seq id="seq1">
<par>
<video comp="c1"/>
<audio comp="c2"/>
</par>
</seq>
</compositions>
</ci>
```

(b)
COMPOSITION
INFORMATION: CI <sub>  17b

```
<ci>
<insert ref_id="cpn1">
<comp id="c3"> ... </comp>
<comp id="c4"> ... </comp>
</insert>
<insert ref_id="seq1">
<par>
<video comp="c3"/>
<audio comp="c4"/>
</par>
</insert>
</ci>
```

(c)  25

```
<ci>
<components id="cpn1">
<comp id="c1"> ... </comp>
<comp id="c2"> ... </comp>
<comp id="c3"> ... </comp>
<comp id="c4"> ... </comp>
</components>
<compositions>
<seq id="seq1">
<par>
<video comp="c1"/>
<audio comp="c2"/>
</par>
<par>
<video comp="c3"/>
<audio comp="c4"/>
</par>
</seq>
</compositions>
</ci>
```

FIG. 20

(a) 17a(25)
```
<ci>
<seq id="seq1">
<video comp="c1"/>
<video comp="c2"/>
</seq>
</ci>
```

(b) 17b
```
<ci>
<insert ref_id="seq1">
<video comp="c3"/>
</insert>
</ci>
```

(c) 25
```
<ci>
<seq id="seq1">
<video comp="c1"/>
<video comp="c2"/>
<video comp="c3"/>
</seq>
</ci>
```

FIG. 21

(a) 17a(25)
```
<ci layer="0">
 <seq id="seq1">
  <video comp="c1"/>
 </seq>
</ci>
```

(b) 17b
```
<ci layer="1">
 <insert ref_id="seq1">
  <video comp="c2"/>
 </insert>
</ci>
```

(c) 25
```
<ci>
 <seq id="seq1">
  <video comp="c1"/>
  <video comp="c2"/>
 </seq>
</ci>
```

(d) 17b
```
<ci layer="2">
 <insert ref_id="seq1">
  <video comp="c3"/>
 </insert>
</ci>
```

(e) 25
```
<ci>
 <seq id="seq1">
  <video comp="c1"/>
  <video comp="c2"/>
  <video comp="c3"/>
 </seq>
</ci>
```

FIG. 22
(a)
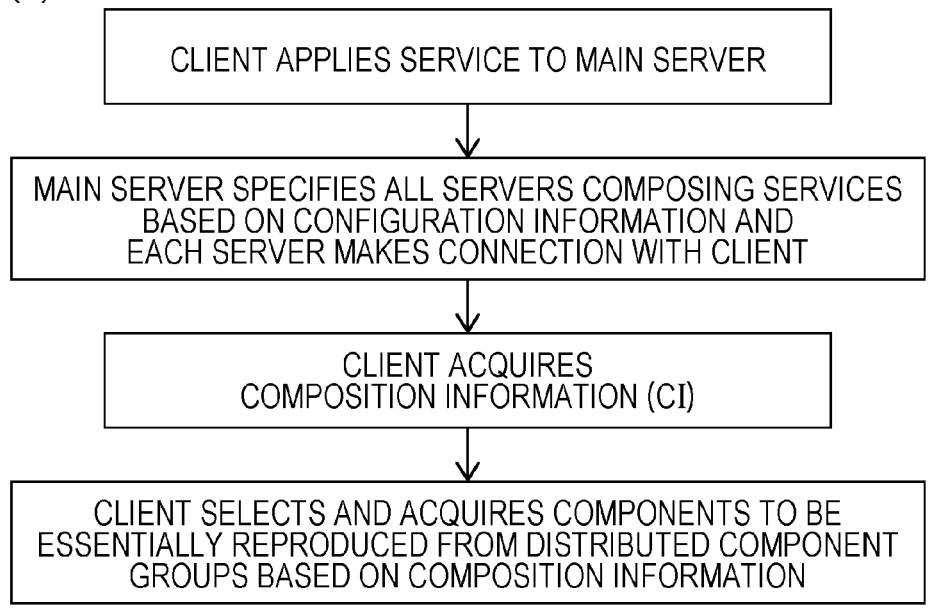
(b)
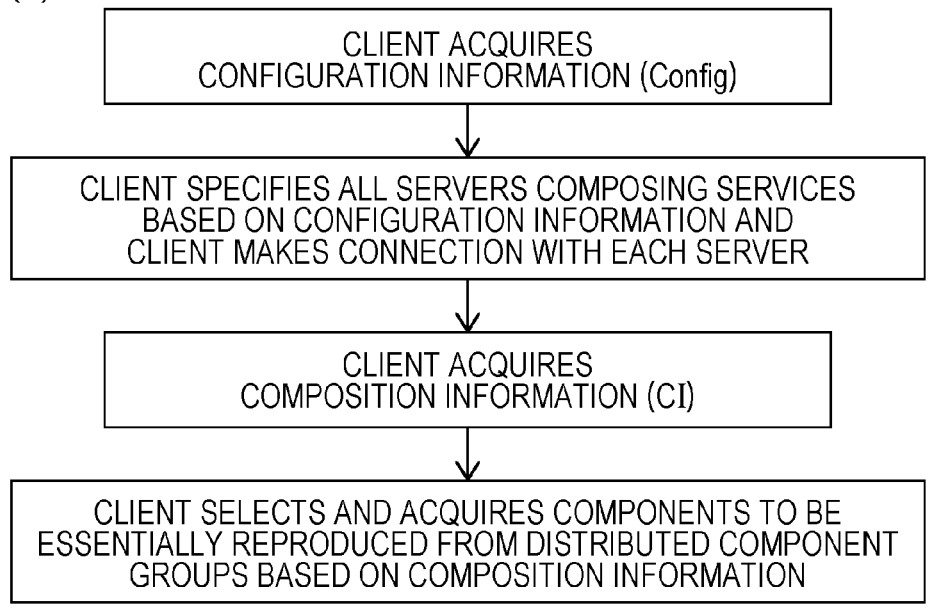

FIG. 25

(a)
COMPOSITION
INFORMATION: CI <main> 17a(25)

```
<ci>
<components id="cpn1">
<comp id="c1"> ... </comp>
<comp id="c2"> ... </comp>
</components>
<compositions>
<seq id="seq1">
<par>
<video comp="c1"/>
<audio comp="c2"/>
</par>
</seq>
</compositions>
</ci>
```

(b)
COMPOSITION
INFORMATION: CI <sub-1> 17b

```
<ci version="1">
<replace ref_id="cpn1">
<comp id="c3"> ... </comp>
<comp id="c4"> ... </comp>
</replace>
<replace ref_id="seq1">
<par>
<video comp="c3"/>
<audio comp="c4"/>
</par>
</replace>
</ci>
```

(c) 25

```
<ci>
<components id="cpn1">
<comp id="c3"> ... </comp>
<comp id="c4"> ... </comp>
</components>
<compositions>
<seq id="seq1">
<par>
<video comp="c3"/>
<audio comp="c4"/>
</par>
</seq>
</compositions>
</ci>
```

(d)
COMPOSITION
INFORMATION: CI <sub-2> 17b

```
<ci version="2">
<replace ref_id="cpn1">
<comp id="c5"> ... </comp>
<comp id="c6"> ... </comp>
</replace>
<replace ref_id="seq1">
<par>
<video comp="c5"/>
<audio comp="c6"/>
</par>
</replace>
</ci>
```

(e) 25

```
<ci>
<components id="cpn1">
<comp id="c5"> ... </comp>
<comp id="c6"> ... </comp>
</components>
<compositions>
<seq id="seq1">
<par>
<video comp="c5"/>
<audio comp="c6"/>
</par>
</seq>
</compositions>
</ci>
```

FIG. 27

(a) COMPOSITION INFORMATION: CI <main> ~17a(25)

```
<ci>
  <components id="cpn1">
  </components>
  <compositions>
    <seq id="seq1">
    <seq>
  </compositions>
</ci>
```

(b) COMPOSITION INFORMATION: CI <sub-1> ~17b

```
<ci layer="1" version="1">
  <insert ref_id="cpn1">
    <comp id="c3"> ... </comp>
    <comp id="c4"> ... </comp>
  </insert>
  <insert ref_id="seq1">
    <par>
      <video comp="c3"/>
      <audio comp="c4"/>
    </par>
  </insert>
</ci>
```

(c) ~25

```
<ci>
  <components id="cpn1">
    <comp id="c3"> ... </comp>
    <comp id="c4"> ... </comp>
  </components>
  <compositions>
    <seq id="seq1">
      <par>
        <video comp="c3"/>
        <audio comp="c4"/>
      </par>
    </seq>
  </compositions>
</ci>
```

(d) COMPOSITION INFORMATION: CI <sub-2> ~17b

```
<ci layer="1" version="2">
  <insert ref_id="cpn1">
    <comp id="c5"> ... </comp>
    <comp id="c6"> ... </comp>
  </insert>
  <insert ref_id="seq1">
    <par>
      <video comp="c5"/>
      <audio comp="c6"/>
    </par>
  </insert>
</ci>
```

(e) ~25

```
<ci>
  <components id="cpn1">
    <comp id="c5"> ... </comp>
    <comp id="c6"> ... </comp>
  </components>
  <compositions>
    <seq id="seq1">
      <par>
        <video comp="c5"/>
        <audio comp="c6"/>
      </par>
    </seq>
  </compositions>
</ci>
```

DISTRIBUTION DEVICE, REPRODUCTION DEVICE, DATA STRUCTURE, DISTRIBUTION METHOD, CONTROL PROGRAM, AND RECORDING MEDIUM

TECHNICAL FIELD

The present invention relates to distribution of composition information necessary to reproduce content including a plurality of components and the present invention relates to reproduction of such content.

BACKGROUND ART

As disclosed in PTL 1 below, in recent years, multi-component content including a plurality of components such as video, audio, and text has been distributed.

Here, in reception and reproduction of such a multi-component content, composition information indicating a usable component, its reproduction mode, and the like is required. Therefore, it is necessary for a reproduction device to acquire the composition information of content to be reproduced together with each component or independently from the component.

For example, in MPEG MMT (MPEG Media Transport), composition information (CI) is distributed together with a component and a reproduction device reproduces the component with reference to this composition information.

For example, in MPEG-2 systems (ISO/IEC 13818-1), information corresponding to composition information called PAT/PMT (Program Association Table/Program Map Table) is multiplexed with each component and is repeatedly distributed. Specifically, in terrestrial digital broadcasting, composition information is distributed normally at intervals of 100 msec in order to minimize reproduction start delay at the time of channel conversion.

For example, SDP (Session Description Table) of RFC 4566 or MPD (Media Presentation Description) of MPEG DASH (ISO/IEC 23009-1) also corresponds to the foregoing composition information. Such information is distributed on demand asynchronously with components through communication independent from the components.

Here, composition information and components included in content of MPEG MMT will be described with reference to FIG. 16. FIG. 16 is a diagram for describing the components and the composition information in MPEG MMT. FIG. 16(a) illustrates a distribution example of the components and the composition information and FIG. 16(b) illustrates an example of the composition information.

In FIG. 16(a), each component and each piece of composition information are indicated as one block. In FIG. 16(a), a distribution time of the components and the composition information are shown in chronological order. The components indicated by dashed lines are components to be optionally reproduced.

That is, in FIG. 16(a), eight kinds of components c1 to c8 are transmitted. Of the components, the components c1 to c4 are distributed during the same period and the components c5 to c8 are distributed during a later period than the period.

As a specific example, the component c1 may be a component of a moving image and the component c2 may be a component of audio corresponding to the moving image. Further, the component c3 may be a component of English subtitles corresponding to c1 and c2 and the component c4 may be a component of French subtitles.

Likewise, the component c5 may be a component of a moving image and the component c6 may be a component of audio corresponding to the moving image. Further, the component c7 may be a component of English subtitles corresponding to c5 and c6 and the component c8 may be a component of French subtitles.

In this case, a scene including the components c1 and c2 is reproduced, and then a scene including the components c5 and c6 is reproduced. In the scene including the components c1 and c2, English or French subtitles can be displayed by using the component c3 or c4. The same applies to the scene including the components c5 and c6.

As illustrated in FIG. 16(a), composition information (CI) is repeatedly distributed at regular intervals. The details of all pieces of composition information are the same and have, for example, details illustrated in FIG. 16(b).

The composition information in FIG. 16(b) includes information regarding an attribute of a component described by a <components> tag (information indicating a component included in content) and information regarding a reproduction method (reproduction mode) described by a <compositions> tag.

Specifically, in the <components> tag, eight components from a component with an id of "c1" to a component with an id of "c8" are described.

In the <compositions> tag, it is described that c1 which is a video component and c2 which is audio component are simultaneously reproduced. Further, it is described that any one of c3 and c4 which are text components can be selected and used. The same description is made for the components c5 to c8.

Accordingly, a reproduction device reproducing these components first acquires the distributed components c1 and c2 and acquires the repeatedly distributed composition information. The components c3 and c4 are also acquired, as necessary.

Thus, the reproduction device simultaneously reproduces the components c1 and c2 according to the composition information and uses the component c3 or c4 during the reproduction, as necessary.

Thereafter, the reproduction device acquires the components c5 and c6 distributed after the components c1 and c2 and also acquires the component c7 or c8, as necessary. Thus, the components c5 and c6 are simultaneously reproduced according to the composition information and the component c7 or c8 is used during the reproduction, as necessary.

In this way, by transmitting the composition information, a plurality of components can be reproduced in an appropriate combination. By describing a display layout or the like representing a component reproduction mode in the composition information, for example, the component can also be reproduced in a certain layout.

CITATION LIST

Patent Literature

PTL 1: Japanese Unexamined Patent Application Publication No. 10-173612 (published on Jun. 26, 1998)

SUMMARY OF INVENTION

Technical Problem

Here, in hybrid transmission using a plurality of networks (transmission paths), the number of components included in one piece of content is assumed to increase from now. Further, the description of the composition information is assumed to be complicated with multi-components and the amount of data of the composition information is assumed to increase.

When the amount of data of the composition information increases in this way, there is a concern that transmission and reception of useless data may increase in a repeated transmission scheme such as PAT/PMT. This is because a reproduction device that receives one piece of composition information repeatedly transmitted can execute reproduction without referring to the subsequent composition information with the same details and discards the subsequent composition information.

On the other hand, in a method of acquiring the composition information on demand as in SDP or MDP, transmission efficiency is good, but applicable systems are limited. For example, it is difficult to apply the method to systems such as broadcasting having no communication means (back channel) from a reproduction client to a distribution server.

The present invention is devised in view of the foregoing problems and an object of the present invention is to provide a distribution device and the like capable of efficiently distributing composition information even without using on-demand distribution.

Solution to Problem

To solve the foregoing problems, the present invention provides a distribution device including: acquisition means for acquiring composition information including at least information specifying each of a plurality of components included in content and information indicating a reproduction mode of the components; composition information generation means for rewriting a part of the information included in the composition information acquired by the acquisition means in a reference format to generate reference format composition information and to generate reference destination composition information including the information rewritten in the reference format; and distribution control means for distributing the reference format composition information and the reference destination composition information generated by the composition information generation means.

To solve the foregoing problems, the present invention provides a distribution method by a distribution device acquiring composition information including at least information specifying each of a plurality of components included in content and information indicating a reproduction mode of the components. The distribution method includes: a composition information generation step of rewriting a part of the information included in the acquired composition information in a reference format to generate reference format composition information and to generate reference destination composition information including the information rewritten in the reference format; and a distribution control step of distributing the reference format composition information and the reference destination composition information generated in the composition information generation step.

According to the configuration described above, a part of the information included in the acquired composition information is rewritten in the reference format to generate the reference format composition information and generate reference destination composition information including the information rewritten in the reference format. Then, the generated reference format composition information and reference destination composition information are distributed.

Thus, by distributing the reference format composition information and the reference destination composition information generated from the acquisition composition information, efficient distribution as a whole can be realized as compared to when the acquired composition information is directly distributed. This is because the reference format composition information and the reference destination composition information can be distributed at different times, distribution frequencies thereof can be changed, or transmission paths thereof can be changed.

To solve the foregoing problems, the present invention provides a data structure of composition information which includes at least information specifying each of a plurality of components included in content and information indicating a reproduction mode of the components and is used to reproduce the content. The data structure includes: reference format composition information in which a part of the information specifying each of the plurality of components included in the content and the information indicating the reproduction mode of the components is described in a reference format; and reference destination composition information which includes information referred to with the reference format composition information.

The foregoing data structure includes the reference format composition information in which a part of the information specifying each of the plurality of components included in the content and the information indicating the reproduction mode of the components is described in a reference format; and the reference destination composition information which includes the information referred to with the reference format composition information.

Accordingly, efficient distribution as a whole can be realized as compared to when the composition information including the information specifying each of the plurality of components included in the content and the information indicating the reproduction mode of the components is directly distributed.

The distribution device may be realized by a computer. In this case, a control program causing a computer to realize the distribution device by causing the computer to operate as the composition information generation means and the distribution control means of the distribution device and a computer-readable recording medium in which the control program is recorded are also included in the scope of the present invention.

Advantageous Effects of Invention

As described above, the distribution device according to the present invention is configured to include the composition information generation means for rewriting a part of the information included in the composition information acquired by the acquisition means in the reference format to generate the reference format composition information and to generate the reference destination composition information including the information rewritten in the reference format; and the distribution control means for distributing the reference format composition information and the reference destination composition information generated by the composition information generation means.

As described above, the distribution method according to the present invention is configured to include the composition information generation step of rewriting a part of the information included in the acquired composition information in the reference format to generate the reference format composition information and to generate the reference destination composition information including the information rewritten in the reference format; and the distribution control step of distributing the reference format composition information and the reference destination composition information generated in the composition information generation step.

As described above, the data structure according to the present invention is configured to include the reference format composition information in which a part of the information specifying each of the plurality of components included in the content and the information indicating the reproduction mode of the components is described in the reference format; and the reference destination composition information which includes the information referred to with the reference format composition information.

Accordingly, it is possible to obtain an advantage of realizing efficient distribution as a whole, compared to when the acquired composition information (the information specifying each of the plurality of components included in the content and the information indicating the reproduction mode of the components) is directly distributed.

BRIEF DESCRIPTION OF DRAWINGS

FIG. 2 is a diagram illustrating an example of composition information generated by dividing stored composition information into main composition information and two pieces of sub-composition information.

FIG. 8 is a diagram illustrating an example of the composition information for reproducing the components in the layout.

FIG. 9 is a diagram illustrating an example of distribution timings of the main composition information and the sub-composition information.

FIG. 10(a) illustrates an example of distribution timings of the composition information, and FIG. 10(b) illustrates an example of data of the composition information.

FIG. 11(a) illustrates an example in which the base URL is omitted, FIG. 11(b) illustrates an example in which a URL configured in a higher node is used as the base URL, and FIG. 11(c) illustrates an example in which the base URL is designated in the base URL format.

FIG. 12 is a diagram for describing an example in which the main composition information and the sub-composition information are distributed using separate transmission paths, where FIG. 12(a) illustrates an example of distribution timings of the composition information, and FIG. 12(b) illustrates an example of data of the composition information.

FIG. 13 is a diagram illustrating data examples of two pieces of main composition information corresponding to two kinds of reproduction devices and sub-composition information common to the reproduction devices.

FIG. 16(a) illustrates a distribution example of the components and the composition information, and FIG. 16(b) illustrates an example of the composition information.

FIG. 18 is a diagram exemplifying main composition information, sub-composition information, and new composition information obtained by updating the main composition information with the sub-composition information.

FIG. 19 is a diagram exemplifying main composition information, sub-composition information, and new composition information obtained by updating the main composition information with the sub-composition information.

FIG. 20 is a diagram exemplifying main composition information, sub-composition information, and new composition information obtained by updating the main composition information with the sub-composition information.

FIG. 21 is a diagram exemplifying main composition information, sub-composition information, and new composition information obtained by updating the main composition information with the sub-composition information.

FIG. 22 is a diagram schematically illustrating a comparison between the flow of a process by the content transmission/reception system in FIG. 17 and the flow of a process by the content transmission/reception system in FIG. 23.

FIG. 25 is a diagram exemplifying main composition information, sub-composition information, and new composition information obtained by updating the main composition information with the sub-composition information.

FIG. 27 is a diagram exemplifying main composition information, sub-composition information, and new composition information obtained by updating the main composition information with the sub-composition information.

DESCRIPTION OF EMBODIMENTS

First Embodiment

Hereinafter, an embodiment of the present invention will be described in detail with reference to FIGS. 1 to 15.
<<System Configuration>>

Figure 1:
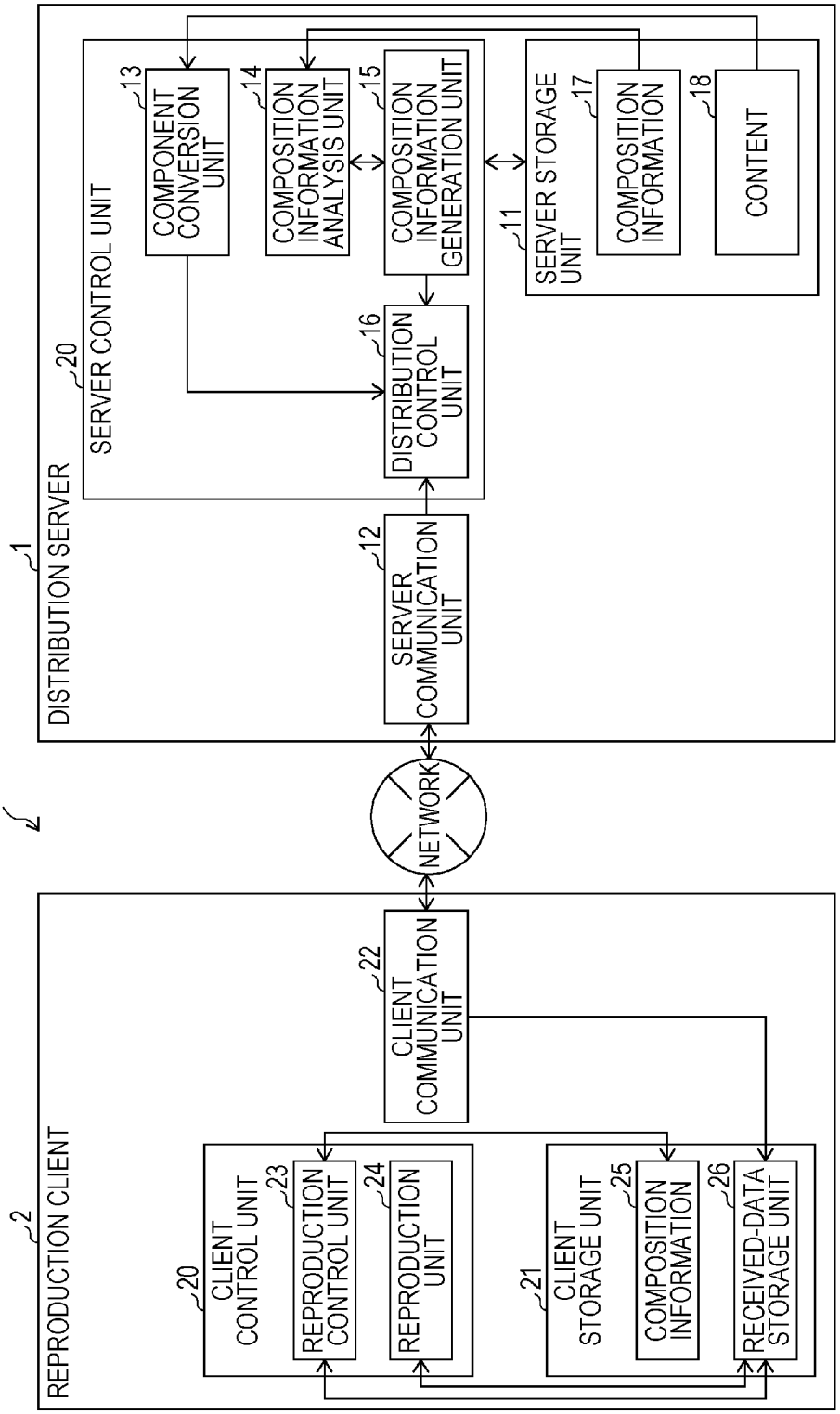
FIG. 1 is a diagram illustrating an embodiment of the present invention and is a block diagram illustrating the configurations of main units of a distribution server and a reproduction client included in a content transmission/reception system.

First, the configuration of a content transmission/reception system according to the embodiment will be described with reference to FIG. 1. FIG. 1 is a block diagram illustrating the configurations of main units of a distribution server (distribution device) 1 and a reproduction client (reproduction device) 2 included in a content transmission/reception system 3.

As illustrated, the content transmission/reception system 3 is configured such that the distribution server 1 and the reproduction client 2 are connected via a network. In the content transmission/reception system 3, the reproduction client 2 receives and reproduces content distributed by the distribution server 1.

In the illustrated example, the distribution server 1 and the reproduction client 2 directly communicate with each other, but the present invention is not limited thereto. For example, a relay server may relay communication between the distribution server 1 and the reproduction client 2, or content may be distributed from the distribution server 1 to another distribution server and the content may be distributed from the distribution server to the reproduction client 2.

A network connecting the distribution server 1 to the reproduction client 2 may be a network via which the distribution server 1 and the reproduction client 2 can transmit and receive content, and is not particularly limited. For example, as the foregoing network, a broadcasting network may be applied or the Internet may be applied. A hybrid network using a plurality of networks such as the Internet and a broadcasting network together may be adopted.

The distribution server 1 is a device that distributes content and includes a server control unit 10 that generally controls the functions of the distribution server 1, a server storage unit 11 that stores data used in the distribution server 1, and a server communication unit 12 through which the distribution server 1 communicates with an external device. The server control unit 10 includes a component conversion unit 13, a composition information analysis unit (acquisition means) 14, a composition information generation unit (composition information generation means) 15, and a distribution control unit (distribution control means) 16. Composition information 17 and content 18 are stored in the server storage unit 11.

The component conversion unit 13 divides the content 18 into predetermined division units to convert the division units into distribution components. When the content 18 is stored as distribution components, the component conversion unit 13 may be omitted.

The composition information analysis unit 14 acquires and analyzes the composition information 17 stored in the server storage unit 11 and determines which information represents main composition information (reference format composition information) and which information represents sub-composition information (reference destination composition information) among information included in the composition information 17. The main composition information and the sub-composition information will be described in detail below.

The composition information generation unit 15 generates the main composition information and the sub-composition information according to the determination of the composition information analysis unit 14. Main characteristic points of the distribution server 1 are to generate the main composition information and the sub-composition information from the composition information 17 and distribute the main composition information and the sub-composition information.

The distribution control unit 16 controls distribution of the content 18. Specifically, the distribution control unit 16 determines a distribution schedule of the components generated by the component conversion unit 13 and the main composition information and the sub-composition information generated by the composition information generation unit 15. According to the determined distribution schedule, the components, the main composition information, and the sub-composition information are distributed to the reproduction client 2 through the server communication unit 12.

The composition information 17 is information indicating the components included in the content 18, a layout such as display positions and sizes of the components, and a reproduction condition (reproduction mode) such as combination or non-combination. The composition information 17 may be, for example, information illustrated in FIG. 16(b). FIG. 1 illustrates a state in which the composition information 17 and the content 18 are separately stored, but the composition information 17 may be multiplexed with the content 18 to be stored.

The content 18 is content distributed by the distribution server 1. The content 18 includes a plurality of components, is divided into predetermined division units, and is distributed as a transmission packet to which a header is added. Examples of the components included in the content 18 include a moving image, audio, text, and a program.

On the other hand, the reproduction client 2 is a device that receives and reproduces the content and includes a client control unit 20 that generally controls the functions of the reproduction client 2, a client storage unit 21 that stores data used in the reproduction client 2, and a client communication unit 22 through which the reproduction client 2 communicates with an external device. The client control unit 20 includes a reproduction control unit 23 and a reproduction unit 24. The client storage unit 21 stores composition information 25 and includes a received-data storage unit 26.

The reproduction control unit 23 generally controls reproduction of the content 18. Specifically, the reproduction control unit 23 analyzes the main composition information and the sub-composition information distributed by the distribution server 1 and causes the reproduction unit 24 to reproduce the content 18 based on the analysis result. The reproduction control unit 23 stores the received main composition information and sub-composition information as the composition information 25 in the client storage unit 21 and appropriately uses the composition information 25 when the content 18 is reproduced.

The reproduction unit 24 reproduces the content 18 under the control of the reproduction control unit 23. More specifically, the reproduction unit 24 reproduces the components included in the content 18 in a reproduction mode according to attributes of the components. For example, when the component to be reproduced is a moving image or audio, the moving image or the audio is reproduced and output from a display unit or an audio output unit (not shown). When the component to be reproduced is text, the text is displayed by the display unit (not shown). When the component to be reproduced is a program, the program is executed. Of course, the reproduction, display, and execution processes according to the components may be executed in individual blocks.

<<Example 1 of Composition Information>>

The composition information generated by the distribution server 1 will be described with reference to FIG. 2. FIG. 2 is a diagram illustrating an example of composition information generated by dividing the stored composition information 17 into main composition information and two pieces of sub-composition information. The composition information 17 which is a division source is composition information illustrated in FIG. 16(b).

In the main composition information (main) in the drawing, it is described that a version of the composition information is "1." The components included in the content are described in a reference format with <comp href=" "> by a <components> tag. A reproduction mode of the components is described in a reference format with <par href=" "> by the <components> tag.

Thus, the main composition information is configured such that parts of the information included in the composition information 17 are rewritten in the reference formats and is used to express an overview of the entire composition of the content. Since the parts of the information are rewritten in the reference format, the amount of data is considerably reduced more than that of the composition information in FIG. 16(b).

The components included in the content and the reproduction mode are described in the reference formats. Therefore, when the components included in the content and the reproduction mode are desired to be changed, it is not necessary to change the main composition information. Therefore, a necessary frequency of update of the main composition information is also decreased compared to the composition information in FIG. 16(b).

On the other hand, the sub-composition information (sub) includes specific information (information rewritten in the reference format of the main composition information among the information included in the composition information 17) to be referred to from the main composition information. That is, while the main composition information expresses the overview of the entire composition of the content, the sub-composition information is used to express details of a part of the content.

That is, in the sub-composition information with a version of "1" among the sub-composition information in the drawing, information specifying the components c1 to c4 is described and an id of "s1" is allocated to these components. That is, <comp href="sub#s1"/> of the main composition information indicates that the components with id=s1 in the sub-composition information are referred to.

In the sub-composition information with the version of "1", it is described that c1 which is a video component and c2 which is an audio component are simultaneously reproduced. Further, it is described that any one of c3 and c4 which are text components can be selected and used. In such a reproduction mode, an id of "p1" is allocated. That is, <par href="sub#p1"/> of the main composition information indicates that the reproduction mode of id=p1 in the sub-composition information is referred to.

Thus, as in the case in which the composition information illustrated in FIG. 16(b) is used, it is possible to simultaneously reproduce the components c1 and c2 and use the component c3 or c4 during the reproduction, as necessary.

In sub-composition information (alternative reference destination composition information) with a version of "2", a component with id=s1 and a reproduction mode with id=p1 are described. However, the sub-composition information with the version of "2" is different from the sub-composition information with the version of "1" in the description details.

Specifically, in the sub-composition information with the version of "2", the components c5 to c8 are described. It is also described that c5 which is the video component and c6 which is the audio component are simultaneously reproduced and any one of c7 and c8 which are the text components can be selected and used.

Thus, as in the case in which the composition information illustrated in FIG. 16(b) is used, it is possible to simultaneously reproduce the components c5 and c6 and use the component c7 or c8 during the reproduction, as necessary.

In this way, in the embodiment, the same reproduction as the reproduction at the time of use of the composition information of the related art is enabled by referring to the main composition information and the sub-composition information. As will be described in detail below, when one piece of composition information is divided into main composition information and sub-composition information, it is possible to decrease the distribution frequency of the main composition information of which a required update frequency is low. Thus, the amount of distributed data can also be reduced wholly more than when the composition information 17 is directly distributed.

In the composition information 17, the portion set in the reference format is not particularly limited. For example, any one of the component in the <components> tag and the reproduction mode in the <compositions> tag may be set in the reference format. For example, a part of the component in the <components> tag may be set in the reference format. Likewise, a part of the reproduction mode in the <compositions> tag may be set in the reference format.

<Distribution Mode>

Figure 3:
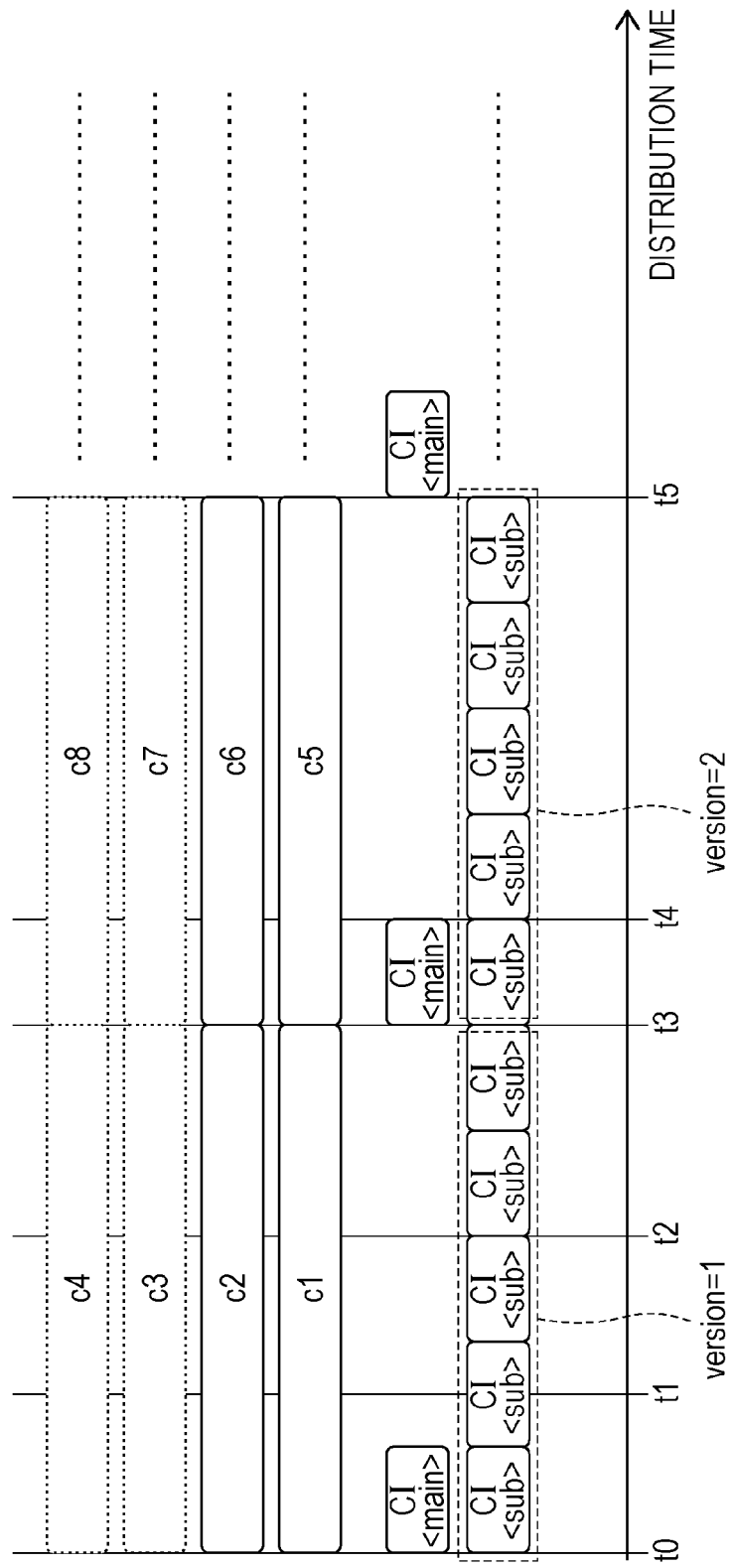
FIG. 3 is a diagram illustrating an example of distribution timings of the main composition information and sub-composition information.

Subsequently, a distribution mode of the foregoing main composition information and sub-composition information will be described with reference to FIG. 3. FIG. 3 is a diagram illustrating an example of distribution timings of the main composition information and the sub-composition information. In FIG. 3, as in FIG. 16(a), one component and one piece of composition information are indicated by one block and a dashed-line block indicates a component to be optionally used.

In the example of FIG. 3, the distribution timings of the components are the same as the timings of the example of FIG. 16(a). The components c1 to c4 are first distributed and the components c5 to c8 are subsequently distributed. More specifically, at a time t0 which is a distribution start time of the content to be reproduced, the components c1 to c4 start to be distributed. Then, at a time t3 which is a composition change time of the content to be reproduced, the components c5 to c8 start to be distributed.

On the other hand, the distribution mode of the composition information is different from that of the example of FIG. 16(a). That is, in the example of FIG. 3, the main composition information (main) is distributed at the time t0, the time t3, and a time t5. The distribution frequency is lower than that of the composition information (CI) in FIG. 16(a).

In the example of FIG. 3, during a period of the time t0 to the time t3 at which the components c1 to c4 are distributed, the sub-composition information with version 1 including information regarding the components for which this period is set as a reproduction period is repeatedly distributed. The distribution frequency of the sub-composition information is higher than that of the main composition information.

Likewise, during a period of the time t3 to the time t5 at which the components c5 to c8 are distributed, the sub-composition information with version 2 including information regarding the components for which this period is set as a reproduction period is repeatedly distributed.

When the components, the main composition information, and the sub-composition information are distributed at the timings, the reproduction client 2 can start to reproduce the components at a timing at which both of the main composition information and the sub-composition information are acquired.

For example, when reception starts at the time t1 in the drawing, the reproduction client 2 is in a reproduction standby up to a time t2 at which the reception of the subsequently distributed sub-composition information with version 1 is completed due to the fact that the secondly distributed sub-composition information with version 1 is being distributed at the time t1.

Here, when the reproduction client 2 receives content from the distribution server 1 previously (not shown: before the time t0), the reproduction client 2 can start to reproduce the components c1 to c4 from the time t2 by storing the main composition information and using the previously received main composition information and the sub-composition information with version 1, of which the reception is completed at the time t2, at the time t2.

Since the components c5 to c8 and the sub-composition information with version 2 start to be distributed at the time t3 and the reception of the sub-composition information with version 2 is completed at a time t4, the components c5 to c8 can also be reproduced after the time t4.

The main composition information and the sub-composition information may be distributed at a timing according to a time at which the reproduction of the components c1 and c2 is desired to start. For example, when the reproduction is desired to start from the time t0, the main composition information and the sub-composition information may be distributed at a timing at which the reception is completed at the time t0.

On the other hand, when the main composition information is not received previously at the time t2, the reproduction waits up to the time t4 at which reception of the subsequently distributed main composition information is completed. Then, since both of the main composition information and the sub-composition information are acquired at the time t4, the components c1 to c4 can start to be reproduced based on the information.

At the time t4, the sub-composition information with version 2 is also acquired. However, since the information regarding the components c5 to c8 is described in the sub-composition information with version 2 (see FIG. 2), the sub-composition information may not be used to reproduce the components c1 to c4. For this reason, the components are reproduced referring to the sub-composition information with version 1 in which the information regarding the components c1 to c4 is described and of which the reception is completed up to the time t3.

<Identification at Payload Level>

When the foregoing main composition information and sub-composition information are used, the reproduction client requires to identify whether the composition information multiplexed and distributed along with each component included in the content is the main composition information or the sub-composition information. Of course, by analyzing the details of the composition information, whether the composition information is the main composition information or the sub-composition information can be identified. However, it is wasteful to analyze the composition information whenever the composition information distributed a plurality of times is acquired.

Here, the main composition information and the sub-composition information are multiplexed and distributed in units of payloads as in each component included in the content. Therefore, whether the composition information is the main composition information or the sub-composition information can be identified at a payload level and it is desirable to identify its version. Thus, this is because it is not necessary to analyze the composition information to identify the composition information.

Figure 4:
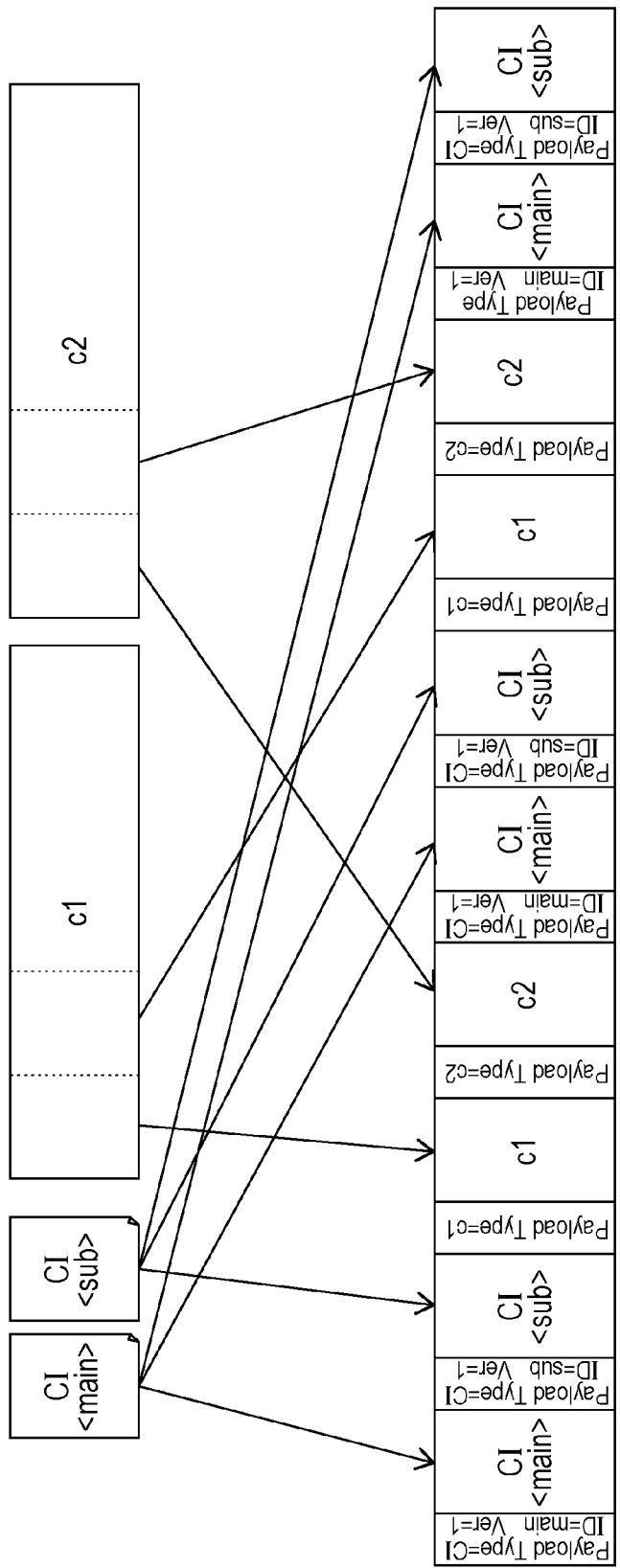
FIG. 4 is a diagram illustrating an example of a data structure in which information for identifying the composition information is described in a header of a payload distributing the main composition information, the sub-composition information, and two components.

Here, an example in which information for identifying the composition information is described in the header of the payload will be described with reference to FIG. 4. FIG. 4 is a diagram illustrating an example of a data structure in which the information for identifying the composition information is described in the header of the payload distributing the main composition information, the sub-composition information, and two components.

In the illustrated example, the main composition information (main) and the sub-composition information (sub) are each stored in one payload without division, and the components c1 and c2 are divided into a plurality of portions and are stored in separate payloads. The main composition information (main) and the sub-composition information (sub) are repeatedly stored in a plurality of payloads to be distributed repeatedly.

The header of the payload of the main composition information describes that the details of the payload are the composition information in a "Payload Type=CI" format and indicates that the main composition information is stored in the payload in an "ID=main" format. The version of the main composition information is described in a "Ver=(version number)" format.

Likewise, the header of the payload of the sub-composition information describes that the details of the payload are the composition information in the "Payload Type=CI" format and indicates that the sub-composition information is stored in the payload in an "ID=sub" format. The version of the sub-composition information is described in a "Ver=(version number)" format.

Referring to the information described in the header of the payload, the reproduction client 2 can identify whether the composition information stored in the payload is the main composition information or the sub-composition information without analyzing the data in the payload. Thus, in a reception standby state of the main composition information and the sub-composition information, it is possible to smoothly specify that the reception standby composition information is received.

The version of the received composition information can be identified merely by referring to the header of the payload. Thus, it is possible to smoothly specify that the composition information with a version not received previously is received.

The information for identifying the main composition information and the sub-composition information may not be information in which an identifier of the main composition information or the sub-composition information can be specified with reference to only the header of the payload. Since the composition information is classified into the main composition information and the sub-composition information, for example, a 1-bit flag indicating whether the composition information is the main composition information may be merely described in the header of the payload, thereby reducing an amount of information described in the header of the payload. In this case, the identifier of each piece of composition information may be described in a format of <ci id="sub"> . . . </ci>, for example, inside the composition information, as necessary.

In the version management at the payload level, change or non-change is set by a 1-bit flag and an actual version number may specify and analyze the composition information. In this case, when the change is indicated by the bit, the composition information in the payload is analyzed and the update details are actually confirmed at the time of reception start and immediately after recovery from a reception error.

<<Example 2 of Composition Information>>

The example has been described above in which one piece of composition information is divided into one piece of main composition information and one piece of sub-composition information and the sub-composition information is generated by a plurality of versions. However, the sub-composition information may be further divided according to the components. Thus, the amount of distributed data can be further reduced.

Figure 5:
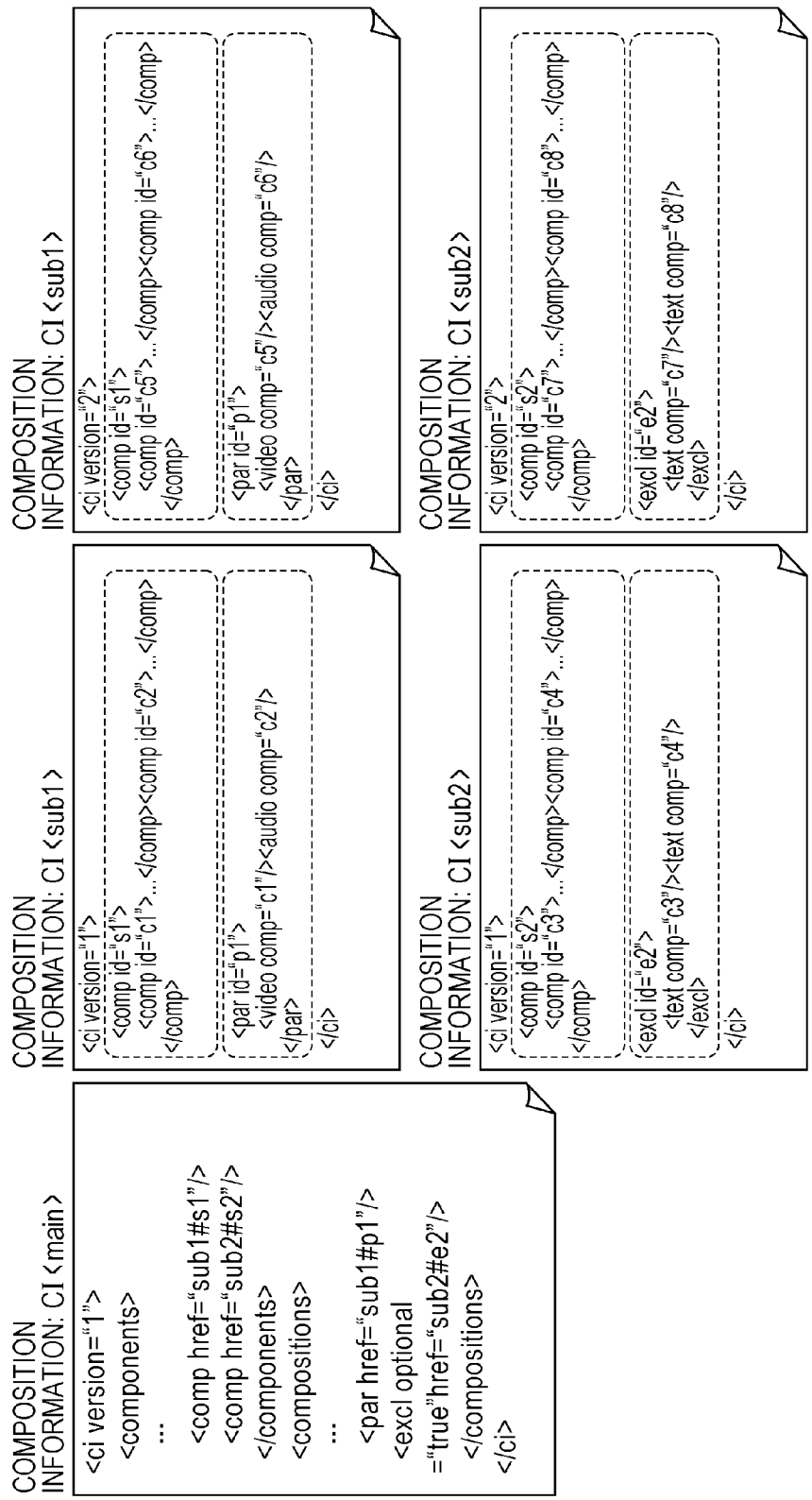
FIG. 5 is a diagram illustrating an example of composition information generated by dividing stored composition information into main composition information and four pieces of sub-composition information.

Here, the composition information obtained by further dividing the sub-composition information according to the component will be described with reference to FIG. 5. FIG. 5 is a diagram illustrating an example of composition information generated by dividing the composition information 17 into the main composition information and four pieces of sub-composition information. The composition information 17 which is a division source is the composition information illustrated in FIG. 16(b).

Even in a <components> tag of the main composition information in FIG. 5, the components included in the content 18 are described in the reference format as in the example of FIG. 2. However, this example differs from the example of FIG. 2 in that two components "sub1#s1" and "sub2#s2" to be referred to are set. Here, "sub1" is first sub-composition information (reference destination composition information) and "sub2" is second sub-composition information (sub-reference destination composition information).

In a <compositions> tag of the main composition information in FIG. 5, a reproduction mode of the components is described in a citation format. Specifically, as the reproduction mode, "sub1#p1" is described in the citation format and a reference destination at the time of use of an optionally selected component is described as "sub2#e2."

In the drawing, two versions (1 and 2) are illustrated for each of the first sub-composition information (sub1) and the second sub-composition information (sub2).

Specifically, in the first sub-composition information (version 1), the components c1 and c2 are described and the id of "s1" is allocated to the components. It is described that c1 which is a video component and c2 which is an audio component are simultaneously reproduced, and an id of "p1" is allocated to this reproduction mode.

In the second sub-composition information (version 1), the components c3 and c4 are described and an id of "s2" is allocated to the components. It is described that any one of the text components c3 and c4 is used, and an id of "e2" is allocated to this use mode.

Accordingly, by referring to the main composition information, the first sub-composition information (version 1), and the second sub-composition information (version 1), it is possible to realize the same reproduction as that of the case in which the composition information illustrated in FIG. 16(b) is used.

That is, by referring to the description of the <components> tag of the main composition information, the description of id=s1 of the first sub-composition information (version 1), and the description of id=s2 of the second sub-composition information (version 1), it is possible to specify that reproduction targets are the four components c1 to c4.

Further, by referring to the description of the <compositions> tag of the main composition information, the description of id=p1 of the first sub-composition information (version 1), and the description of id=e2 of the second sub-composition information (version 1), it is possible to simultaneously reproduce the components c1 and c2 and use the component c3 or c4 during the reproduction, as necessary. Of course, when the first sub-composition information is acquired, the components c1 and c2 can be reproduced despite the fact that the second sub-composition information of the optionally reproduced component is not acquired.

Likewise, in the first sub-composition information (version 2), the components c5 and c6 are described and the id of "s1" is allocated to the components. It is described that c5 which is a video component and c6 which is an audio component are simultaneously reproduced, and the id of "p1" is allocated to this reproduction mode.

In the second sub-composition information (version 2), the components c7 and c8 are described and the id of "s2" is allocated to the components. It is described that any one of the text components c7 and c8 is used, and the id of "e2" is allocated to this use mode.

Accordingly, when the first sub-composition information and the second sub-composition information with version 2 are referred to, it is specified that the reproduction targets are the four components c5 to c8. It is possible to simultaneously reproduce the components c5 and 6 and use the component c7 or c8 during the reproduction, as necessary. Of course, when the first sub-composition information is acquired, the components c1 and c2 can be reproduced despite the fact that the second sub-composition information of the optionally reproduced component is not acquired.

Thus, when the components (c1, c2, c5, and c6) to be essentially reproduced and the components (c3, c4, c7, and c8) to be optionally used are described in the different pieces of sub-composition information, the amount of distributed data can also be reduced wholly by decreasing the distribution frequency of the second sub-composition information for which a problem is less even when an update frequency is decreased.

<Distribution Mode>

Figure 6:
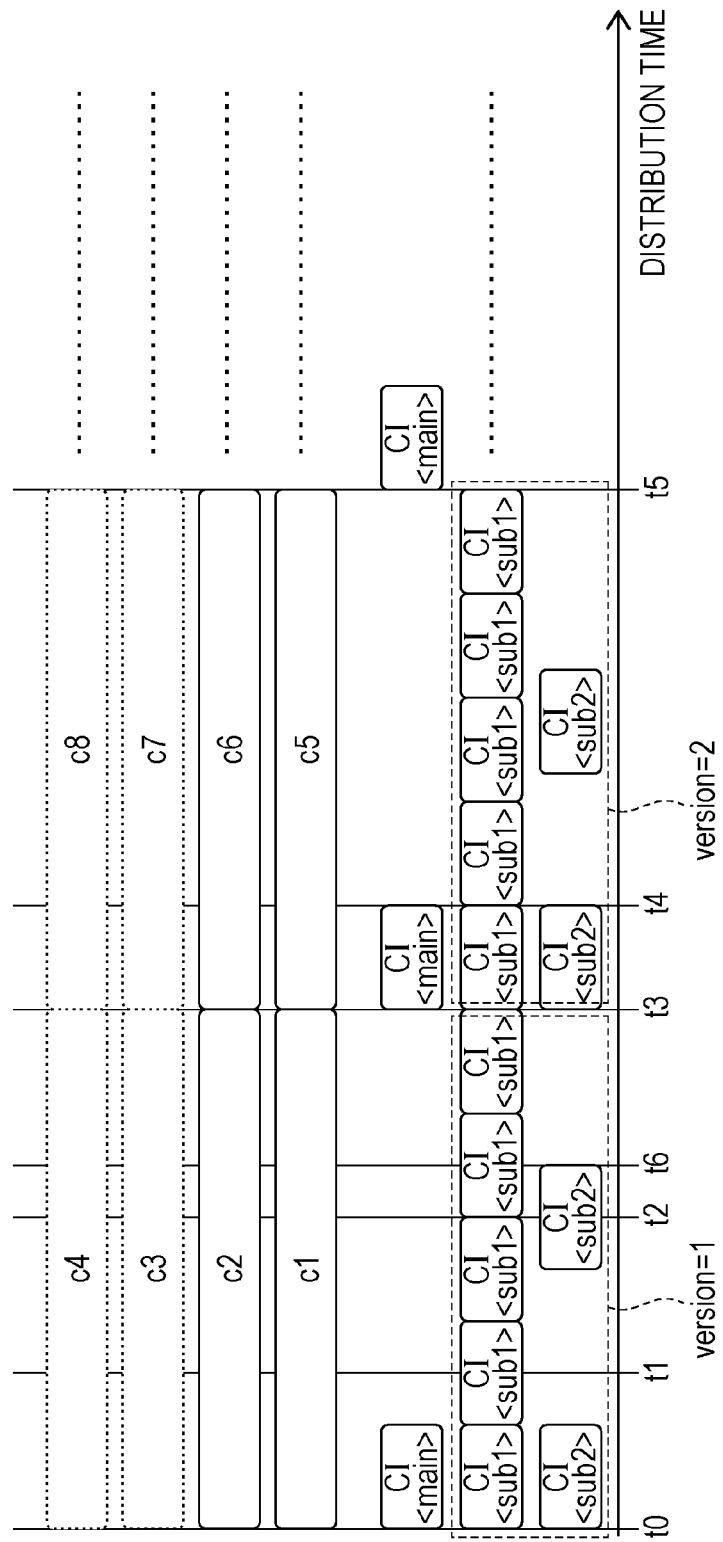
FIG. 6 is a diagram illustrating an example of distribution timings of the main composition information and four pieces of sub-composition information.

Subsequently, the distribution mode of the foregoing main composition information and sub-composition information will be described with reference to FIG. 6. FIG. 6 is a diagram illustrating an example of distribution timings of the main composition information and four pieces of sub-composition information. In FIG. 6, as in FIGS. 16(*a*) and 3, one component and one piece of composition information are indicated by one block and a dashed-line block indicates a component to be optionally used.

In the example of FIG. 6, the distribution timings of the components are the same as the timings of the example of FIG. 3. The components c1 to c4 start to be distributed at a time t0 and the components c5 to c8 start to be distributed at a time t3. A distribution timing of the main composition information is also the same as in the example of FIG. 3.

On the other hand, the distribution mode of the sub-composition information differs from that of the example of FIG. 3. That is, in the example of FIG. 6, two kinds of sub-composition information, first sub-composition information (sub1) and second sub-composition information (sub2), are distributed. Any sub-composition information distributed during a period of the time t0 to the time t3 has version 1 and any sub-composition information distributed during a period of the time t3 to a time t5 has version 2.

The distribution frequency of the first sub-composition information is the same as that of the sub-composition information of FIG. 3, but the distribution frequency of the second sub-composition information is less than that of the first sub-composition information. Thus, the amount of data of the distributed sub-composition information is reduced more than in the example of FIG. 3.

When the reproduction is executed referring to the main composition information and the four pieces of sub-composition information, the reproduction client 2 executes a process, for example, as follows.

That is, when reception starts at a time t1, the secondly distributed first sub-composition information with version 1 is being distributed at this time. Therefore, the reproduction client awaits the reproduction up to a time t2 at which the reception of the subsequently distributed first sub-composition information with version 1 is completed.

Here, when the main composition information is received previously at a time t2, the components c1 and c2 can start to be reproduced from the time t2 using the previously received main composition information and the first sub-composition information with version 1 of which the reception is completed at the time t2.

In this case, by using the second sub-composition information with version 1 of which the reception is completed at a time t6, the components c3 and c4 start to be used from a time t6. Since the components c3 and c4 are text of subtitles which may not be essentially used, the degree of delay (from t2 to t6) in this example is considered to be allowed by many users.

Since the first sub-composition information and the second sub-composition information with version 2 start to be distributed at the time t3 and the reception is completed at the time t4, the components c5 to c8 can also be reproduced after the time t4.

On the other hand, when the main composition information is not received previously at the time t2, the reproduction waits up to the time t4 at which reception of the subsequently distributed main composition information is completed. Then, since all of the main composition information, the first sub-composition information, and the second sub-composition information are acquired at the time t4, the components c1 to c4 can start to be reproduced based on the information.

In the example of FIG. 6, as described above, the components are classified according to the level of significance (whether prompt display is required or whether reproduction is essential) of each component and the sub-composition information is generated according to each classification. Of the pieces of sub-composition information, the distribution frequency of the sub-composition information with relatively high significance is set to be high and the distribution frequency of the sub-composition information with relatively low significance is set to be low.

Specifically, the first sub-composition information for reproducing AV components (a video component and an audio component) of which reproduction is essential and of which necessity of prompt reproduction is high is frequently distributed. Conversely, the second sub-composition information for using a text component such as subtitles of which the use is optional and of which necessity of prompt reproduction is relatively low is less frequently distributed.

Thus, the amount of distributed data of the composition information can be reduced wholly while suppressing the reproduction start delay of the AV component by the reception standby of the first sub-composition information to be as small as possible.

The distribution frequency of the composition information for reproducing the component may be changed according to a component distribution method. For example, when components are repeatedly transmitted in carousel as in data broadcasting used in current digital broadcasting, the composition information regarding the components may be transmitted according to the distribution frequency.

<<Example 3 of Composition Information>>

The example has been described above in which the information indicating a combination of the simultaneously reproduced components is described as the information indicating the reproduction mode in the sub-composition information. However, information indicating a layout may be described.

Figure 7:
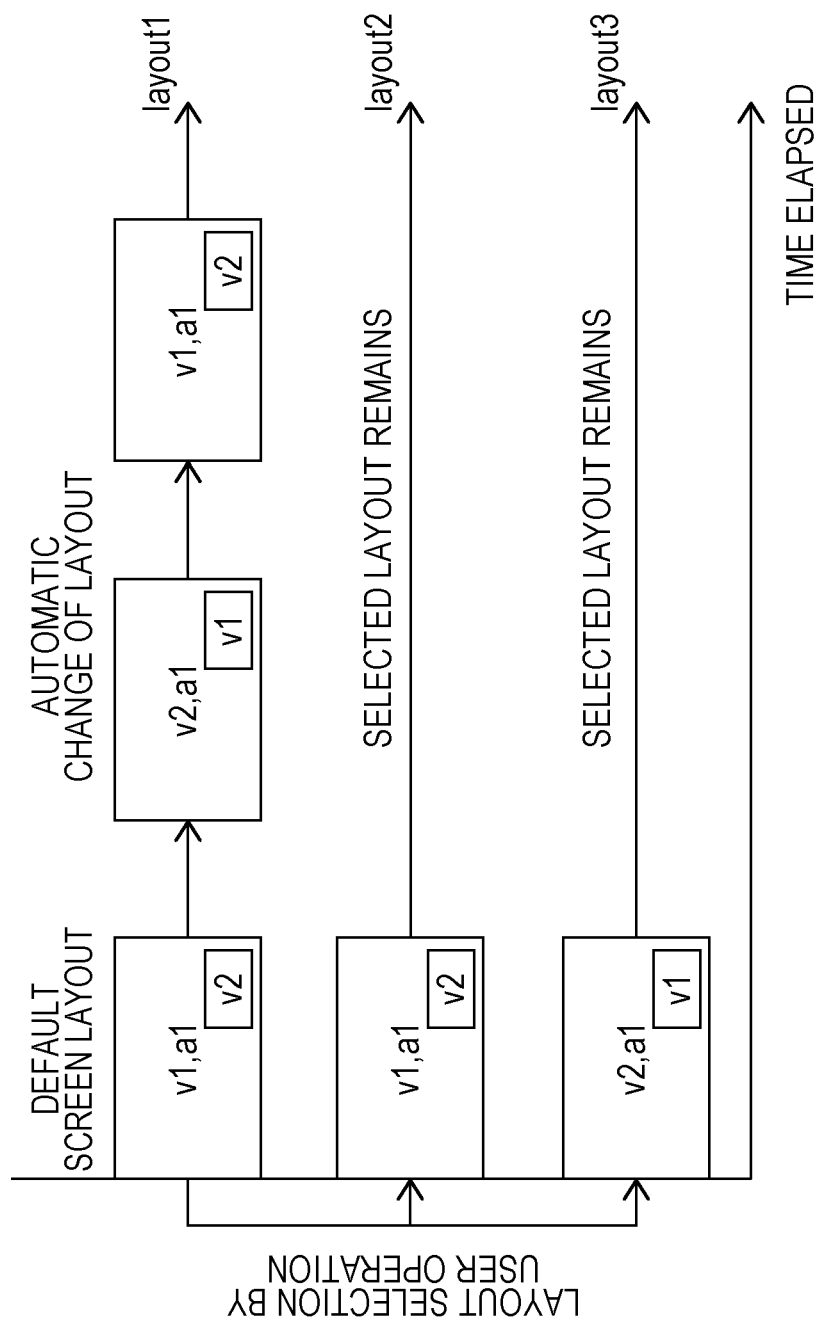
FIG. 7 is a diagram illustrating examples of layouts of components.

Here, an example in which the sub-composition information describing the information indicating layouts is used will be described with reference to FIGS. 7 and 8. FIG. 7 is a diagram illustrating examples of the layouts of the components. FIG. 8 is a diagram illustrating an example of the composition information for reproducing the components with the layouts in FIG. 7.

In the example of FIG. 7, three layouts, "layout1" to "layout3", are targets to be selected by a user. The user reproducing the components selects a desired layout from the layouts and the reproduction client 2 displays the components according to the selected layout.

Specifically, when layout1 is selected, a default screen layout is first applied. The default screen layout is a layout that displays v1 (video component) on a full screen, displays v2 (video component) on a small screen, and reproduces a1 (audio component).

Thereafter, the layout is automatically changed at a timing at which a predetermined time has passed. The changed layout is a layout that displays v2 on a full screen, displays v1 on a small screen, and reproduces a1. The layout is automatically returned to the default screen layout at a timing at which a predetermined time has further passed.

On the other hand, when layout2 or layout3 is selected, the automatic change of the layout described above is not executed and the selected layout remains. That is, when layout2 is selected, v1 is displayed on a full screen, v2 is displayed on a small screen, and a1 is reproduced. When layout3 is selected, v2 is displayed on a full screen, v1 is displayed on a small screen, and a1 is reproduced.

The display in the layout can be realized by the composition information in FIG. 8. The composition information in FIG. 8 includes the main composition information, the first sub-composition information, and the second sub-composition information. Three versions, version 1 to version 3, are included in the second sub-composition information.

In the main composition information in the drawing, a component attribute "sub1#s1" is referred to by a <components> tag. Further, "reg_1" corresponding to the full screen display and "reg_2" corresponding to the small screen display are defined by a <layouts> tag.

By a <compositions> tag, it is described that the components are reproduced in any one layout of "sub2#layout1", "layout2", and "layout3" of external reference. The specific details of the layouts are each described.

On the other hand, in the first sub-composition information, components "v1", "v2", and "a1" are described, and the id of "s1" is allocated to the components.

In version 1 of the second sub-composition information, a layout that displays the video component v1 in reg_1, displays the video component v2 in reg_2, and reproduces the audio component a1 is described. Further, the id of "layout1" is allocated to the layout.

Likewise, in version 2 of the second sub-composition information, a layout that displays the video component v1 in reg_2, displays the video component v2 in reg_1, and reproduces the audio component a1 is described. Further, the id of "layout1" is allocated to the layout.

In version 3 of the second sub-composition information, as in version 1, a layout that displays the video component v1 in reg_1, displays the video component v2 in reg_2, and reproduces the audio component a1 is described. Further, the id of "layout1" is allocated to the layout.

When the foregoing composition information is used, the components v1, v2, and a1 can be reproduced by acquiring the main composition information and the first sub-composition information. The user can be allowed to select any one of layout1 to layout3 at any timing and the components can also be reproduced according to the selected layout. That is, even when the second sub-composition information is not received, the components can be reproduced according to the layout described in the main composition information.

When layout1 is selected, the layout can be changed automatically (without a user's operation) by acquiring version 2 of the second sub-composition information at a timing at which the layout is changed, as illustrated in FIG. 7. This is because the information referred to in "sub2#layout1" of the main composition information is changed to the second sub-composition information with version 2. Even when this layout is automatically returned to the origin, the same applies and version 3 of the second sub-composition information may be acquired at a timing at which the layout is changed.

<Distribution Mode>

Subsequently, a distribution mode of the foregoing main composition information and sub-composition information will be described with reference to FIG. 9. FIG. 9 is a diagram illustrating an example of distribution timings of the main composition information and the sub-composition information. In FIG. 9, as in FIGS. 3 and 6, one component and one piece of composition information are indicated by one block.

In the example of FIG. 9, at a time t0 which is a distribution start time of the content to be reproduced, components a1, v2, and v1 start to be distributed. At the time t0, the main composition information, the first sub-composition information with version 1, and the second sub-composition information with version 1 start to be distributed.

A distribution timing of the main composition information is the same as that of the examples of FIGS. 3 and 6, and the main composition information is distributed only once at the time of the distribution start of the corresponding component. A distribution timing of the first sub-composition information is the same as that of the example of FIG. 6, and the first sub-composition information is repeatedly distributed at a predetermined cycle during a period in which the components are distributed. On the other hand, each of the second sub-composition information with different versions is distributed once.

Here, in the example of the drawing, the distribution of the second sub-composition information with version 2 is completed at a time t1. Thus, referring to the second sub-composition information with version 2, the reproduction client 2 can automatically switch a display layout of the component based on the second sub-composition information with version 2.

Likewise, in the example of the drawing, the distribution of the second sub-composition information with version 3 is completed at a time t2. Thus, referring to the second sub-composition information with version 3, the reproduction client 2 can automatically switch a display layout of the component based on the second sub-composition information with version 3.

<<Concurrent Use of On-Demand Distribution>>

When the composition information can be distributed on demand, transmission efficiency of the composition information can be further improved by concurrently using on-demand distribution. Here, an example in which the composition information is distributed on demand will be described with reference to FIG. 10.

Figure 10:
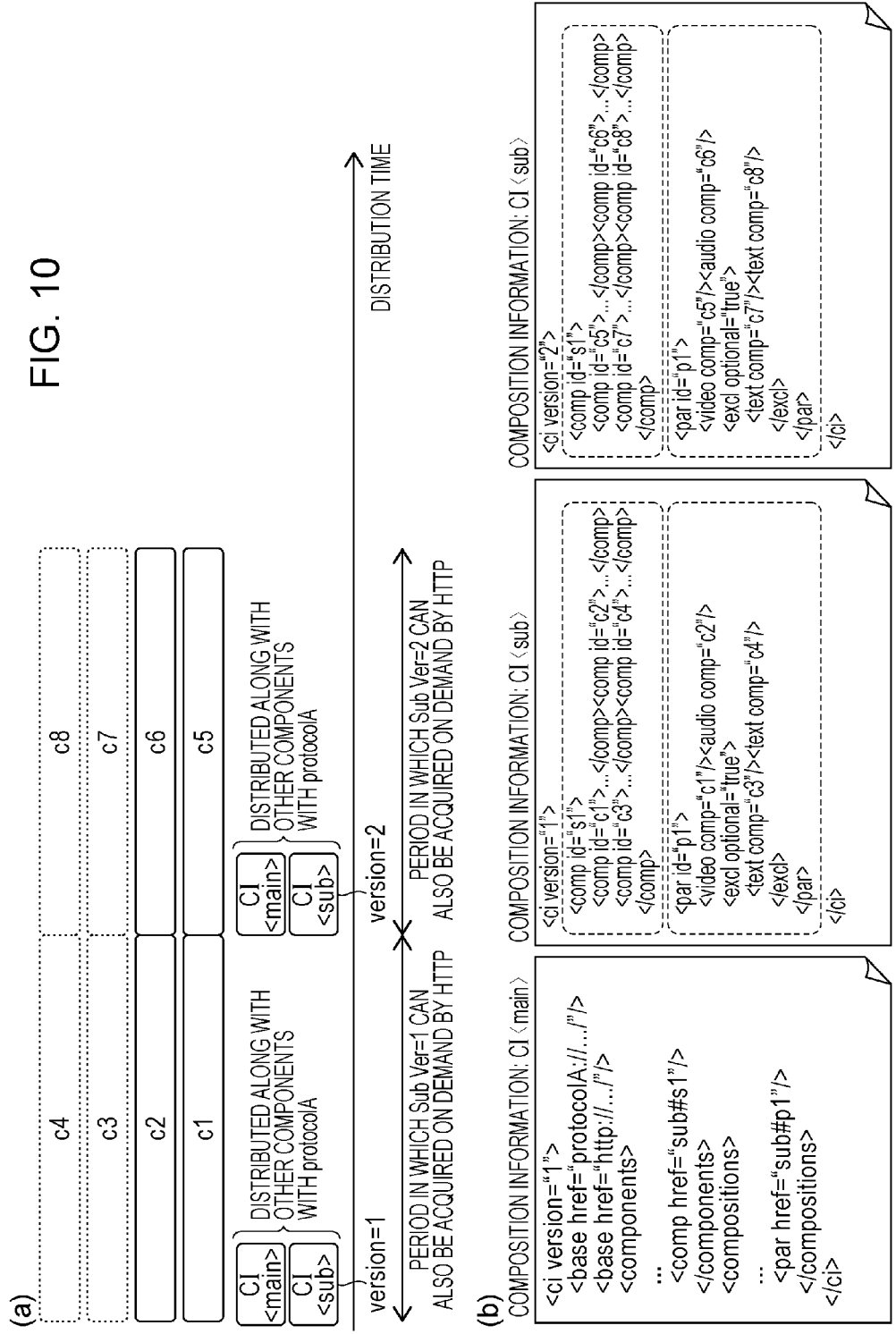
FIG. 10 is a diagram for describing an example in which the composition information is distributed on demand, where

FIG. 10 is a diagram for describing an example in which the composition information is distributed on demand. FIG. 10(a) illustrates an example of distribution timings of the composition information and FIG. 10(b) illustrates an example of data of the composition information. In FIG. 10(a), as in the examples of FIGS. 16(a), 3, and 6, one component and one piece of composition information are indicated by one block and a dashed-line block indicates a component to be optionally used. The components to be distributed are the same as those of the examples of FIGS. 16(a), 3, and 6.

In the example of FIG. 10(a), at a distribution start time of the components c1 to c4, the main composition information and the sub-composition information are distributed along with the components with a protocol called protocolA. During a distribution period of the components c1 to c4, the sub-composition information with version 1 can also be acquired on demand by HTTP.

Likewise, at a distribution start time of the components c5 to c8, the components, the main composition information, and the sub-composition information are multiplexed and distributed with the protocol called protocolA. During a distribution period of the components c5 to c8, the sub-composition information with version 2 can also be acquired on demand by HTTP.

To enable the sub-composition information to be acquired on demand, for example, the composition information illustrated in FIG. 10(b) may be used. The composition information in FIG. 10(b) includes the main composition information, the sub-composition information with version 1, and the sub-composition information with version 2. Since the sub-composition information (version 1 and version 2) is the same as that of the example of FIG. 2, the description thereof will be omitted here.

In the main composition information in FIG. 10(b), two paths ("protocolA:// . . . /" and "http:// . . . /") are described in a base URL format. Further, "sub#s1" is referred to in a <component> tag and "sub#p1" is referred to in a <compositions> tag.

Referring to the information, the reproduction client 2 can acquire the composition information of the reference destination by protocolA or HTTP. That is, since the sub-composition information is distributed with protocolA, the sub-composition information can be acquired by a URL in which "sub#s1" (or "sub#p1") indicating the sub-composition information is combined in a base URL with "protocolA:// . . . /." When HTTP is used, the sub-composition information can be acquired by a URL in which "sub#s1" (or "sub#p1") indicating the sub-composition information is combined in a base URL with "http:// . . . /."

Further, protocolA may be a protocol capable of distributing the composition information and is not particularly limited. As described with reference to FIG. 4, the composition information can be multiplexed and distributed with other components. For example, a protocol defined by ARIB (Association of Radio Industries and Business) or a protocol defined by DVB (Digital Video Broadcasting) can be used to distribute an AV component for digital broadcasting.

<Description Format of External Reference URL>

When there are a plurality of distribution forms (live distribution and on-demand distribution) of the composition information, a plurality of URLs are necessary to refer to the composition information according to the distribution form, and thus the amount of information of URL description may become a problem. Accordingly, in the system, URL description of a format "transmission protocol://transmitted resource identifier/component identifier#element identifier in component" is used. Thus, by describing the format of the base URL of only a different portion for each distribution form (the live distribution and the on-demand distribution) and describing a relative URL formed by only a portion (for example, "component identifier#element identifier in component") which does not depend on the distribution form in an href attribute, the amount of information of the URL description is reduced.

Figure 11:
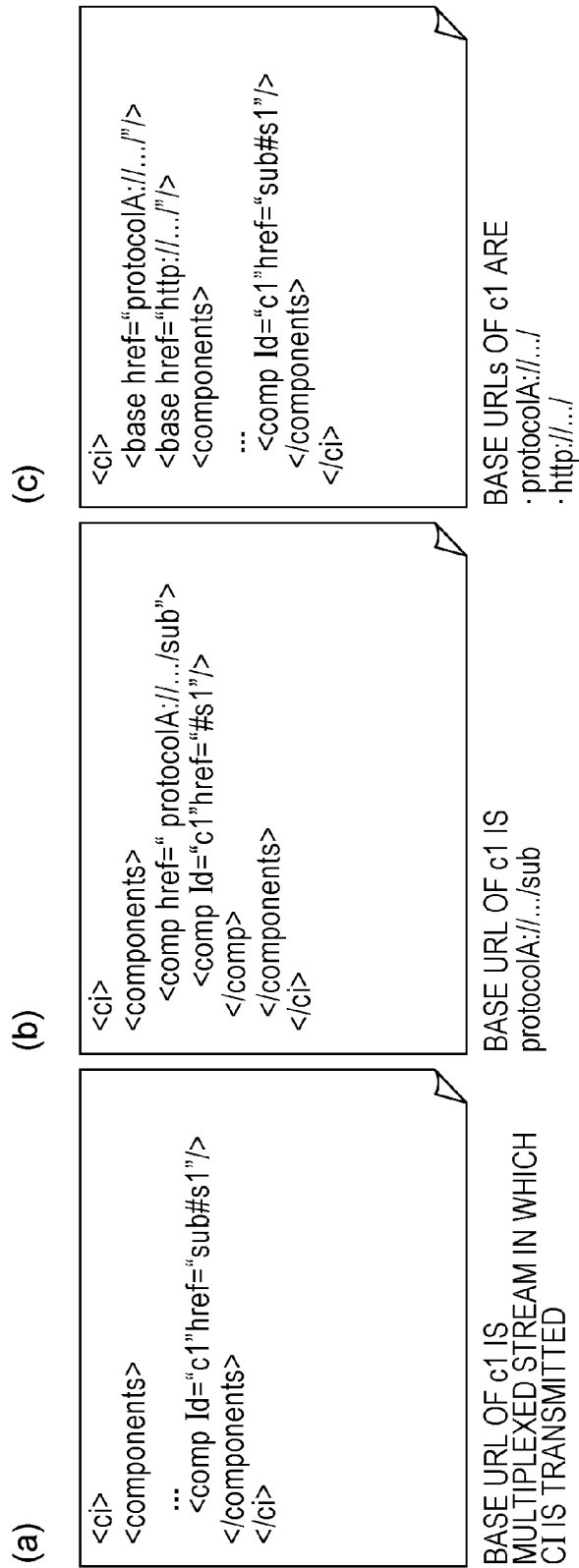
FIG. 11 is a diagram illustrating a description example of a URL for referring to external information in the composition information, where

Here, the reduction in the amount of information of the URL description using the relative URL will be supplemented with reference to FIG. 11. FIG. 11 is a diagram illustrating a description example of a URL for referring to external information in the composition information. FIG. 11(a) illustrates an example in which the base URL is omitted, FIG. 11(b) illustrates an example in which a URL configured in a higher node is used as the base URL, and FIG. 11(c) illustrates an example in which the base URL is designated in the base URL format.

Here, in order to acquire information from a reference destination referred to in the relative URL format, it is necessary to supplement a transmission protocol and a transmission resource identifier of the component.

For example, in the example of FIG. 11(a), in the component c1, "sub#s1" is referred to in the relative URL format, but the base URL (the transmission protocol and the transmitted resource identifier) is not described.

In this case, the base URL of the component c1 is determined to be a multiplexed stream in which the composition information is transmitted, and information specified with "sub#s1" in information included in the multiplexed stream is referred to.

In contrast, in the example of FIG. 11(b), in c1, only the element identifier in the component is configured as the relative URL. In a master node to which c1 belongs, an href attribute "protocolA:// . . . /sub" is configured. Accordingly, by combining such information, it is possible to obtain a URL, "protocolA:// . . . /sub#s1" for external reference of c1. That is, in this example, "protocolA:// . . . /sub" functions as the base URL.

In the example of FIG. 11(c), as in the example of FIG. 10(b), two base URLs, "protocolA:// . . . /" and "http:// . . . /", are described in the higher node of c1 in which the relative URL description is used. In this example, by combining "protocolA:// . . . /" and "sub#s1", it is possible to refer to the portion "s1" of the sub-composition information transmitted with protocolA. Further, by combining "http:// . . . /" and "sub#s1", it is possible to refer to the portion "s1" of the sub-composition information by HTTP. Thus, since the description of "sub#s1" which is a common portion of the protocols is not repeated by making the description using the base URLs, the amount of data of the entire composition information can be reduced.

Only the URL description for the external reference of the composition information has been described above, but the same description method may be used for URL description for reference of each component referred to from the composition information.

<<Example 4 of Composition Information>>

A transmission path of the main composition information and the sub-composition information has not particularly been mentioned above. When there are a plurality of transmission paths for content from the distribution server 1 to the reproduction client 2, e.g., a network connecting the distribution server 1 to the reproduction client 2 is a hybrid network, the main composition information and the sub-composition information may be distributed using different transmission paths. This will be described with reference to FIG. 12. FIG. 12 is a diagram for describing an example in which the main composition information and the sub-composition information are distributed using separate transmission paths. FIG. 12(a) illustrates an example of distribution timings of the composition information and FIG. 12(b) illustrates an example of data of the composition information. In FIG. 12(a), as in the examples of FIGS. 16(a), 3, and 6, one component and one piece of composition information are indicated by one block and a dashed-line block indicates a component to be optionally used. The components to be distributed are the same as those of the examples of FIGS. 16(a), 3, 6, and 10.

In the example of FIG. 12(a), the components c1, c2, c5, and c6 to be essentially reproduced are distributed using a transmission path A and the main composition information is also distributed using the transmission path A. The components c3, c4, c7, and c8 to be optionally used are distributed using a transmission path B different from the transmission path A and the sub-composition information is also distributed using the transmission path B. In the example, the distribution of the main composition information is essential, but the distribution of the sub-composition information is optional.

The main composition information and the sub-composition information distributed in this way may be, for example, information illustrated in FIG. 12(b). In the main composition information in FIG. 12(b), the components c1, c2, c5, and c6 distributed using the transmission path A are described in a <components> tag and "protocolA:// . . . /sub#s1" is described as a URL (acquisition destination information) for external reference.

In a <compositions> tag, it is described that the video component c1 and the audio component c2 are simultaneously reproduced and any component indicated in "protocolA:// . . . /sub#e1" can be used. Likewise, it is described that the video component c5 and the audio component c6 are simultaneously reproduced and any component indicated in "protocolA:// . . . /sub#e2" can be used.

On the other hand, in the sub-composition information, the components c3, c4, c7, and c8 to be optionally used are described and an id of s1 is allocated to the components. When the components to be optionally used are used, a reproduction mode in which the text component c3 or c4 is used is described and an id of e1 is allocated to the reproduction mode. Likewise, when the components to be optionally used are used, a reproduction mode in which the text component c7 or c8 is used is described and an id of e2 is allocated to the reproduction mode.

Thus, the main composition information in FIG. 12(b) includes information regarding the components to be distributed using the transmission path A, and the components to be distributed using the transmission path B are described in the reference format. The main composition information is repeatedly distributed at a predetermined time interval using the transmission path A.

On the other hand, the sub-composition information in FIG. 12(b) includes information regarding the components to be distributed using the transmission path B. The sub-composition information is repeatedly distributed at a predetermined time interval using the transmission path B.

Accordingly, the reproduction client can reproduce the components distributed using the transmission path A by referring to the main composition information distributed using the same transmission path A. Further, the components to be distributed using the transmission path B can be used by referring to the sub-composition information distributed using the transmission path B.

Thus, when the components are distributed using the plurality of transmission paths, it is desirable to divide the composition information into the composition information including the information regarding the components distributed using a certain transmission path and the composition information including the information regarding the components distributed using another transmission path. Thus, this is because it is possible to reduce the amount of data per component.

In FIGS. 12(a) and (b), the main composition information and the sub-composition information including all of the information regarding the components (c1 to c4 and c5 and c8) of which reproduction time zones are different are exemplified. However, the composition information may be divided for each reproduction time zone, as in the examples of FIGS. 2 and 3. Thus, it is possible to further reduce the amount of data of each piece of composition information.

In the main composition information in FIG. 12(b), a URL ("protocolA:// . . . / . . . ") for external reference is described. That is, in this example, the components c3, c4, c7, and c8 and the sub-composition information are assumed to be distributed by protocolA using the transmission path B. Accordingly, by referring to this URL, it is possible to refer to a desired portion of the sub-composition information from the data stream of the transmission path B.

<<Example 5 of Composition Information>>

When there are a plurality of different pieces of content 18 and the composition information 17 corresponding to each piece of content is present, a parts of the information included in each piece of composition information 17 is considered to be common. In this case, by setting the common portion as one piece of sub-composition information, it is possible to reduce the amount of transmitted data more than when each piece of composition information 17 is separately distributed.

Here, an example in which a common portion of the plurality of pieces of composition information is set as one piece of sub-composition information will be described with reference to FIG. 13. FIG. 13 is a diagram illustrating data examples of two pieces of main composition information corresponding to two kinds of reproduction devices and sub-composition information common to the reproduction devices.

In the drawing, first main composition information (main1), sub-composition information, and second main composition information (main2) are illustrated. Of the information, the first main composition information is main composition information for a television and the second main composition information is main composition information for a mobile device. The sub-composition information is composition information corresponding to common components (here, text and image components are assumed as in data broadcasting in current terrestrial digital broadcasting) of the television and the mobile device.

That is, here, referring to the first main composition information and the sub-composition information, the television which is a reproduction device reproduces, for example, high-resolution AV content as in terrestrial digital broadcasting and displays data broadcasting.

Referring to the second main composition information and the sub-composition information, the mobile device which is a reproduction device reproduces, for example, low-resolution AV content as in current one-segment broadcasting and displays the components (corresponding to data broadcasting) common to those of the television. Here, since the mobile device has a low display resolution, the displayed text component common to that of the television is used. However, for a background image displayed in the background of the text, an image component different from the image component for the television is assumed to be used.

In order to realize such reproduction, in the first main composition information of the drawing, components with an id of c1 and an id of c2 are described in a <components> tag. The components are externally referred to by description of "protocolA:// . . . /sub#s1."

In a <compositions> tag, it is described that c1 which is a video component and c2 which is an audio component are simultaneously reproduced and "protocolA:// . . . /sub#p1" can be used during the reproduction.

On the other hand, in the second main composition information of the drawing, components with an id of c3 and c4 are described in a <components> tag. Thus, in the second main composition information, the target components are different from those of the first main composition information. The components are externally referred to by description of "protocolA:// . . . /sub#s1" and this description is the same as that of the first main composition information. That is, in the first main composition information and the second main composition information, the external reference destination is an "s1" portion of the same sub-composition information.

In a <compositions> tag, it is described that c3 which is a video component and c4 which is an audio component are simultaneously reproduced and "protocolA:// . . . /sub#p2" can be used during the reproduction. Here, the external reference destination is "sub", i.e., the sub-composition information of the drawing, and is the same as that of the first main composition information, but an element to be referred to is changed to p2.

In the sub-composition information of the drawing, the components c5, c6, and c7 are described and the id of "s1" is allocated to these components. As described above, s1 of the sub-composition information is referred to by the description of "protocolA:// . . . /sub#s1" in the <components> tag in both of the first main composition information and the second main composition information.

Therefore, these components are the components which can be used in both of the television using the first main composition information and the mobile device using the second main composition information.

In a <par> tag of the sub-composition information, when the components to be optionally selected are used, the id of "p1" is allocated to a reproduction mode in which c5 which is a text component and c6 which is an image component are simultaneously displayed. Likewise, when the components to be optionally selected are used, an id of "p2" is allocated to a reproduction mode in which c5 which is a text component and c7 which is an image component are simultaneously displayed.

Accordingly, the television referring to the first main composition information and the sub-composition information reproduces the components c1 and c2 (for example, corresponding to video and audio of the terrestrial digital broadcasting). For example, when a predetermined user's operation is executed during the reproduction, the television can display the components c5 and c6 (for example, corresponding to text of the data broadcasting and a television background image) to be optionally reproduced.

The mobile device referring to the second main composition information and the sub-composition information reproduces the components c3 and c4 (for example, video and audio of the one-segment broadcasting). For example, when a predetermined user's operation is executed during the reproduction, the mobile device can display the components c5 and c7 (for example, corresponding to text of the data broadcasting and a mobile background image) to be optionally reproduced.

<<Other Supplements Regarding Composition Information>>

There is a case in which an external reference URL of one piece of sub-composition information is described in a plurality of locations in one piece of main composition information. For example, the following case is considered in which the reproduction client 2 reproduces the same CM several times during reproduction of content based on the main composition information and the sub-composition information:

the components included in the content include a CM video component indicating a CM video and a CM audio component indicating a CM audio.

The sub-composition information includes a comp tag corresponding to each of the two CM components and includes a par component for causing the reproduction client to reproduce the two CM components concurrently. In the main composition information, a seq element is described and an external reference URL referring to a par element of a sub-composition element is described in a plurality of locations between a seq start tag and a seq end tag.

The seq element is described as the details of the compositions element, as in the par element and an excl element. The seq element indicates that a component corresponding to a tag described on the upper side is reproduced relatively earlier among tags (a video tag, an audio tag, and the like) surrounded by start tags and end tags. The par element indicates that a component group corresponding to tags surrounded by start tags and end tags is reproduced in parallel. The excl element indicates that a component group corresponding to tags surrounded by start tags and end tags is reproduced exclusively.

In this case, the comp tags indicating the two CM components and the par element for reproducing the CM components in parallel are originally described in the plurality of pieces of sub-composition information, but are also described in one piece of sub-composition information and a plurality of external reference URLs. Therefore, it is possible to reduce the amount of data of the composition information transmitted to the reproduction client 2 by the distribution server 1, compared to the related art.

<<Distribution Process>>

Figure 14:
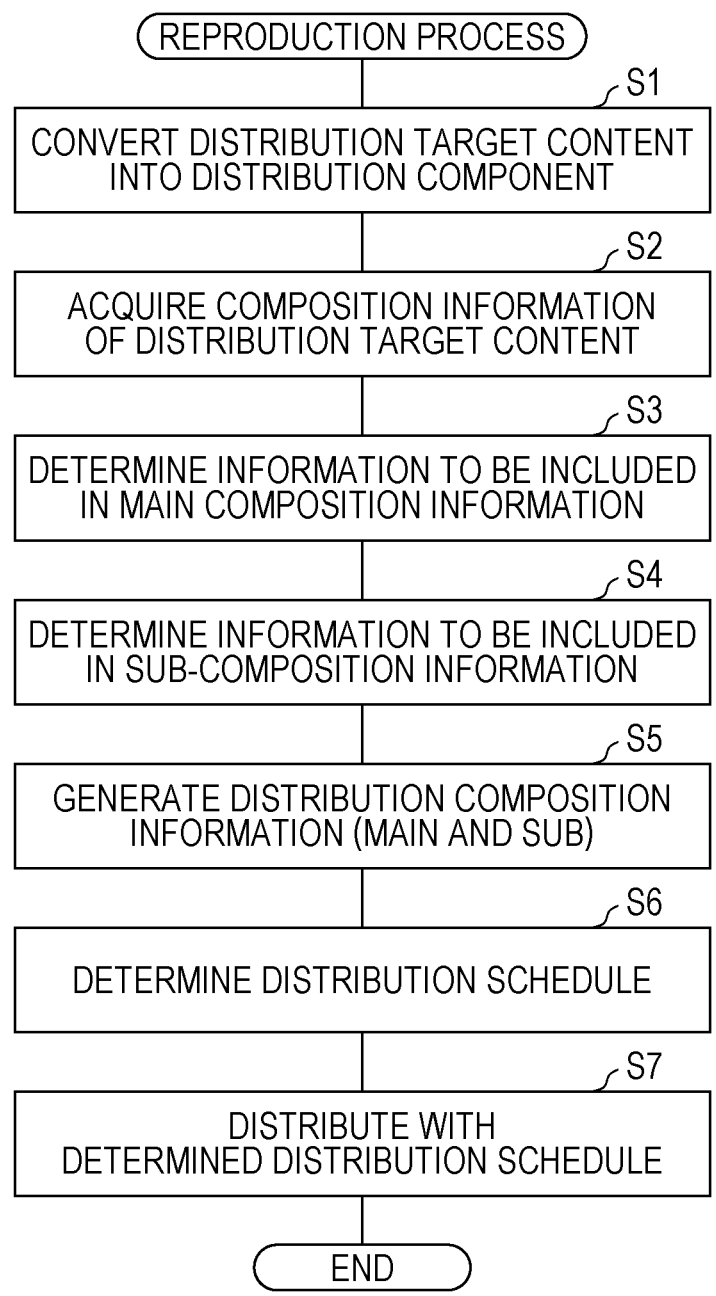
FIG. 14 is a flowchart illustrating an example of a distribution process executed when the distribution server distributes content.

Subsequently, a flow of a distribution process (distribution method) executed when the distribution server 1 distributes the content 18 will be described with reference to FIG. 14. FIG. 14 is a flowchart illustrating an example of the distribution process. Here, an example in which the composition information in FIG. 2 is distributed at the distribution timings in FIG. 3 will be first described. Next, a process when the other composition information is used will be described.

When content to be distributed is determined, the component conversion unit 13 reads the content 18 to be distributed from the server storage unit 11, converts the content into distribution components (S1), and outputs the distribution components to the distribution control unit 16.

A method of determining the content to be distributed is not particularly limited. For example, when predetermined content is decided to be distributed at a predetermined time, the content according to a time may be set as a distribution target. For example, content designated through a user's operation on the distribution server 1 may be set as a distribution target.

When the content to be distributed is determined, the composition information analysis unit 14 reads the composition information 17 corresponding to the content 18 to be distributed from the server storage unit 11 (S2). Then, the composition information 17 is analyzed to determine information to be the main composition information (S3) and to determine information to be the sub-composition information (S4). Then, the composition information analysis unit 14 notifies the composition information generation unit 15 of information determined to be described in the sub-composition information among the information included in the composition information 17.

Specifically, the composition information analysis unit 14 determines the information indicating the components described in the <components> tag and the information indicating the reproduction mode described in the <compositions> tag to be set as the sub-composition information among the information included in the composition information 17. The information other than the above information is determined to be set as the main composition information.

Next, the composition information generation unit 15 generates the main composition information and the sub-composition information according to the notification from the composition information analysis unit 14 (S5: composition information generation step).

Specifically, the composition information generation unit 15 rewrites the information determined to be described in the sub-composition information in the format referring to the sub-composition information among the information described in the composition information 17 to generate the main composition information. The information determined to be described in the sub-composition information is described in the sub-composition information along with identification information (id) allocated to be referred to from the main composition information.

The information determined to be described in the sub-composition information is described as the sub-composition information with a new version whenever the composition information 17 is analyzed in a distribution time order and a change in the details occurs. Even when the changed details are part of the information determined to be described in the sub-composition information, it is desirable to generate the sub-composition information in which all of the information determined to be described in the sub-composition information are described. By realizing such composition, normal reproduction can continue with the sub-composition information received after cancellation of a trouble even when part of the sub-composition information is not distributed to the reproduction client 2 by reason of the temporary network trouble or the like.

Figure 16:
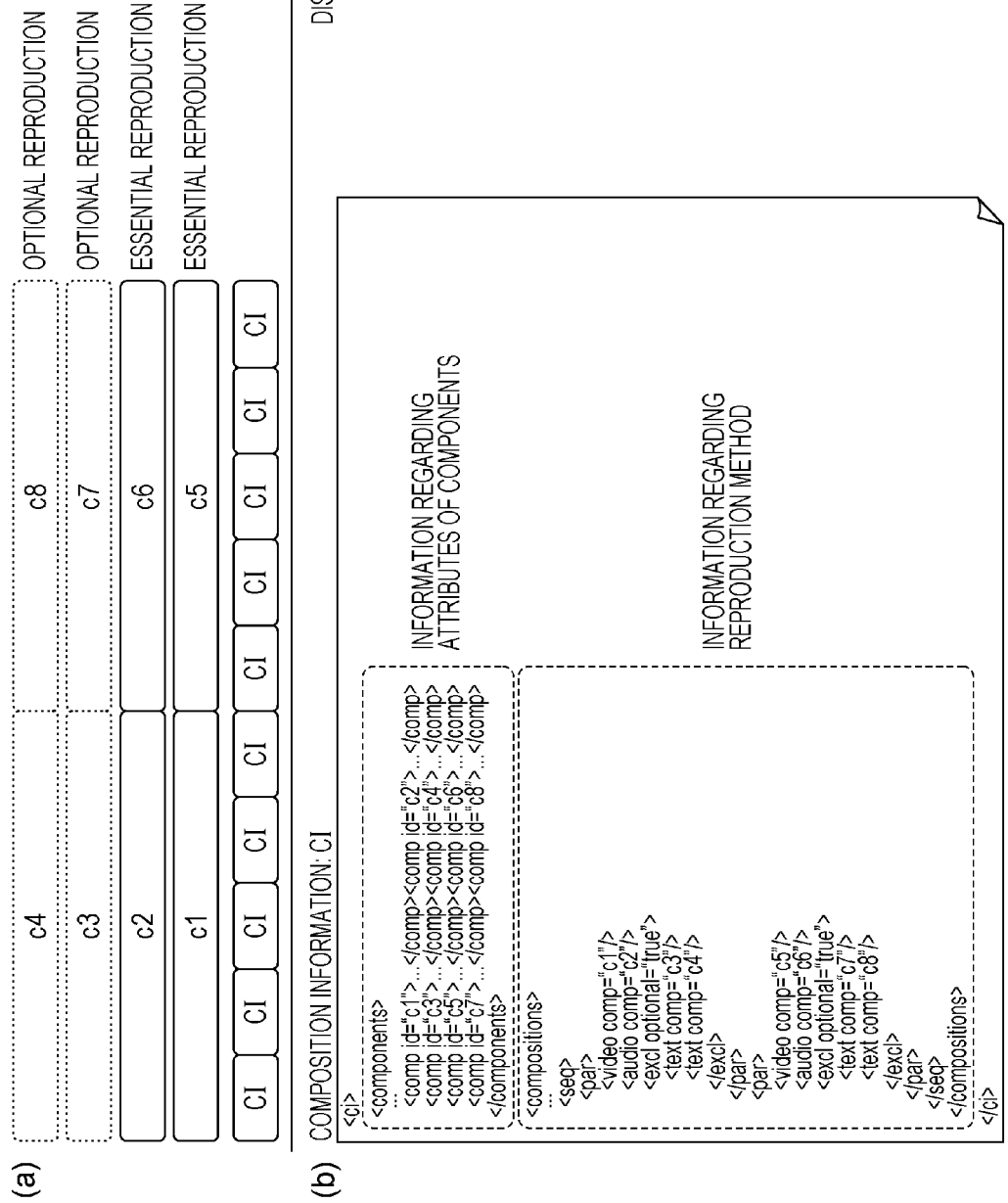
FIG. 16 is a diagram for describing components and composition information in MPEG MMT, where

Through the above-described process, the main composition information and the sub-composition information with version 1 and version 2 illustrated in FIG. 2 are generated from the composition information illustrated in FIG. 16(*b*). Then, the composition information generation unit 15 outputs the generated main composition information and sub-composition information to the distribution control unit 16.

Next, the distribution control unit 16 determines a distribution schedule of the components generated by the component conversion unit 13 and the main composition information and the sub-composition information generated by the composition information generation unit 15 (S6).

Specifically, the distribution control unit 16 determines the same timing as the reproduction start time of the first reproduced component or a timing previous to the reproduction start time as the first distribution timing of the main composition information. Then, a timing after a predetermined time from the first distribution timing or a timing (see t3 of FIG. 3) at which the composition of the component to be reproduced is changed is determined as the distribution timing of the subsequent main composition information.

For the sub-composition information expected to be updated more frequently than the main composition information because the sub-composition information indicates a specific component and its reproduction mode, a distribution timing is set to have a time interval shorter than that of the main composition information so that the sub-composition information is distributed more frequently than the main composition information. A timing at which the version of the sub-composition information is changed is set to a timing at which the composition of the component to be reproduced is changed (see t3 of FIG. 3).

Likewise, for the sub-composition information expected to be updated less frequently than the main composition information, a distribution timing is set to have a time interval longer than that of the main composition information so that the sub-composition information is distributed less frequently than the main composition information. A timing at which the version of the sub-composition information is changed is set to a timing at which the composition of the component to be reproduced is changed. As another criterion for setting the update frequency, for example, significance of each component, e.g., a point such as essential or optional reproduction of the included component, can be exemplified. When the main composition information includes the components to be essentially reproduced, the main composition information is distributed at a high frequency. Conversely, when the sub-composition information includes only the components to be optionally reproduced (allowed not to be reproduced), the distribution frequency is configured to be low.

Finally, the distribution control unit 16 distributes the components and the composition information (the main composition information and the sub-composition information) to the reproduction client 2 through the server communication unit 12 in the distribution schedule determined in the foregoing way (S7: distribution control step), and the distribution process accordingly ends.

<Distribution Process when Composition Information in FIG. 5 is Distributed at Distribution Timings in FIG. 6>

When the composition information in FIG. 5 is distributed at the distribution timings in FIG. 6, the composition information analysis unit 14 determines the components with relatively high significance among the components described in the <components> tag as the information described in the first sub-composition information in S4 of FIG. 14. Then, the other components with relatively low significance are determined as the information described in the second sub-composition information.

The components with high significance may be decided in advance according to the attributes or the like. For example, the components (for example, a component of a main video and a component of a sub-video) with attributes such as "audio" and "video" may be decided as the components with high significance and the component (for example, a subtitle component) with an attribute such as "text" may be decided as the component with low significance.

The components to be essentially reproduced may be determined as the components with high significance. In this case, the components which are "optional" in the <compositions> tag of the composition information 17 are determined as the component with low significance, and information regarding the components is determined as information described in the second sub-composition information. The other components are determined as the components with high significance, and information regarding the components is determined as the information described in the first sub-composition information.

In S6, the distribution control unit 16 determines the distribution schedule so that the distribution frequency of the first sub-composition information is the highest, the distribution frequency of the second sub-composition information is the next highest, and the distribution frequency of the main composition information is the lowest.

<Distribution Process when Composition Information in FIG. 8 is Distributed at Distribution Timings in FIG. 9>

When the composition information in FIG. 8 is distributed at the distribution timings in FIG. 9, the composition information analysis unit 14 determines the components described in the <components> tag as the information described in the first sub-composition information in S4 of FIG. 14.

Further, layout1 is determined as the information described in the second sub-composition information and information included in the second sub-composition information with version 1 to version 3 according to a temporal change of layout1 is determined. Specifically, in version 1, it is determined that information described as a default layout of layout1 is described. In version 2, it is determined that information described in layout3 is described. In version 3, it is determined that information described as the default layout is described. Which layout is described in each version may be selected by a service provider executing distribution of the content using the distribution server 1 or may be automatically selected based on a preset condition.

In S6, the distribution control unit 16 determines the distribution timing of the first sub-composition information as in the sub-composition information in FIG. 3. The distribution timings of the second sub-composition information with version 1 to version 3 are determined so that the second sub-composition information is distributed at a timing at which layout1 is changed.

That is, a distribution timing of version 1 which is a selection candidate simultaneously with reproduction start of a component is set to be the same timing as the distribution time of the component or a timing previous to the distribution time. A distribution timing of version 2 is determined so that the distribution is completed at t1 which is a time at which layout1 is first changed and a distribution timing of version 3 is determined so that the distribution is completed at a time t2 at which the layout is changed subsequently.

<Distribution Process when Composition Information in FIG. 10(*b*) is Distributed at Distribution Timings in FIG. 10(*a*)>

When the composition information in FIG. 10(*b*) is distributed at the distribution timings in FIG. 10(*a*), the composition information analysis unit 14 determines the information described in each of the main composition information and the sub-composition information in S3 and S4 of FIG. 14, as in the case in which the composition information in FIG. 2 is generated.

Next, the composition information generation unit 15 generates the main composition information and the sub-composition information which each include the information determined in S3 and S4. The information for referring to the sub-composition information is described in the main composition information. Further, the base URL for acquiring the sub-composition information from a predetermined protocol (protocolA in the example of FIG. 10) and the base URL for acquiring the main composition information and the sub-composition information by HTTP are described in the main composition information.

In S6, the distribution control unit 16 determines to distribute the main composition information and the sub-composition information along with the components by the predetermined protocol. The distribution control unit 16 acquires the main composition information and the sub-composition information by the URL described in the main composition information. For example, when the described URL is not the URL of the distribution server 1, the main composition information and the sub-composition information are uploaded to a storage destination indicated by the URL.

<Distribution Process when Composition Information in FIG. 12(*b*) is Distributed at Distribution Timings in FIG. 12(*a*)>

When the composition information in FIG. 12(*b*) is distributed at the distribution timings in FIG. 12(*a*), the distribution server 1 includes a communication unit to distribute the composition information using the transmission path (transmission path B) different from the transmission path (transmission path A) used by the server communication unit 12.

In this case, in S3 and S4 of FIG. 14, the composition information analysis unit 14 determines the information regarding the components to be essentially reproduced as the information described in the main composition information. Further, the information regarding the components to be optionally reproduced is determined as the information described in the sub-composition information.

In S6, the distribution control unit 16 determines that the main composition information for reproducing the components to be essentially reproduced is distributed using the transmission path (transmission path A) along which the components are transmitted. Further, it is determined that the sub-composition information for reproducing the components to be optionally reproduced is distributed using the transmission path (transmission path B) along which the components are transmitted.

The distribution cycle of the main composition information and the sub-composition information is not particularly limited, but may be a predetermined cycle irrespective of the corresponding components, or the cycle may be changed according to the attribute of the component.

In S3 and S4, the composition information analysis unit 14 may determine the information regarding significant components as the information described in the main composition information and determine information regarding the other components as the information described in the sub-composition information. In S6, the distribution control unit 16 may determine that the main composition information for reproducing the significant components is distributed using the transmission path (transmission path A) along which the components are transmitted and determine that the sub-composition information for reproducing the other components is distributed using the transmission path (transmission path B) along which the other components are transmitted.

<Distribution Process when Composition Information in FIG. 13 is Distributed>

When the composition information in FIG. 13 is distributed, each of two pieces of content (first content and second content) to be distributed is converted into the distribution component (S1) and the composition information (the first composition information and the second composition information) of each piece of content is acquired (S2).

Next, the composition information analysis unit 14 determines the information commonly included in both of the pieces of composition information as the sub-composition information and determines the other information as the main composition information (S3 and S4). The sub-composition information may include not only the information commonly included in both of the pieces of composition information but also, for example, information specifying the components to be reproduced or information indicating the reproduction mode of the components, as in other examples.

Then, the composition information generation unit 15 rewrites the information determined to be set as the sub-composition information among the information described in the composition information of each piece of content in the reference format to generate the main composition information (first reference format composition information and second reference format composition information) corresponding to each of the composition information of each piece of content. Further, the information determined to be set as the sub-composition information is generated as the sub-composition information (S5). At this time, the composition information generation unit 15 attaches a common id ("s1" of FIG. 13) to the information commonly referred to from the two pieces of generated main composition information in the sub-composition information, using the three pieces of composition information.

Finally, the distribution control unit 16 determines the distribution schedule of the two pieces of main composition information, the one piece of sub-composition information, and the two pieces of content to be distributed (S6) and distributes the composition information and the components according to the determined schedule (S7).

For example, when high-resolution content for a television as in terrestrial digital broadcasting and low-resolution content for a mobile device as in the one-segment broadcasting are each distributed and information regarding, for example, a text component and an image component common to both pieces of content as in data broadcasting is set as the sub-composition information, the high-resolution content for the television and the main composition information corresponding to the high-resolution content may be multiplexed and repeatedly distributed. Likewise, the low-resolution content for the mobile device and the main composition information corresponding to the low-resolution content may be multiplexed and repeatedly distributed. When the text component and the image component are distributed with data carousel as in data broadcasting of the digital broadcasting, the distribution frequency of the sub-composition information may be decreased by distributing the sub-composition information regarding the components according to a distribution frequency of the data carousel.

<<Reproduction Process>>

Figure 15:
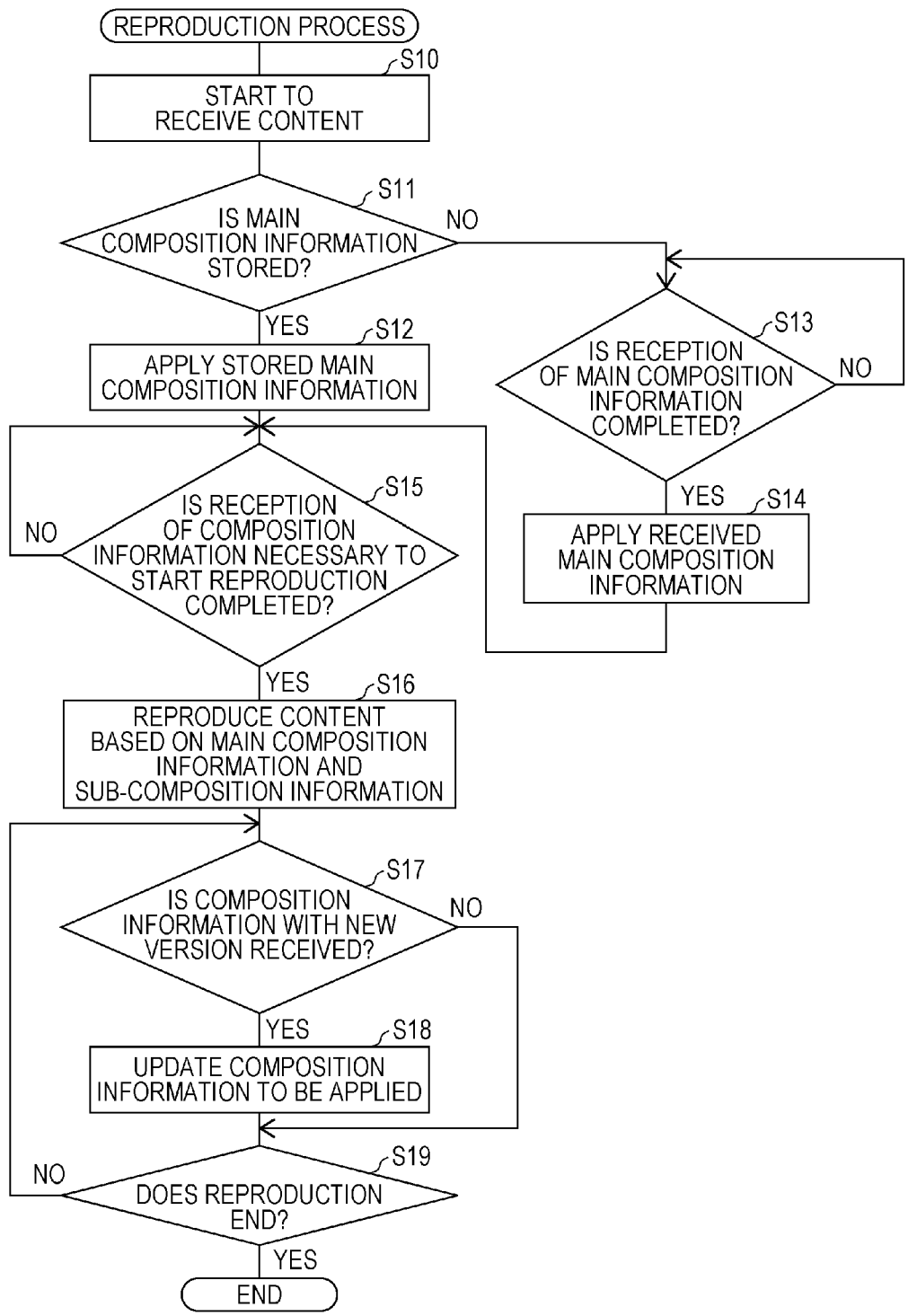
FIG. 15 is a flowchart illustrating an example of a reproduction process executed when the reproduction client reproduces the content.

Subsequently, the flow of a reproduction process executed when the reproduction client 2 reproduces the content 18 will be described with reference to FIG. 15. FIG. 15 is a flowchart illustrating an example of the reproduction process. Here, an example of the reproduction based on the composition information in FIG. 2 distributed at the distribution timings in FIG. 3 will be first described. Next, a process when the other composition information is used will be described.

The client communication unit 22 starts to receive the content 18 distributed by the distribution server 1 (S10) and stores the received content 18 in the received-data storage unit 26. The content 18 is received and stored as the stream data including the composition information, as in FIG. 4.

When the content 18 starts to be stored in the received-data storage unit 26, the reproduction control unit 23 confirms that the main composition information for reproducing the content 18 is stored in the client storage unit 21 (S11). The main composition information may be common between the plurality of kinds of content. In this case, when the main composition information used to reproduce another content different from the content 18 is stored, this main composition information can be applied.

Here, when it is confirmed that the composition information 25 is stored in the client storage unit 21 (YES in S11), the reproduction control unit 23 determines to apply the main composition information included in the stored composition information 25 to the reproduction of the content 18 (S12) and the process proceeds to the process of S15.

Conversely, when it is confirmed that the composition information 25 is not stored in the client storage unit 21 (NO in S11), the reproduction control unit 23 confirms whether the received main composition information is stored in the received-data storage unit 26 (S13).

When it is confirmed that the main composition information is stored in the received-data storage unit 26 (YES in S13), the reproduction control unit 23 determines to apply the received main composition information to the reproduction of the content 18 (S14) and the process proceeds to the process of S15.

In S15, the reproduction control unit 23 confirms whether the reception of the main composition information and the sub-composition information necessary to start the reproduction is completed. Whether the reception of the composition information necessary to start the reproduction is completed can be determined by referring to the main composition information determined to be applied in S12 or S14.

That is, in the main composition information in FIG. 2, one piece of sub-composition information is referred to. Therefore, when the sub-composition information of the reference destination is stored in the received-data storage unit 26, it can be determined that the reception of the composition information necessary to start the reproduction is completed. When the sub-composition information is not stored, it can be determined that the reception of the composition information is not completed.

When the reception of the composition information necessary to start the reproduction is not completed in S15 (NO in S15), the process of S15 is repeated. However, when the main composition information with a different version is received while repeatedly executing the process of S15, whether the reception of the main composition information and the sub-composition information necessary to start the reproduction is completed is determined based on this main composition information.

When it is confirmed that the reception of the composition information necessary to start the reproduction is completed in S15 (YES in S15), the reproduction control unit 23 causes the reproduction unit 24 to start the reproduction of the content 18 based on the main composition information and the sub-composition information (S16).

Specifically, the reproduction control unit 23 specifies the portion set in the reference format with the main composition information in the sub-composition information of the reference destination and acquires information such as a combination of the components necessary to reproduce the content 18. Then, the content 18 is reproduced by notifying the reproduction unit 24 of the components to be reproduced and the reproduction mode according to the acquired information.

The reproduction control unit 23 confirms whether the composition information of a new version is received during the reproduction of the content 18 (S17). As described with reference to FIG. 4, whether the composition information with the new version is received is preferably specified with reference to the header of the payload.

Here, when the reception of the composition information with the new version is not confirmed (NO in S17), the process proceeds to the process of S19. Conversely, when the reception is confirmed (YES in S17), the reproduction control unit 23 updates the composition information to be applied to the composition information with the new version (S18).

Specifically, when the composition information with the new version is received, the main composition information with the new version is applied instead of the main composition information determined to be applied in S12 or S14. When the sub-composition information with the new version is received, the sub-composition information with the new version is applied instead of the sub-composition information with the previous version.

Thereafter, the reproduction control unit 23 determines whether the reproduction of the content 18 ends (S19). When the reproduction of the content 18 ends (YES in S19), the reproduction unit 24 is notified of the end of the reproduction, the reproduction ends, and the reproduction process ends. Conversely, when the reproduction of the content 18 does not end (NO in S19), the process returns to the process of S17.

<Reproduction Process when Composition Information in FIG. 5 is Distributed at Distribution Timings in FIG. 6>

When the composition information in FIG. 5 is distributed at the distribution timings of FIG. 6, the reproduction control unit 23 confirms whether the reception of all of the sub-composition information necessary to start the reproduction is completed among all of the sub-composition information in S15 of FIG. 15.

This is because the composition information in FIG. 5 includes the second sub-composition information corresponding to the components to be optionally reproduced, and thus the reproduction can start despite the fact that the second sub-composition information is not received when the first sub-composition information is received.

<Reproduction Process when Composition Information in FIG. 8 is Distributed at Distribution Timings in FIG. 9>

When the composition information in FIG. 8 is distributed at the distribution timings in FIG. 9, the reproduction control unit 23 determining the main composition information to be applied in S12 or S14 of FIG. 15 causes the user to select a layout.

Here, when layout2 or layout3 which can be used without the use of the second sub-composition information is selected, the reproduction control unit 23 determines that the reception of all of the sub-composition information necessary to start the reproduction is completed at the time of the confirmation of the reception of the first sub-composition information (YES in S15), and the process proceeds to the process of S16.

Conversely, when layout1 in which the second sub-composition information is necessary is selected, the reproduction control unit 23 determines that the reception of all of the sub-composition information necessary to start the reproduction is completed at the time of the confirmation of the reception of both of the first sub-composition information and the second sub-composition information (YES in S15), and the process proceeds to the process of S16.

Thereafter, the second sub-composition information with version 2 distributed at the time t1 is received (YES in S17), the reproduction control unit 23 updates the second sub-composition information to be applied to version 2. Thus, the display layout of the content 18 is changed. The second sub-composition information to be applied is similarly updated to version 3 even at the time t3, and thus the display layout is changed.

<Reproduction Process when Composition Information in FIG. 10(b) is Distributed at Distribution Timings in FIG. 10(a)>

When the composition information in FIG. 10(b) is distributed at the distribution timings in FIG. 10(a) and the reception of all of the sub-composition information necessary for the reproduction is not confirmed in S15 (NO in S15), the reproduction control unit 23 acquires the sub-composition information on demand.

Specifically, the reproduction control unit 23 makes a request to transmit the sub-composition information using the URL described in the main composition information and acquires the sub-composition information transmitted in response to the transmission request, and then the process proceeds to the process of S16.

The request to transmit the composition information may be executed by a functional block different from the reproduction control unit 23, although not illustrated in FIG. 1. The request to transmit the composition information may not be executed and the reception of the sub-composition information distributed at a predetermined cycle in protocolA may wait.

<Reproduction Process when Composition Information in FIG. 12(b) is Distributed at Distribution Timings in FIG. 12(a)>

When the composition information in FIG. 12(b) is distributed at the distribution timings in FIG. 12(a), the content starts to be received using the transmission paths A and B in S10. Of course, the reception start timings of the content along the transmission paths A and B may differ or the reception of the content along the transmission path B may be executed on demand.

In this case, the reproduction control unit 23 specifies that either of the information described in the sub-composition information is the information regarding the components to be optionally reproduced from the "optional" description of the main composition information determined to be applied in S12 or S14. Then, whether the components to be optionally reproduced are reproduced is determined based on a user's input or the like.

Here, when it is determined that the components to be optionally reproduced are reproduced, the reception of the sub-composition information necessary to reproduce the components to be optionally reproduced is completed (YES in S15), and then the content is reproduced based on the main composition information and the sub-composition information (S16). Conversely, when it is determined that the components to be optionally reproduced are not reproduced, it is determined that the reproduction can start with only the main composition information (S15) and the content is reproduced based on the main composition information (S16).

<Reproduction Process when Composition Information in FIG. 13 is Distributed>

When the composition information in FIG. 13 is distributed, one piece of main composition information is distributed to one reproduction device (for example, the reproduction client 2) and the other piece of main composition information is distributed to the other reproduction device. Therefore, the reproduction process in each reproduction device is the same as that when the composition information in FIG. 2 or the like is used.

The present invention is not limited to the above-described embodiment, but various modifications can be made within the scope of the claims. That is, embodiments obtained by combining technical means appropriately changed from the scope of the claims are also included in the technical scope of the present invention.

Second Embodiment

Next, a content transmission/reception system according to another embodiment of the present invention will be described.

The content transmission/reception system according to the embodiment is a system including a main distribution server 1, one or more sub-distribution servers, and a reproduction client.

A distributor stores newly uploaded content in the one or more distribution servers. Specifically, all of the components included in the content are stored in the main distribution server in some cases or all of the components are distributed and stored in the main distribution server and the one or more sub-distribution servers in some cases.

In the embodiment, when the reproduction client transmits a content request to the main distribution server, the main distribution server specifies one or more distribution servers associated with the supply of content (hereinafter also referred to as "distribution target content"). Then, the main distribution server notifies each of the specified distribution servers of the address of the reproduction client. The specified address may be information uniquely specifying the reproduction client or may be information logically typifying a plurality of reproduction clients as in a domain. Each distribution server establishes connection with the reproduction client to distribute composition information regarding the distribution target content and to distribute a component group included in the distribution target content to the reproduction client.

The reproduction client specifies a component group to be reproduced based on main composition information and sub-composition information received from the one or more distribution servers associated with the supply of the distribution target content, and acquires and reproduces only the component group specified among the distributed component groups.

Figure 17:
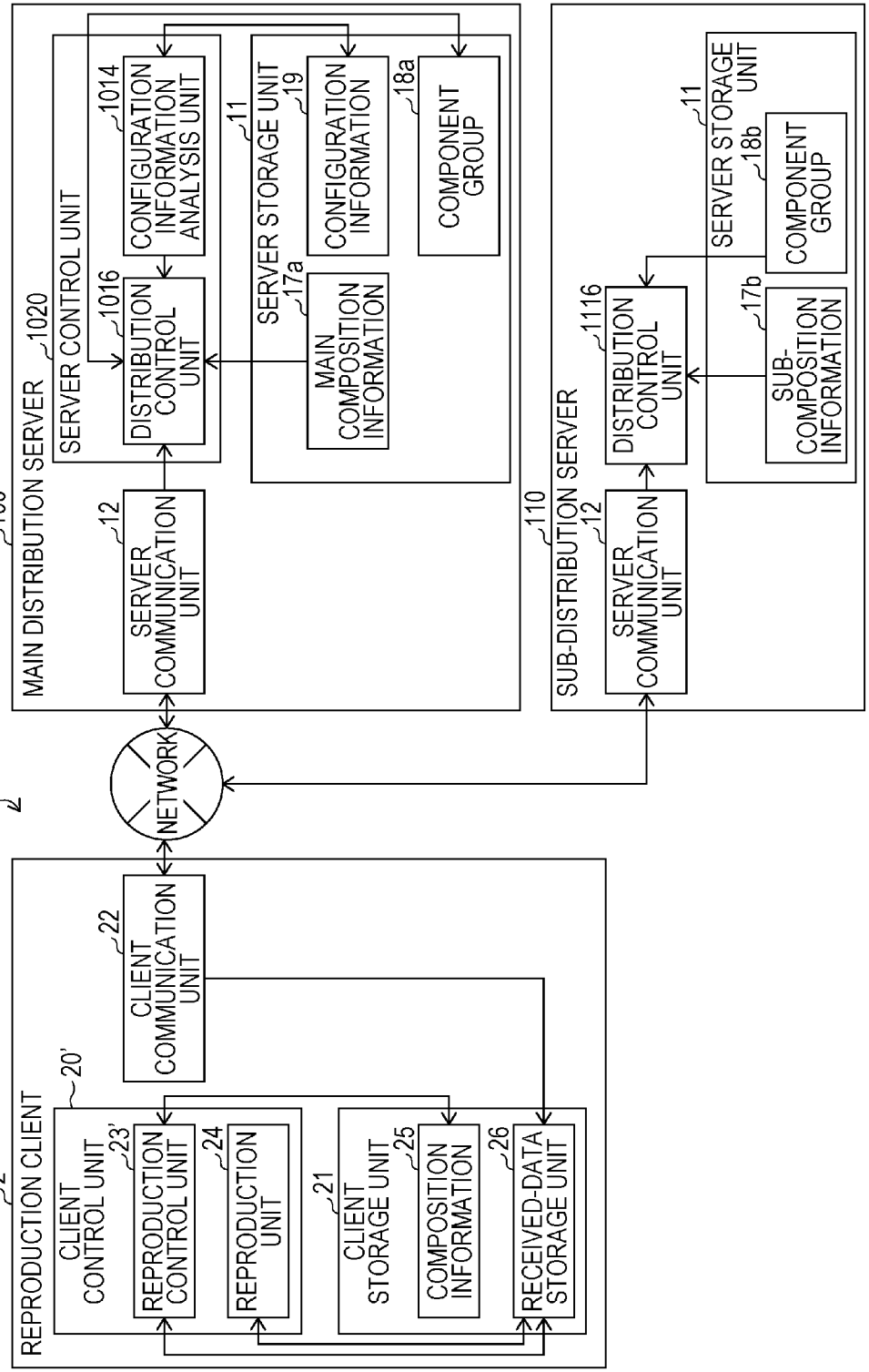
FIG. 17 is a diagram illustrating another embodiment of the present invention and is a block diagram illustrating the configurations of main units of two distribution servers and a reproduction client included in a content transmission/reception system.

The configuration of the content transmission/reception system according to the embodiment will be described with reference to FIG. 17. FIG. 17 is a block diagram illustrating the configuration of main units of a main distribution server 100, a sub-distribution server 110, and a reproduction client 2' included in a content transmission/reception system 300. In the drawing, only the sub-distribution server 110 is illustrated as the sub-distribution server. However, the content transmission/reception system also includes other sub-distribution servers having the same configuration as the sub-distribution server 110.

As illustrated, the content transmission/reception system 300 has a configuration in which the main distribution server 100, the sub-distribution server 110, and the reproduction client 2' are connected via a network. Although not illustrated, the other sub-distribution servers are also connected to the network.

The main distribution server 100 is a device that distributes content and serves to generally control each sub-distribution server, as necessary. The main distribution server 100 serves to receive a request to distribute content from the reproduction client 2'.

The main distribution server 100 includes a server control unit 1020 which generally controls functions of the main distribution server 100, a server storage unit 11 which stores data to be used in the main distribution server 100, and a server communication unit 12 through which the main distribution server 100 executes communication with an external device. The server control unit 1020 includes a configuration information analysis unit 1014 and a distribution control unit 1016. In the server storage unit 11, main composition information 17a regarding content, a component group 18a included in the content, and configuration information 19 regarding the content are stored for each piece of content which can be distributed in the content transmission/reception system 300. The main composition information 17a includes only information for reproducing all or some of the component groups 18a as information for reproducing components. In the configuration information 19 regarding the content, a URL of each distribution server associated with the distribution of the content is described.

The configuration information analysis unit 1014 acquires and analyzes the configuration information 19 stored in the server storage unit 11 and specifies the sub-distribution server associated with the distribution of the distribution target content based on the configuration information 19.

The distribution control unit 1016 controls the distribution of the distribution target content. Specifically, the distribution control unit 1016 establishes connection of each sub-distribution server specified by the configuration information analysis unit 1014 with the reproduction client 2' and requests each sub-distribution server to distribute the sub-composition information and the component group 18b of the distribution target content stored in the sub-distribution server to the reproduction client 2'.

The distribution control unit 1016 distributes the main composition information 17a of the server storage unit 11 to the reproduction client 2' through the server communication unit 12. The distribution control unit 1016 distributes the component group 18a of the server storage unit 11 through the server communication unit 12.

The sub-distribution server 110 is a device that distributes content as in the main distribution server 100, and receives an instruction from the main distribution server 100 and distributes the component group included in the distribution target content and the sub-composition information regarding the distribution target content to the reproduction client 2'.

The sub-distribution server 110 includes a server storage unit 11 which stores data to be used in the sub-distribution server 110, a server communication unit 12 through which the sub-distribution server 110 executes communication with an external device, and a distribution control unit 1116. In the server storage unit 11, sub-composition information 17b regarding content and a component group 18b included in the content are stored for each piece of content which can be distributed by the sub-distribution server 110. The sub-composition information 17b includes only information for reproducing all or some of the component groups 18b as information for reproducing components.

The distribution control unit 1116 controls the distribution of the distribution target content. Specifically, the distribution control unit 1116 determines a distribution schedule of the sub-composition information 17b and sequentially distributes the sub-composition information 17b in the server storage unit 11 to the reproduction client 2' through the server communication unit 12 according to the determined distribution schedule. The distribution control unit 1116 distributes the component group 18b of the server storage unit 11 through the server communication unit 12.

On the other hand, the reproduction client 2' is a device which receives and reproduces content and includes a client control unit 20' which generally controls functions of the reproduction client 2', a client storage unit 21 which stores data to be used in the reproduction client 2', and a client communication unit 22 through which the reproduction client 2' executes communication with an external device. The client control unit 20' includes a reproduction control unit 23' and a reproduction unit 24. The client storage unit 21 stores composition information 25 and includes a received-data storage unit 26. That is, the reproduction client 2' is different from the reproduction client 2 in that the reproduction control unit 23' is included as a reproduction control unit.

The reproduction control unit 23' generally controls reproduction of content. Specifically, the reproduction control unit 23' analyzes the main composition information and the sub-composition information (for example, the main composition information 17a and the sub-composition information 17b) distributed from one or more distribution servers (for example, the main distribution server 100 and the sub-distribution server 110) associated with the distribution of the distribution target content and causes the reproduction unit 24 to reproduce the distribution target content based on the analysis result.

Specifically, the reproduction control unit 23' records the main composition information as the composition information 25 in the client storage unit 21. The reproduction control unit 23' records only the component group determined to be a reproduction target among the distributed component groups based on the composition information 25 in the client storage unit 21 and reproduces the component group.

When the reproduction control unit 23' receives the sub-composition information before the reproduction of the content or during the reproduction of the content, the reproduction control unit 23' updates the composition information 25 of the client storage unit 21 using the sub-composition information. When the composition information 25 is updated, the reproduction target component group is specified based on the updated composition information 25 and only the specified component group is stored in the client storage unit 21 and is reproduced among the distributed component groups.

The configuration of the content transmission/reception system 300 has been described above. In the following description of the embodiment, it is assumed that the main distribution server 100 distributes some components included in the distribution target content and the main composition information and the sub-distribution server 110 distributes the remaining components included in the distribution target content and the sub-composition information. That is, the component group 18a corresponds to some of the components described above and the component group 18b corresponds to the remaining components.

<<Main Composition Information and Sub-Composition Information>>

In the main composition information distributed in the content transmission/reception system 300, id attributes are assigned to a components element, a par element, and a seq element. The id attributes are attributes referred to when the reproduction control unit 23' updates the main composition information to the composition information 25 using the sub-composition information.

In the sub-composition information distributed in the content transmission/reception system 300, an insert element having a ref_id attribute is described. In regard to each of the described insert elements, the reproduction control unit 23' adds the details of the insert element to an element in the main composition information to which the id attribute with the same attribute value as the ref_id attribute is assigned. That is, the id attribute indicates an updatable (insertable) portion in the main composition information.

For example, when the reproduction control unit 23' receives the main composition information illustrated in FIG. 18(a) from the main distribution server 100 and receives the sub-composition information illustrated in FIG. 18(b) from the sub-distribution server 110, the reproduction control unit 23' executes the following processes:

adding a comp element of which an attribute value of the id attribute is "c3" as the details of the components element of which an attribute value of the id attribute in the main composition information is "cpn1"; and adding a text element of which an attribute value of the comp attribute is "c3" as the details of the par element of which an attribute value of the id attribute in the main composition information is "par1."

As a result, the reproduction control unit 23' updates the main composition information to the composition information 25 illustrated in FIG. 18(c). Then, when the reproduction control unit 23' receives the sub-composition information in FIG. 18(b) before the reproduction of the content or during the reproduction of the content, the reproduction control unit 23' newly reproduces the text component of the sub-distribution server corresponding to the text element of which the attribute value of the comp attribute is "c3" concurrently with the components of the main distribution server.

Likewise, when the reproduction control unit 23' receives the main composition information illustrated in FIG. 19(a) from the main distribution server 100 and receives the sub-composition information illustrated in FIG. 19(b) from the sub-distribution server 110, the reproduction control unit 23' executes the following processes:

adding two comp elements of which attribute values of the id attribute are "c3" and "c4" to the ending of the details of the components element of which an attribute value of the id attribute in the main composition information is "cpn1"; and adding par elements including, as the details, a video element of which an attribute value of the comp attribute is "c3" and an audio element of which an attribute value of the comp attribute is "c4" as the details of the seq element of which an attribute value of the id attribute in the main composition information is "seq1."

As a result, the reproduction control unit 23' updates the main composition information to the composition information 25 illustrated in FIG. 19(c). When the reproduction control unit 23' receives the sub-composition information in FIG. 19(b) before the reproduction of the content or during the reproduction of the content, the reproduction control unit 23' completes the reproduction of the components from the main distribution server based on the composition information 25 in FIG. 19(c), and then reproduces the components distributed from the sub-distribution server, i.e., a video component corresponding to the video element of which the attribute value of the comp attribute is "c3" and an audio component corresponding to the audio element of which the attribute value of the comp attribute is "c4", in parallel.

When the reproduction control unit 23' executes the process of adding the elements described in the sub-composition information as the details of the seq element on the main composition information, the added element is added such that the added element necessarily comes in the ending of the details of the seq element. For example, when the main composition information illustrated in FIG. 20(a) is received from the main distribution server 100 and the sub-composition information illustrated in FIG. 20(b) is received from the sub-distribution server 110, the video element is added such that the video element of which the attribute value of the comp attribute is "c3" comes in the ending of the details of the seq element of which the attribute value of the id attribute is "seq1."

Accordingly, when another piece of sub-composition information including the element added as the details of the seq element is distributed from the distribution server, the details of the composition information 25 differ according to order in which the reproduction client 2' receives the sub-composition information. For example, first sub-composition information including the video element corresponding to the video component to be first reproduced and second sub-composition information including the video element corresponding to the video component to be subsequently reproduced are distributed in order in some cases. In these cases, when a distribution path of the first sub-composition information is different from a distribution path of the second sub-composition information, the reproduction client 2' sometimes receives the second sub-composition information first.

When the second sub-composition information is received first, two video elements are added as the details of the seq element. However, the video element corresponding to the video component to be first reproduced may be added immediately after the video element corresponding to the video component to be subsequently reproduced. As a result, the reproduction control unit 23' may reproduce the video components in an order unintended by a content distributor.

For this reason, it is desirable to include a layer attribute indicating an update processing order in ci elements of the main composition information and the sub-composition information. For example, it is desirable to set composition information illustrated in FIG. 21(a) as the main composition information, and set composition information in FIG. 21(b) and composition information in FIG. 21(d) as the sequentially distributed sub-composition information.

When the layer attribute is included in the distributed composition information, the reproduction control unit 23' uses the sub-composition information of which an attribute value of the layer attribute is i in a process of updating i-th composition information 25.

For example, when the main composition information in FIG. 21(a) received from the main distribution server 100 is recorded in the client storage unit 21 and the sub-composition information in FIG. 21(b) is received first, the main composition information in FIG. 21(a) is updated to the composition information 25 in FIG. 21(c) immediately after use of the received sub-composition information. Thereafter, when the sub-composition information in FIG. 21(d) is received, the composition information 25 in FIG. 21(c) is updated to the composition information 25 in FIG. 21(e) immediately after use of the received sub-composition information.

Conversely, when the main composition information in FIG. 21(a) received from the main distribution server 100 is recorded in the client storage unit 21 and the sub-composition information in FIG. 21(d) is received first, the sub-composition information is recorded in the client storage unit 21 until execution of the update process using the sub-composition information of which an attribute value of the layer attribute is "1." Thereafter, when the sub-composition information in FIG. 21(b) is received, the update process is executed first using the sub-composition information in FIG. 21(b), and then the update process is executed using the sub-composition information in FIG. 21(d).

Thus, even when the reproduction control unit 23' first receives either of the pieces of sub-composition information, the reproduction control unit 23' updates the main composition information in FIG. 21(a) to the same composition information 25 in FIG. 21(e). Accordingly, the reproduction client 2' necessarily reproduces the video components in the order intended by the content distributor.

<<Modification Example 300a of Content Transmission/Reception System 300>>

As described above, the content transmission/reception system 300 executes the process illustrated in FIG. 22(a), and then the reproduction client 2' starts to reproduce the content. However, a content transmission/reception system 300a can execute the processes according to the present invention.

Figure 23:
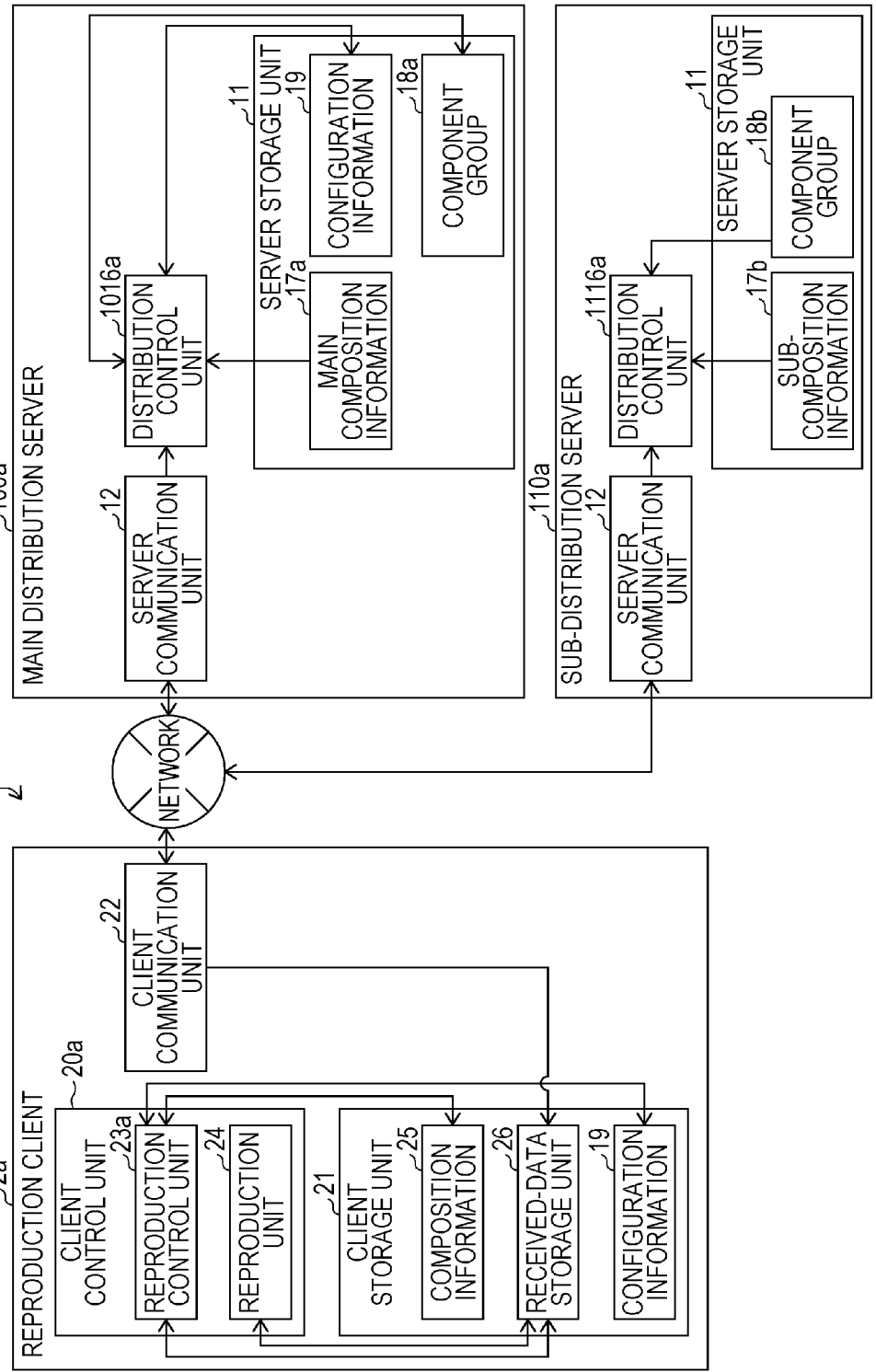
FIG. 23 is a diagram illustrating another embodiment of the present invention and is a block diagram illustrating the configurations of main units of two distribution servers and a reproduction client included in a content transmission/reception system.

The content transmission/reception system 300a will be described with reference to FIGS. 22 and 23. FIG. 23 is a block diagram illustrating the configurations of main units of a main distribution server 100, a sub-distribution server 110, and a reproduction client 2a included in the content transmission/reception system 300a. In the drawing, only the sub-distribution server 110a is illustrated as the sub-distribution server. However, the content transmission/reception system also includes other sub-distribution servers having the same configuration as the sub-distribution server 110a.

As illustrated in FIG. 23, the reproduction client 2a is different from the reproduction client 2' in that a client control unit 20a (specifically, a reproduction control unit 23a) is included. The main distribution server 100a is different from the main distribution server 100 in that the configuration information analysis unit 1014 is not included and a distribution control unit 1016a is included. The sub-distribution server 110a is different from the sub-distribution server 110 in that a distribution control unit 1116a is included.

The reproduction control unit 23a specifies one or more distribution servers (for example, the main distribution server 100a and the sub-distribution server 110a) associated with distribution of distribution target content based on configuration information 19 of the distribution target content and establishes connection with each of the specified distribution servers. Then, the reproduction control unit 23a requests each distribution server to distribute the composition information of the distribution target content. The reproduction control unit 23a specifies a component group necessary for reproduction among component groups distributed from the distribution servers based on the composition information distributed from each distribution server, and records and reproduces the specified component group.

The distribution control unit 1016a distributes the main composition information 17a, the component group 18a, and the configuration information 19 regarding the distribution target content to the reproduction client 2a. When the distribution control unit 1116a receives a request of the composition information regarding the distribution target content from the reproduction client 2a, the distribution control unit 1116a transmits the sub-composition information 17b to the reproduction client 2a. Thereafter, the distribution control unit 1116a distributes the component group 18b of the distribution target content to the reproduction client 2a.

Roughly speaking, the content transmission/reception system 300a executes the process illustrated in FIG. 22(b), and then the reproduction client 2a starts to reproduce the content.

<<Supplements Regarding Content Transmission/Reception System 300>>

When there is no sub-distribution server associated with the distribution of the distribution target content (that is, the distribution server associated with the distribution of the distribution target content is only the main distribution server 100), only the main distribution server 100, of course, distributes the main composition information, the sub-composition information, and the component group regarding the distribution target content. Then, the reproduction client 2 updates the main composition information distributed from the main distribution server 100 to the composition information 25 using the sub-composition information distributed from the same main distribution server 100.

Third Embodiment

A content transmission/reception system according to still another embodiment of the present invention will be described.

The content transmission/reception system according to the embodiment is a system that includes a distribution server and a reproduction client as in the content transmission/reception system according to the first embodiment.

In the embodiment, when the reproduction client transmits a content request (request to participate in a content distribution service) to the distribution server, the distribution server distributes the main composition information regarding distribution target content to the reproduction client and distributes component groups included in the distribution target content to the reproduction client. Thereafter, the distribution server sequentially distributes the sub-composition information based on a distribution schedule determined by the distribution server.

The reproduction client specifies a component group to be reproduced based on the received main composition information and sub-composition information, and records and reproduces only the specified component group among the distributed component groups.

Figure 24:
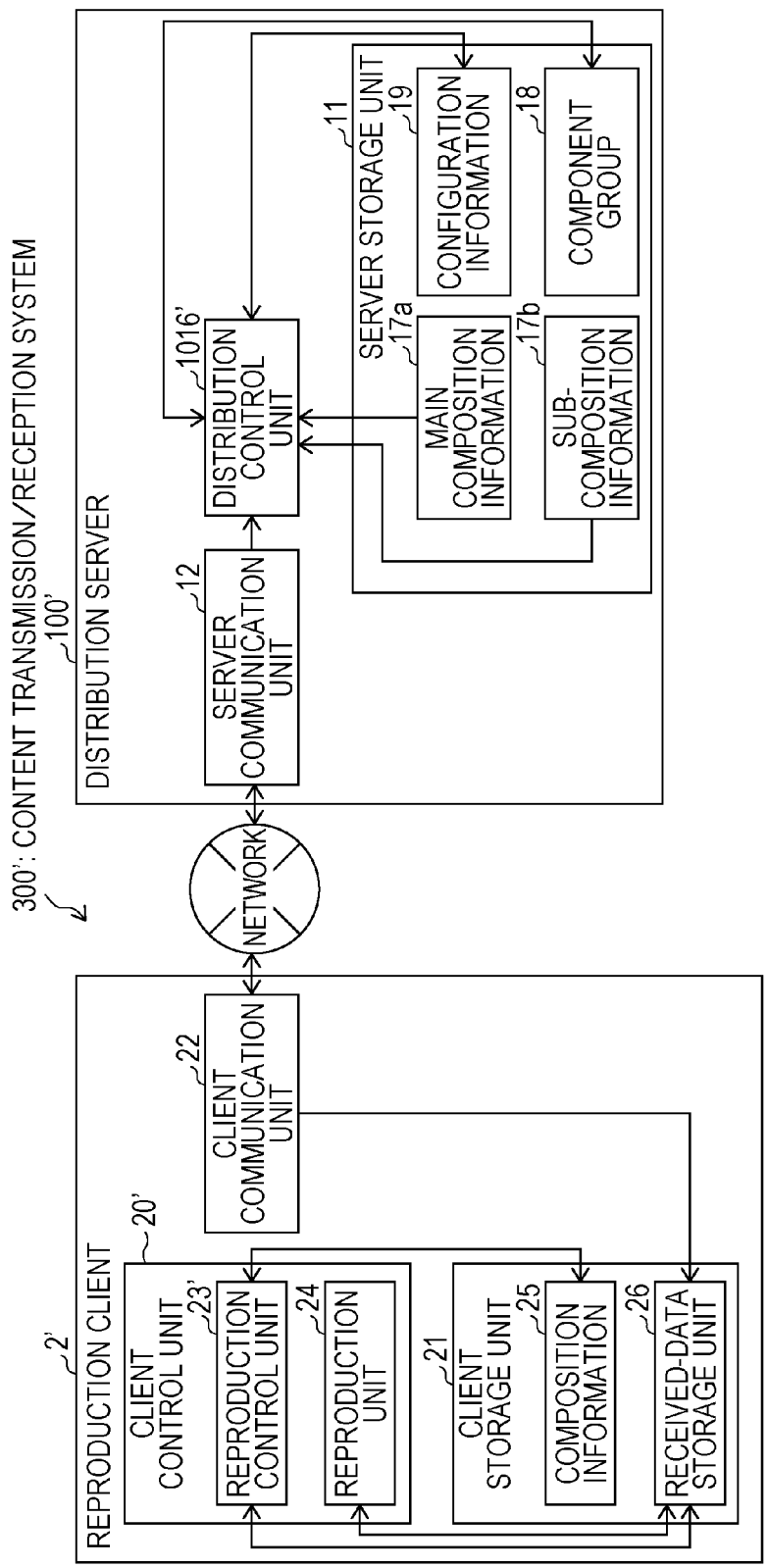
FIG. 24 is a diagram illustrating another embodiment of the present invention and is a block diagram illustrating the configurations of main units of two distribution servers and a reproduction client included in a content transmission/reception system.

The configuration of the content transmission/reception system according to the embodiment will be described with reference to FIG. 24. FIG. 24 is a block diagram illustrating the configurations of main units of a distribution server 100' and a reproduction client 2' included in a content transmission/reception system 300'.

As illustrated, the content transmission/reception system 300' has a configuration in which the distribution server 100' and the reproduction client 2' are connected via a network.

The distribution server 100' includes a distribution control unit 1016' which controls the distribution of content, a server storage unit 11 which stores data to be used in the distribution server 100', and a server communication unit 12 through which the distribution server 100' executes communication with an external device. In the server storage unit 11, main composition information 17a and sub-composition information 17b regarding the content, a component group 18 included in the content, and configuration information 19 regarding the content are stored for each piece of content which can be distributed by the distribution server 100'. The component group 18 has all components included in the content.

The distribution control unit 1016' distributes the main composition information 17a in the server storage unit 11 to the reproduction client 2 through the server communication unit 12 and distributes the component group 18 in the server storage unit 11. The distribution control unit 1116 determines a distribution schedule of the sub-composition information 17b and sequentially distributes the sub-composition information 17b in the server storage unit 11 to the reproduction client 2' through the server communication unit 12 according to the determined distribution schedule.

Since the reproduction client 2' is the same as the reproduction client 2' of the content transmission/reception system 300 according to the second embodiment, the description of the configuration of the reproduction client 2' will be omitted.

<<Main Composition Information and Sub-Composition Information>>

As in the content transmission/reception system 300, an id attribute is assigned to a components element and a seq element in the main composition information distributed in the content transmission/reception system 300'.

In the sub-composition information distributed in the content transmission/reception system 300', a replace element with a ref_id attribute is described. In regard to each of the described replace elements, a reproduction control unit 23' replaces the details of an element in the main composition information, to which an id attribute with the same attribute value as the ref_id attribute is assigned, with the details of the replace element. That is, the id attribute indicates an updatable (replaceable) portion in the main composition information.

For example, when the reproduction client 2' receives the main composition information illustrated in FIG. 25(a) and the sub-composition information illustrated in FIG. 25(b) from the distribution server 100', the reproduction control unit 23' executes the following processes:

replacing the details of the components element of which an attribute value of the id attribute in the main composition information is "cpn1" with the two comp elements of which attribute values of the id attributes are "c3" and "c4"; and replacing the details of a seq element of which an attribute value of the id attribute in the main composition information is "seq1" from a video element of which an attribute value of the comp attribute is "c1" and an audio element of which an attribute value of the comp attribute is "c2" to a video element of which an attribute value of the comp attribute is "c3" and an audio element of which an attribute value of the comp attribute is "c4."

As a result, the reproduction control unit 23' updates the main composition information to the composition information 25 illustrated in FIG. 25(c). Then, the reproduction control unit 23' concurrently reproduces a video component corresponding to the video element of which the attribute value of the comp attribute is "c3" and an audio component corresponding to the audio element of which the attribute value of the comp attribute is "c4" based on the composition information 25 in FIG. 25(c). In the following description of the embodiment, the video component is referred to as a "video component 3" and the audio component is referred to as an "audio component 4."

When the reproduction client 2' receives the sub-composition information illustrated in FIG. 25(d) from the distribution server 100', the reproduction control unit 23' executes the following processes:

replacing the details of the components element of which the attribute value of the id attribute in the main composition information is "cpn1" from two comp elements of which attribute values of the id attributes are "c3" and "c4" to two comp elements of which the attribute values of the id attributes are "c5" and "c6", and setting the comp elements of which the attribute values of the id attributes in the main composition information are "c1" and "c2" as replacement targets or setting the comp elements of which the attribute values of the id attributes in the composition information 25 in FIG. 25(c) after the previous replacement are "c3" and "c4" as replacement targets; and replacing the details of the seq element of which an attribute value of the id attribute in the main composition information is "seq1" from the video element of which the attribute value of the comp attribute is "c3" and the audio element of which the attribute value of the comp attribute is "c4" to a video element of which an attribute value of the comp attribute is "c5" and an audio element of which an attribute value of the comp attribute is "c6", and setting the video element of which the attribute value of the comp attribute in the main composition information is "c1" and the audio element of which the attribute value of the comp attribute is "c2" as replacement targets or setting the video element of which the attribute value of the comp attribute in the composition information 25 in FIG. 25(c) after the previous replacement is "c3" and the audio element of which the attribute value of the comp attribute is "c4" as replacement targets.

As a result, the reproduction control unit 23' updates the composition information in FIG. 25(c) to the composition information 25 in FIG. 25(e). Then, the reproduction control unit 23' concurrently reproduces a video component corresponding to the video element of which the attribute value of the comp attribute is "c5" and an audio component corresponding to the audio element of which the attribute value of the comp attribute is "c6" based on the composition information 25 in FIG. 25(e). In the following description of the embodiment, the video component is referred to as a "video component 5" and the audio component is referred to as an "audio component 6."

As understood from the foregoing description, the distribution server 100' can switch the components to be reproduced in the reproduction client 2' by distributing new sub-composition information during the distribution of the content to the reproduction client 2'.

As in the composition information in FIG. 25, it is desirable to include a version attribute indicating the version of the sub-composition information in a ci element of the sub-composition information. When the reproduction client 2' updates the composition information 25 using the sub-composition information, the reproduction client 2' may not update the composition information 25 using the sub-composition information with the version older than the updated sub-composition information (the attribute value of the version attribute is relatively small). For example, even when the sub-composition information in FIG. 25(b) is received after the update of the composition information 25 in FIG. 25(a) using the sub-composition information in FIG. 25(d), the sub-composition information may not be used to update the composition information 25.

When the composition information 25 may not be updated using the sub-composition information with the old version, there are the advantages to be described below.

For example, suppose a case in which a distributor desires to cause the reproduction client 2' to reproduce the video component 3 and the audio component 4 after a time t1 and to cause the reproduction client 2' to reproduce the video component 5 and the audio component 6 after a time t2 (>t1). In this case, the distribution server 100' is configured to distribute the sub-composition information in FIG. 25(b) by the time t1 and distribute the sub-composition information in FIG. 25(d) by the time t2.

As described above, the earlier distributed sub-composition information in FIG. 25(b) arrives at the reproduction client 2' after the later distributed sub-composition information in FIG. 25(d) by reason of a network trouble or the like in some cases (a time at which the sub-composition information in FIG. 25(b) arrives at the reproduction client 2' is assumed to be t3 (>t2)). Even in this case, since the reproduction client 2' does not update the composition information 25 using the sub-composition information in FIG. 25(b) received at the time t3, the composition information 25 in the client storage unit 21 is not changed as the composition information 25 in FIG. 25(e) before or after the time t3. Accordingly, even when the reproduction client 2' receives one of the sub-composition information in FIG. 25(b) and the sub-composition information in FIG. 25(d) earlier, the reproduction client 2' reproduces the video component 5 and the audio component 6 after the time t2 according to the intention of the distributor.

Conversely, when the version attribute is not included in the ci element of the sub-composition information, the reproduction client 2' may reproduce the video component 3 and the audio component 4 unintended by the distributor after the time t3.

Thus, when the version attribute is included in the ci element of the sub-composition information, there is the advantage that the components unintended by the distributor can be prevented from being reproduced by the reproduction client 2'.

Figure 26:
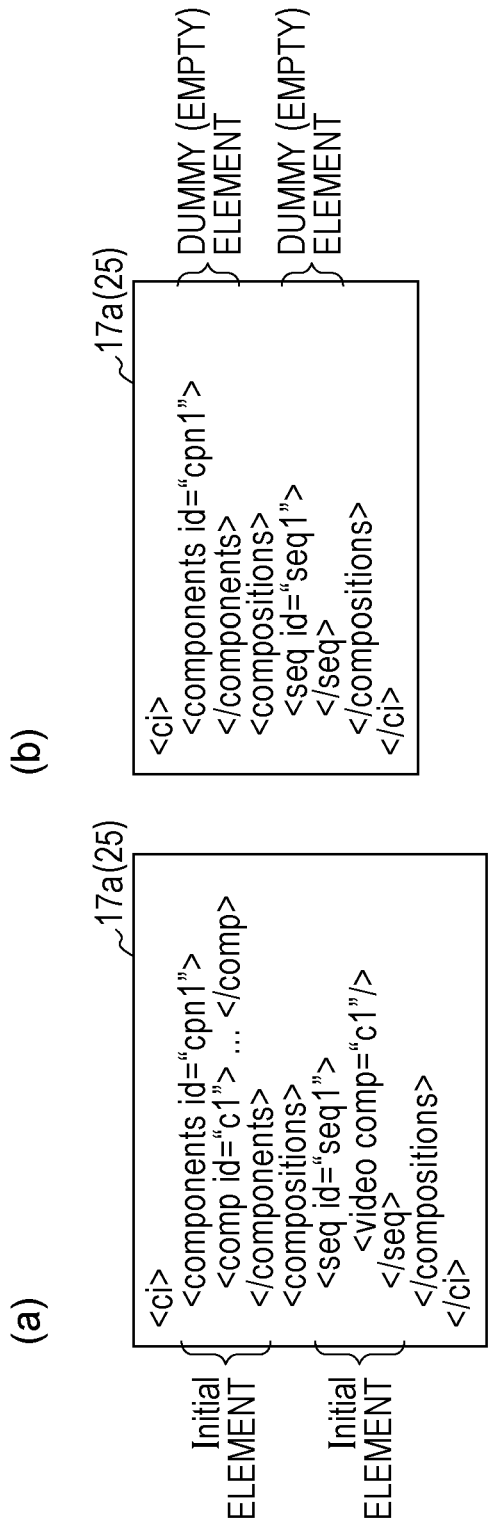
FIG. 26 is a diagram exemplifying the main composition information.

When there is a component which the distributor desires to cause the reproduction client 2' to normally reproduce during the reproduction of the distribution target content in regard to the main composition information, an element of the component is described in the main composition information. Further, the main composition information is described in the format of one of the main composition information including an initial element illustrated in FIG. 26(a) and the main composition information including a dummy element illustrated in FIG. 26(b).

The server storage unit 11 of the distribution server 100' may store the main composition information 17a including the dummy element and the sub-composition information 17b in which both attributes of the layer attribute and the version attribute are included in the ci element. In this case, a process of updating the composition information 25 by the reproduction client 2' will be described with reference to FIG. 27.

When the attribute value of the version attribute of the received sub-composition information is "1", the reproduction control unit 23' updates the composition information 25 using the sub-composition information at an appropriate timing based on the attribute value of the layer attribute. For example, when the sub-composition information in FIG. 27(a) is recorded as the composition information 25 in the client storage unit 21, the composition information 25 is not updated once, and then the composition information in FIG. 27(b) is received, and the composition information 25 in FIG. 27(a) is updated immediately to the composition information 25 in FIG. 27(c).

Conversely, when the attribute value of the version attribute of the received sub-composition information (target sub-composition information) is a value other than "1", the reproduction control unit 23' executes a process different from the process in the case in which the attribute value of the version attribute of the target sub-composition information is "1."

Specifically, when the attribute value of the layer attribute of the target sub-composition information is the same as the attribute value of the layer attribute of the sub-composition information received immediately before the reception of the target sub-composition information and the attribute value of the version attribute of the target sub-composition information is larger, the details of the insert element are not inserted into the composition information 25 but the details of the corresponding element in the composition information 25 are replaced with the details of the insert element (that is, "insert" is normally interpreted as insertion for the main composition information in FIG. 27(a) and is interpreted as replacing the details of the corresponding element when this process is viewed from the viewpoint of the composition information in FIG. 27(c) after the previous update). For example, when the composition information 25 in FIG. 27(d) is subsequently received after the reception of the composition information in FIG. 27(b), the composition information 25 in FIG. 27(c) is updated immediately to the composition information 25 in FIG. 27(e).

<<Supplements Regarding Content Transmission/Reception System 300'>>

The content transmission/reception system 300' may include a main distribution server and a sub-distribution server instead of the distribution server 100'. In this case, the main distribution server may distribute the main composition information 17a and the component group 18a as in FIG. 26(a) or FIG. 27(a) and the sub-distribution server may distribute the sub-composition information 17b and the component group 18b as in FIG. 26(b) or FIG. 27(b).

Fourth Embodiment

Next, a content transmission/reception system according to another embodiment of the present invention will be described.

The content transmission/reception system according to the embodiment includes not only a main distribution server, one or more sub-distribution servers, and a reproduction client but also a control server that supplies each distribution server with composition information for the distribution server.

Newly uploaded content is stored in one or more distribution servers by a distributor. Specifically, all of the components included in content are stored in the main distribution server in some cases and all of the components are distributed and stored in the main distribution server and one or more sub-distribution servers in some cases.

Composition information regarding the newly uploaded content is stored in the control server by the distributor. The control server generates main composition information and sub-composition information from the newly stored composition information to distribute the main composition information to the main distribution server and to distribute the sub-composition information to one or more sub-distribution servers.

Figure 28:
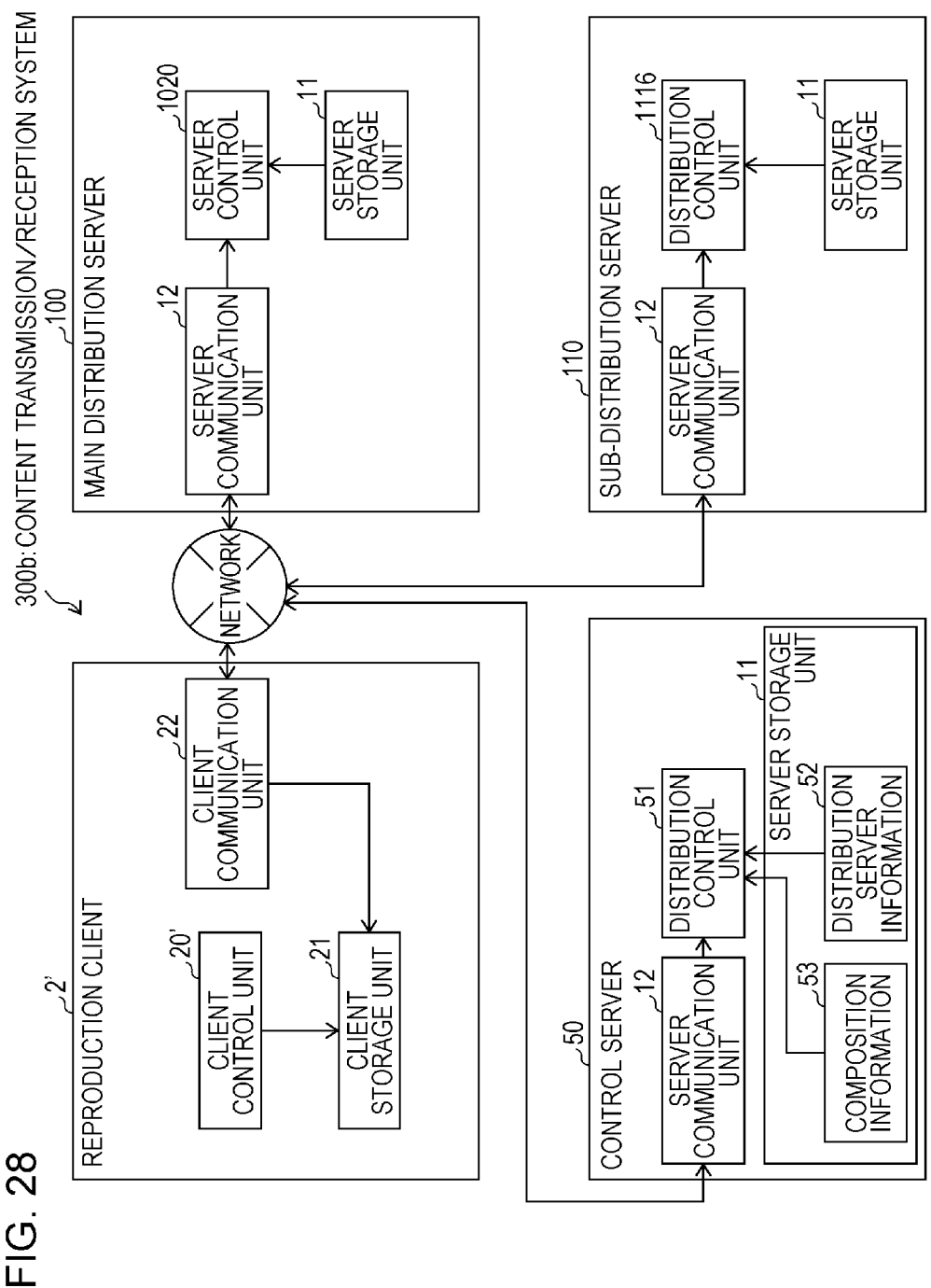
FIG. 28 is a diagram illustrating another embodiment of the present invention and is a block diagram illustrating the configurations of main units of two distribution servers, a control server managing the two distribution servers, and a reproduction client included in a content transmission/reception system.

Hereinafter, the configuration of the content transmission/reception system according to the embodiment will be described with reference to FIG. 28. FIG. 28 is a block diagram illustrating the configurations of main units of a main distribution server 100, a sub-distribution server 110, a reproduction client 2', and a control server 50 included in a content transmission/reception system 300b. In the drawing, only the sub-distribution server 110 is illustrated as the sub-distribution server. However, the content transmission/reception system also includes other sub-distribution servers having the same configuration as the sub-distribution server 110.

As illustrated, the content transmission/reception system 300 has a configuration in which the main distribution server 100, the sub-distribution server 110, the reproduction client 2', and the control server 50 are connected via a network. Although not illustrated, the other sub-distribution servers are also connected to the network.

Since the configurations of the main distribution server 100, the sub-distribution server 110, and the reproduction client 2' have been described above, the configuration of the control server 50 will be described herein. Hereinafter, to facilitate the description, the control server 50 will be described on the assumption that some of the components included in content are uploaded to the main distribution server 100 and the remaining components included in the content are uploaded to the sub-distribution server 110.

As illustrated in FIG. 28, the control server 50 includes a server communication unit 12 through which the control server 50 executes communication with an external device, a distribution control unit 51 which controls the distribution of the composition information, and a server storage unit 53 which stores data to be used in the control server 50.

The server storage unit 51 stores distribution server information 52. Composition information 53 is composition information newly stored in the server storage unit 51.

The distribution server information 52 includes information indicating a distribution server management entity (a management company or the like) in regard to the main distribution server and one or more sub-distribution servers.

The distribution control unit 51 inquires of the main distribution server and one or more sub-distribution servers whether a component corresponding to a comp element is stored for each comp element included in the composition information 53. Thus, for each component included in the newly uploaded content, the distribution control unit 51 specifies the distribution server associated with the distribution of the component.

Then, for each of the specified distribution servers, the distribution control unit 51 generates composition information for the distribution server. Here, main composition information for the main distribution server 100 and sub-composition information for the sub-distribution server 110 are generated.

The configuration of the content transmission/reception system 300b according to the embodiment has been described above.

Figure 29:
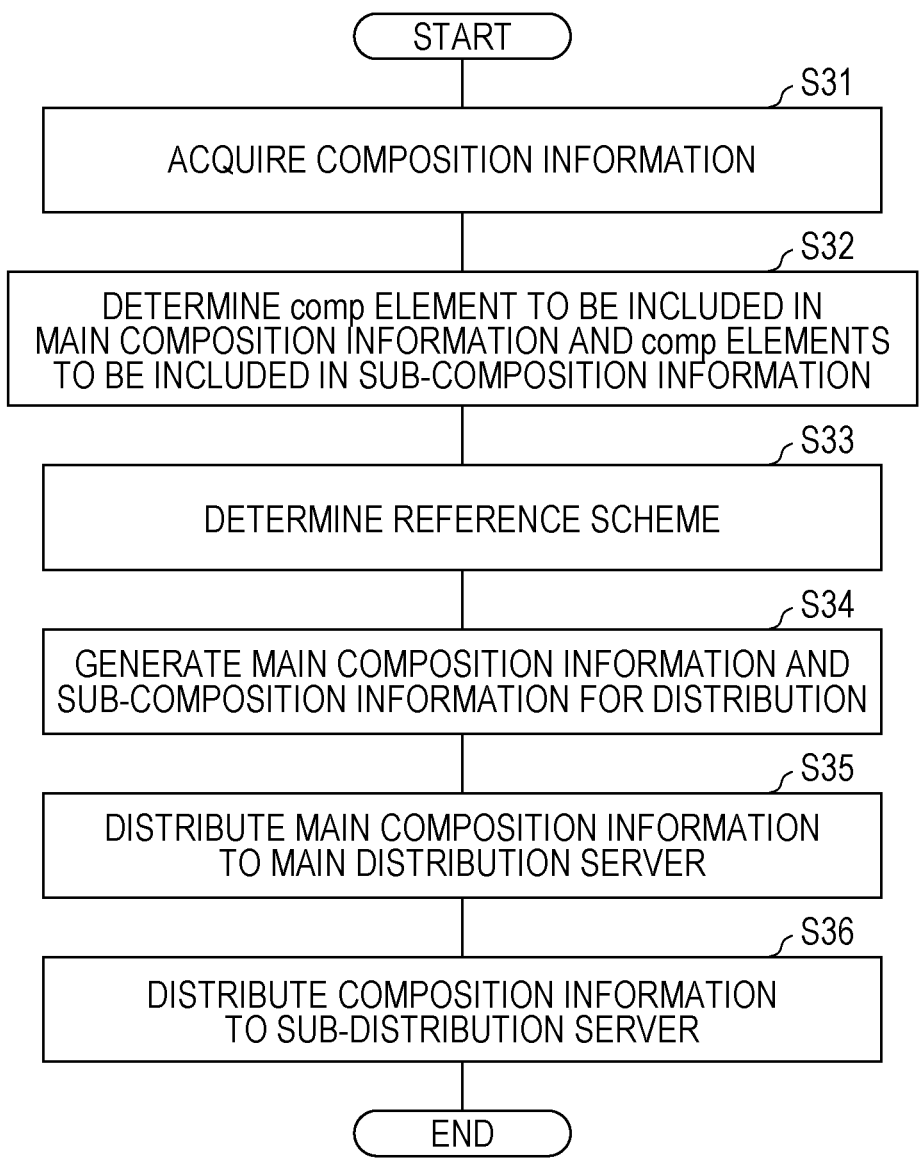
FIG. 29 is a flowchart illustrating an operation of the control server in FIG. 28.

Next, an operation of the control server 50 will be described with reference to FIG. 29. FIG. 29 is a flowchart illustrating the operation of the control server 50.

As illustrated in FIG. 29, the distribution control unit 51 first reads the composition information 53 from the server storage unit 11 (S31).

After S31, the distribution control unit 51 determines to include the comp elements corresponding to the components distributed by the main distribution server 100 in the main composition information and determines to include the comp elements corresponding to the components distributed by the sub-distribution server 110 in the sub-composition information (S32).

Thereafter, the distribution control unit 51 determines to adopt one of the reference scheme of the first embodiment in which an external reference URL is included in the main composition information and the reference scheme of the second or third embodiment in which the insert element or the replace element is included in the sub-composition information (S33). Specifically, based on the distribution server information 52, the distribution control unit 51 determines whether management entities (here, the management entity of the main distribution server 100 and the management entity of the sub-distribution server) of all of the distribution servers associated with the distribution of the content corresponding to the composition information 53 are the same. When the distribution control unit 51 determines that the management entities of all of the distribution servers are the same, the distribution control unit 51 determines to adopt the reference scheme of the first embodiment. When the distribution control unit 51 determines that the management entities of all of the distribution servers are not the same, the distribution control unit 51 determines to adopt the reference scheme of the second embodiment.

After S33, based on the process results of S32 and S33, the distribution control unit 51 generates the main composition information to be distributed to the main distribution server 100 and generates the sub-composition information to be distributed to the sub-distribution server 110 (S34).

Then, the main composition information is distributed to the main distribution server 100 (S35) and the sub-composition information is distributed to the sub-distribution server 110, and then the process ends.

After the control server 50 executes the foregoing process, the main distribution server 100 stores the main composition information in the server storage unit 11 and the sub-distribution server 110 stores the sub-composition information in the server storage unit 11. Then, the main distribution server 100 awaits a request to distribute the newly uploaded content.

As described above, when the main distribution server 100 and the sub-distribution server 110 are managed by the same management entity, the main distribution server 100 and the sub-distribution server 110 distribute the main composition information (the main composition information including the external reference URL) and the sub-composition information (the sub-composition information referred to by the external reference URL) described in the first embodiment to the reproduction client, respectively. Conversely, when the management entities of the main distribution server 100 and the sub-distribution server 110 differ, the main distribution server 100 and the sub-distribution server 110 distribute the main composition information (the main composition information in which the insertable portion or the replaceable portion is indicated) and the sub-composition information (the sub-composition information including the insert element or the replace element) described in the second and third embodiments to the reproduction client, respectively.

The components included in the content present in the sub-distribution server of which the management entity is the same as that of the main distribution server are strictly managed with the main composition information including the external reference URL. That is, the reproduction client receiving such main composition information comprehends that the sub-composition information is also necessary to reproduce the content, and the distribution server can reproduce the content appropriately in a form desired by the management entity with reference to the sub-composition information and the components indicated in the sub-composition information.

The components included in the content present in the distribution server of which the management entity is different from that of the main distribution server are the components reproduced although the main distribution server does not particularly know of the presence of the components. Accordingly, it is not necessary for the main distribution server to manage the reproduction of the components. Therefore, it is desirable to include the insert element or the replace element in the sub-composition information without particularly adding information to the main composition information.

The composition information of the sub-distribution server having components recognized to be essential using recognition information of a provider (broadcast station or the like) providing main content can also be described selectively according to the scheme of the first embodiment, and the composition information of the sub-distribution server having unrecognized components can also be described selectively according to the scheme indicated in the second and third embodiments. Of course, the management entity can determine the reference schemes, and the reference schemes can also be frequently determined through an operator's operations.

The detailed description of the process of distributing the content by the main distribution server 100 and the sub-distribution server 110 and a process of reproducing the content by the reproduction client will be omitted. The processes of distributing and reproducing the content should be understood by those skilled in the art, referring to the description of the first to third embodiments.

The main distribution server 100 and the control server 50 may not be different servers, but the main distribution server 100 may also have the functions of the control server 50.

Fifth Embodiment

Next, a content transmission/reception system according to another embodiment of the present invention will be described.

The content transmission/reception system according to the embodiment includes not only a main distribution server, a sub-distribution server, and a reproduction client but also a control server that supplies each distribution server with composition information for the distribution server, as in the content transmission/reception system according to the fourth embodiment.

Figure 30:
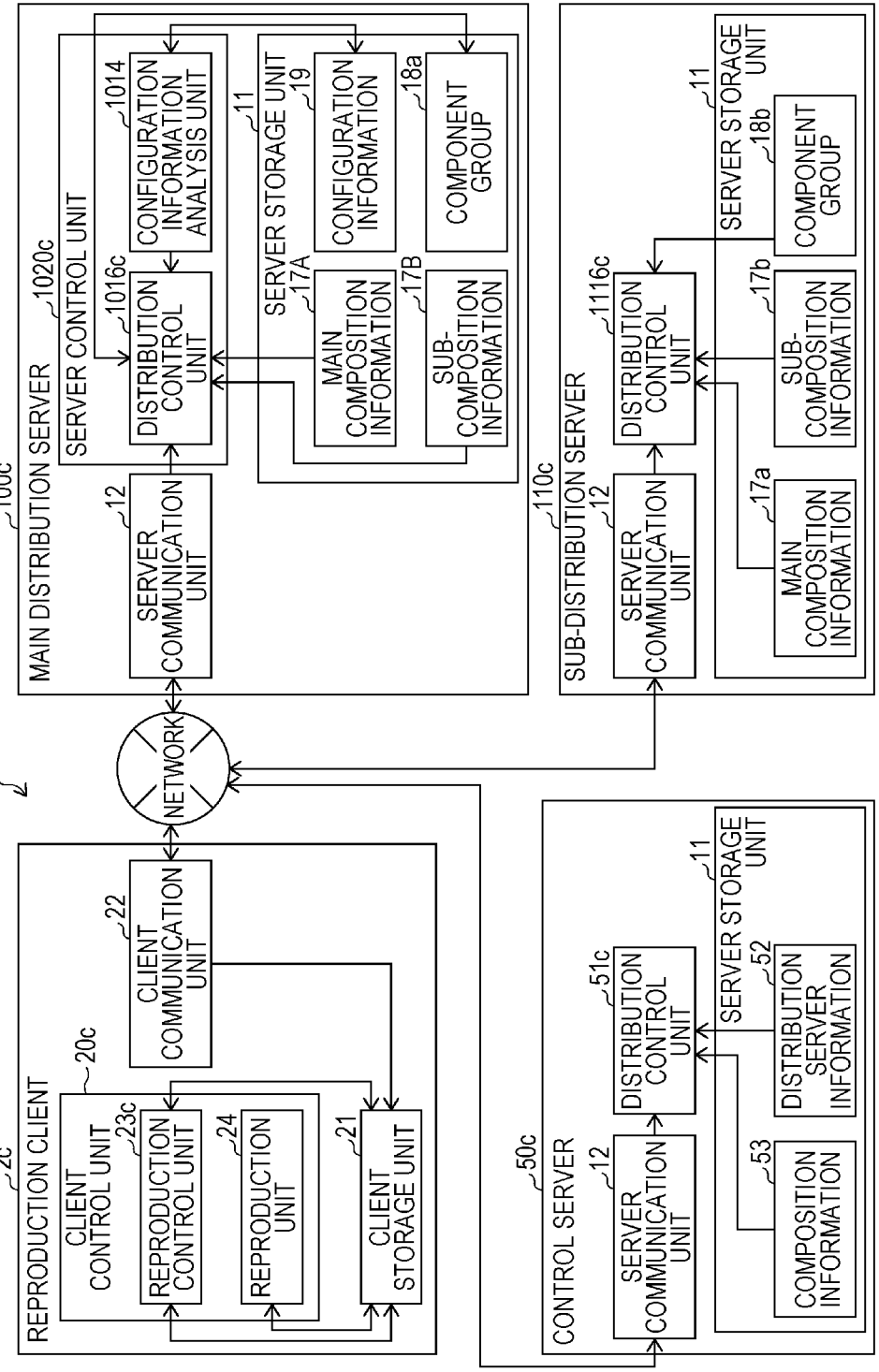
FIG. 30 is a diagram illustrating another embodiment of the present invention and is a block diagram illustrating the configurations of main units of two distribution servers, a control server managing the two distribution servers, and a reproduction client included in a content transmission/reception system.

Hereinafter, the configuration of the content transmission/reception system according to the embodiment will be described with reference to FIG. 30. FIG. 30 is a block diagram illustrating the configurations of main units of a main distribution server 100*c*, a sub-distribution server 110*c*, a reproduction client 2*c*, and a control server 50*c* included in a content transmission/reception system 300*c*.

As illustrated, the content transmission/reception system 300*c* has a configuration in which the main distribution server 100*c*, the sub-distribution server 110*c*, the reproduction client 2*c*, and the control server 50*c* are connected via a network.

As illustrated in FIG. 30, the control server 50*c* includes a server communication unit 12 through which the control server 50*c* executes communication with an external device, a distribution control unit 51*c* which controls the distribution of the composition information, and a server storage unit 11 which stores data to be used in the control server 50*c*.

The server storage unit 11 records composition information 53 newly uploaded by a distributor.

The distribution control unit 51*c* inquires of the main distribution server 100*c* and the sub-distribution server 110*c* whether a component corresponding to a comp element is stored for each comp element included in the composition information 53. For each comp element included in the composition information 53, the distribution control unit 51*c* specifies significance of the component corresponding to the comp element. For example, an attribute indicating the significance of the component may be included in the comp element corresponding to this component in the composition information 53.

In regard to each distribution server of the main distribution server 100*c* and the sub-distribution server 110*c*, the distribution control unit 51*c* generates composition information of one group for the distribution server based on the significance of each component stored by the distribution server. The distribution control unit 51*c* distributes the composition information for the main distribution server 100*c* to the main distribution server 100*c* and distributes the composition information for the sub-distribution server 110*c* to the sub-distribution server 110*c*.

The main distribution server 100*c* is a device that distributes content and serves to generally control each sub-distribution server. The main distribution server 100*c* serves to receive a request (a request to participate in a distribution service of the content) to distribute content from the reproduction client 2*c*.

The main distribution server 100c includes a server control unit 1020c which generally controls functions of the main distribution server 100c, a server storage unit 11 which stores data to be used in the main distribution server 100c, and a server communication unit 12 through which the main distribution server 100c executes communication with an external device. The server control unit 1020c includes a configuration information analysis unit 1014 and a distribution control unit 1016c.

In the server storage unit 11, main composition information 17A regarding content, sub-composition information 17B of layer 1 to layer N, a component group 18a included in the content, and configuration information 19 regarding the content are stored for each piece of content which can be distributed in the content transmission/reception system 300c.

The component group 18a is a component group in which components such as video, audio, and subtitles included in a main program and distributed by the main distribution server 100c are assumed. In the main composition information 17A, the components of a main video and a main audio with the highest significance are described. In the sub-composition information 17B of layer 1 to layer N, the component of a sub-audio or the components of subtitles and replacement subtitles are described according to the significance. Since the component group is a component group which is distributed from the same main distribution server 100c and in which a priority relation or the like at the time of use is clear, the components are described using the reference scheme of the second or third embodiment in which the insert element or the replace element is included in the sub-composition information.

In the main composition information 17A and/or the sub-composition information 17B of layer 1 to layer N distributed by the main distribution server 100c, an external reference URL for referring to the main composition information 17a and/or the sub-composition information 17b is described for the main composition information 17a and/or the sub-composition information 17b of layer 1 to layer M distributed from the sub-distribution server 110c, and a CM component reproduced together with the main program, its relevant component, a data distribution component such as a weather forecast, and the like are designated. These components are included in the component group 18b recorded in the sub-distribution server 110c, and the main composition information 17a and/or the sub-composition information 17b of layer 1 to layer M is stored at a position indicated by the external reference URL for referring to the main composition information 17a and/or the sub-composition information 17b. Since the configuration information 19 and the configuration information analysis unit 1014 are described in the second embodiment, the description thereof will be omitted herein.

When the distribution control unit 1016c receives an inquiry about whether certain components are stored from the control server 50c, the distribution control unit 1016c returns a response indicating whether the components are stored to the control server 50c.

The distribution control unit 1016c controls the distribution of the distribution target content. Specifically, the distribution control unit 1016c establishes connection of the sub-distribution server 110c with the reproduction client 2c and requests the sub-distribution server 110c to distribute the main composition information 17a, the sub-composition information 17b, and the component group 18b of the distribution target content stored in the sub-distribution server 110 to the reproduction client 2c, as necessary.

The distribution control unit 1016c distributes the main composition information 17A and the component group 18a in the server storage unit 11 through the server communication unit 12. The distribution control unit 1016c determines a distribution schedule of each piece of sub-composition information 17B of layer 1 to layer N and distributes the sub-composition information 17B to the reproduction client 2c in order of a small number of layers according to the determined distribution schedule. The sub-composition information 17B can also be configured to be distributed in response to a request from the reproduction client 2c.

The sub-distribution server 110c is a device that distributes content as in the main distribution server 100c, and receives an instruction from the main distribution server 100c and distributes the component group 18b included in the distribution target content, and the main composition information 17a and the sub-composition information 17b regarding the distribution target content to the reproduction client 2c. As described above, the component group 18b is a component group in which the CM component reproduced together with the main program, its relevant component, the data distribution component such as a weather forecast, and the like are assumed.

The sub-distribution server 110c includes a distribution control unit 1116c which controls the distribution of the content and the composition information, a server storage unit 11 which stores data to be used in the sub-distribution server 110c, and a server communication unit 12 through which the sub-distribution server 110c executes communication with an external device. In the server storage unit 11, the main composition information 17a regarding content, each piece of sub-composition information 17b of layer 1 to layer M, and a component group 18b included in the content are stored for each piece of content which can be distributed from the sub-distribution server 110c. In the main composition information 17a, the CM component reproduced together with the main program is described. In the sub-composition information 17b of layer 1 to layer M, a component suggesting information regarding CM or a data distribution component is described according to significance. Since the component group is a component group which is distributed from the same sub-distribution server 110c and in which a priority relation or the like at the time of use is clear, the components are described using the reference scheme of the second or third embodiment in which the insert element or the replace element is included in the sub-composition information. The external reference URL described in the main composition information 17A and/or the sub-composition information 17B of layer 1 to layer N distributed from the main distribution server 100c indicates that the components are reproduced together with the main program (together with components of video, audio, and subtitles included in the main program).

When the distribution control unit 1116c receives an inquiry about whether certain components are stored from the control server 50c, the distribution control unit 1116c returns a response indicating whether the components are stored to the control server 50c.

The distribution control unit 1116c controls the distribution of the distribution target content. Specifically, the distribution control unit 1116c distributes the component group 18b included in the distribution target content. The distribution control unit 1116c determines a distribution schedule of the main composition information 17a and each piece of sub-composition information 17b of layer 1 to layer M and distributes the main composition information 17a and the sub-composition information 17b in the server storage unit 11 to the reproduction client 2c in order of a lower-level layer through the server communication unit 12 according to the determined distribution schedule. The main composition information 17a and the sub-composition information 17b can also be configured to be distributed in response to a request from the reproduction client 2c.

On the other hand, the reproduction client 2c is a terminal which receives and reproduces content and includes a client control unit 20c which generally controls functions of the reproduction client 2c, a client storage unit 21 which stores data to be used in the reproduction client 2c, and a client communication unit 22 through which the reproduction client 2c executes communication with an external device. The client control unit 20c includes a reproduction control unit 23c and a reproduction unit 24. The client storage unit 21 stores composition information 25 and includes a received-data storage unit 26. That is, the reproduction client 2c is different from the reproduction client 2' in that the reproduction control unit 23c is included.

The reproduction control unit 23c generally controls the reproduction of the content. Specifically, the reproduction control unit 23c determines the component group of the distribution target content to be reproduced, referring to the main composition information 17A and the main composition information 17a respectively distributed from the main distribution server 100 and the sub-distribution server 110 associated with the distribution of the distribution target content.

The reproduction control unit 23c records the main composition information 17A as the composition information 25 in the client storage unit 21. Thereafter, whenever the sub-composition information 17B is received, the composition information 25 in the client storage unit 21 is updated using the received sub-composition information 17B. Further, when the main composition information 17a is received, the reproduction control unit 23c updates the composition information 25. Thereafter, whenever the sub-composition information 17b is received, the composition information 25 in the client storage unit 21 is updated using the received sub-composition information 17b. For the sub-composition information 17B and the sub-composition information 17b determined to be unnecessary in advance by the reproduction client 2c, the composition information 25 can also be configured not to be updated.

The configuration of the content transmission/reception system 300c according to the embodiment has been described.

Figure 31:
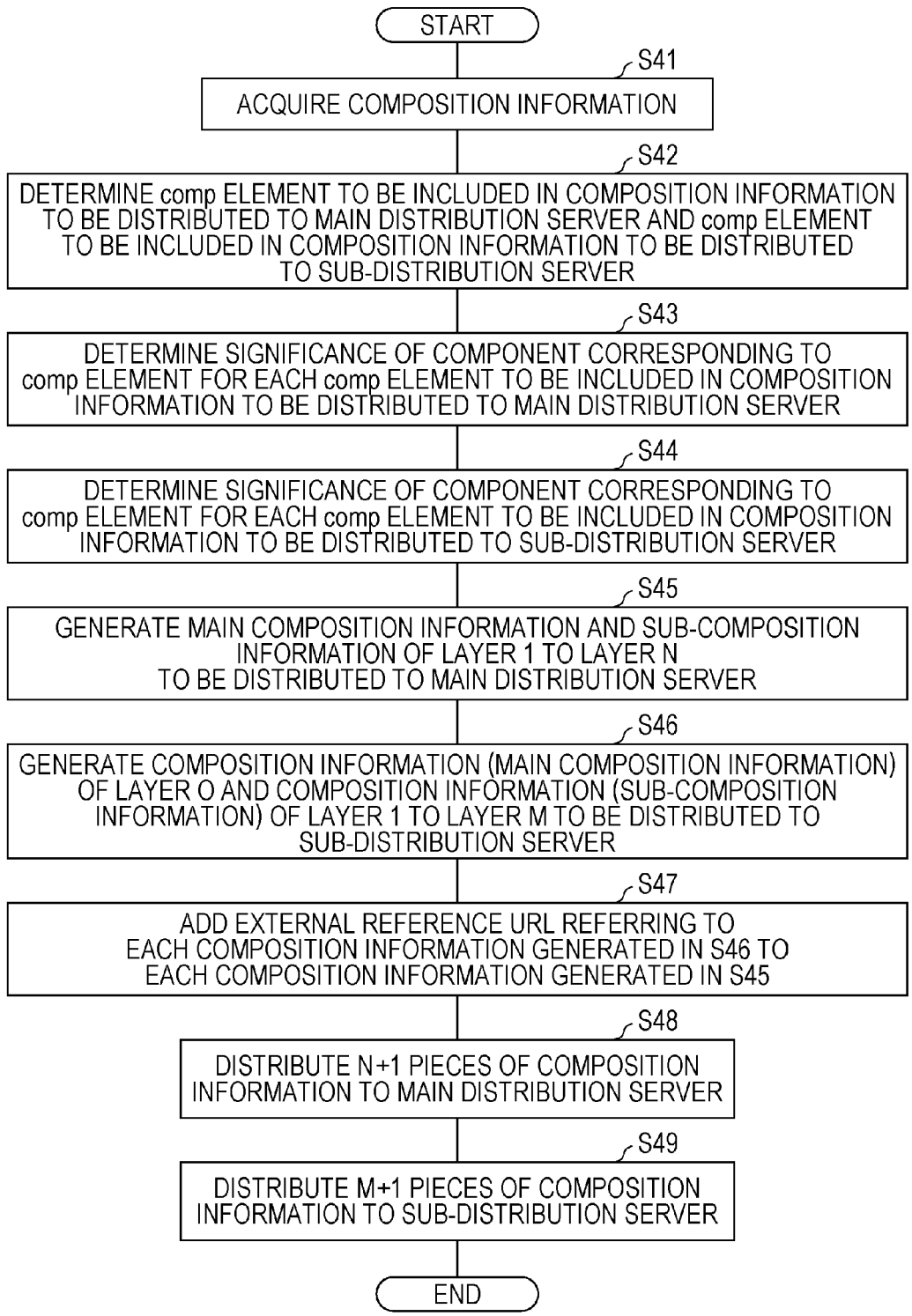
FIG. 31 is a flowchart illustrating an operation of the control server in FIG. 30.

Next, an operation of the control server 50c will be described with reference to FIG. 31. FIG. 31 is a flowchart illustrating the operation of the control server 50c.

As illustrated in FIG. 31, the distribution control unit 51c of the control server 50c first reads the composition information 53 from the server storage unit 11 (S41).

After S41, the distribution control unit 51c determines the comp element included in the composition information distributed to the main distribution server 100c and the comp element included in the composition information distributed to the sub-distribution server 110c (S42). Specifically, the distribution control unit 51c inquires of the main distribution server 100c and the sub-distribution server 110c whether the component corresponding to the comp element is stored in regard to each comp element included in the composition information 53. The comp element corresponding to each component responded as being stored in the main distribution server 100c is determined to be included in the composition information to be distributed to the main distribution server 100c. Likewise, the comp element corresponding to each component responded as being stored in the sub-distribution server 110c is determined to be included in the composition information to be distributed to the sub-distribution server 110c.

After S42, based on the composition information 53, the distribution control unit 51c specifies the significance of the component corresponding to the comp element in regard to each comp element included in the composition information to be distributed to the main distribution server 100c (S43).

Likewise, based on the composition information 53, the distribution control unit 51c specifies the significance of the component corresponding to the comp element in regard to each comp element included in the composition information to be distributed to the sub-distribution server 110c (S44).

After S44, the distribution control unit 51c generates the main composition information, the sub-composition information of layer 1, the sub-composition information of layer 2, . . . , and the sub-composition information of layer N to be distributed to the main distribution server 100c (S45). Specifically, the N+1 pieces of composition information are generated such that a comp tag regarding the component with the highest significance is included in the main composition information and comp tags regarding the components with relatively low significance are included in the sub-composition information with relatively high version values. The description thereof is made using the reference scheme of the second or third embodiment in which the insert element or the replace element is included in the sub-composition information.

After S45, the distribution control unit 51c generates the main composition information, the sub-composition information of layer 1, the sub-composition information of layer 2, . . . , and the sub-composition information of layer M to be distributed to the sub-distribution server 110c (S46). Specifically, the M+1 pieces of composition information are generated such that a comp tag regarding the component with the highest significance is included in the main composition information and comp tags regarding the components with relatively low significance are included in the sub-composition information with relatively high layer values. The description thereof is made using the reference scheme of the second or third embodiment in which the insert element or the replace element is included in the sub-composition information.

After S46, the external reference URL for referring to the main composition information, the sub-composition information of layer 1, the sub-composition information of layer 2, . . . , and the sub-composition information of layer M to be distributed to the sub-distribution server 110c is added to the main composition information, the sub-composition information of layer 1, the sub-composition information of layer 2, . . . , and the sub-composition information of layer N to be distributed to the main distribution server 100c (S47).

After S47, the distribution control unit 51c distributes the N+1 pieces of composition information generated in S47 to the main distribution server 100c (S48) and distributes the M+1 pieces of composition information generated in S46 to the sub-distribution server 110c (S49), and then the process ends.

<<Modification Example of Operation of Control Server 50c>>

A modification example of the operation of the control server 50c will be described with reference to FIG. 32.

Figure 32:
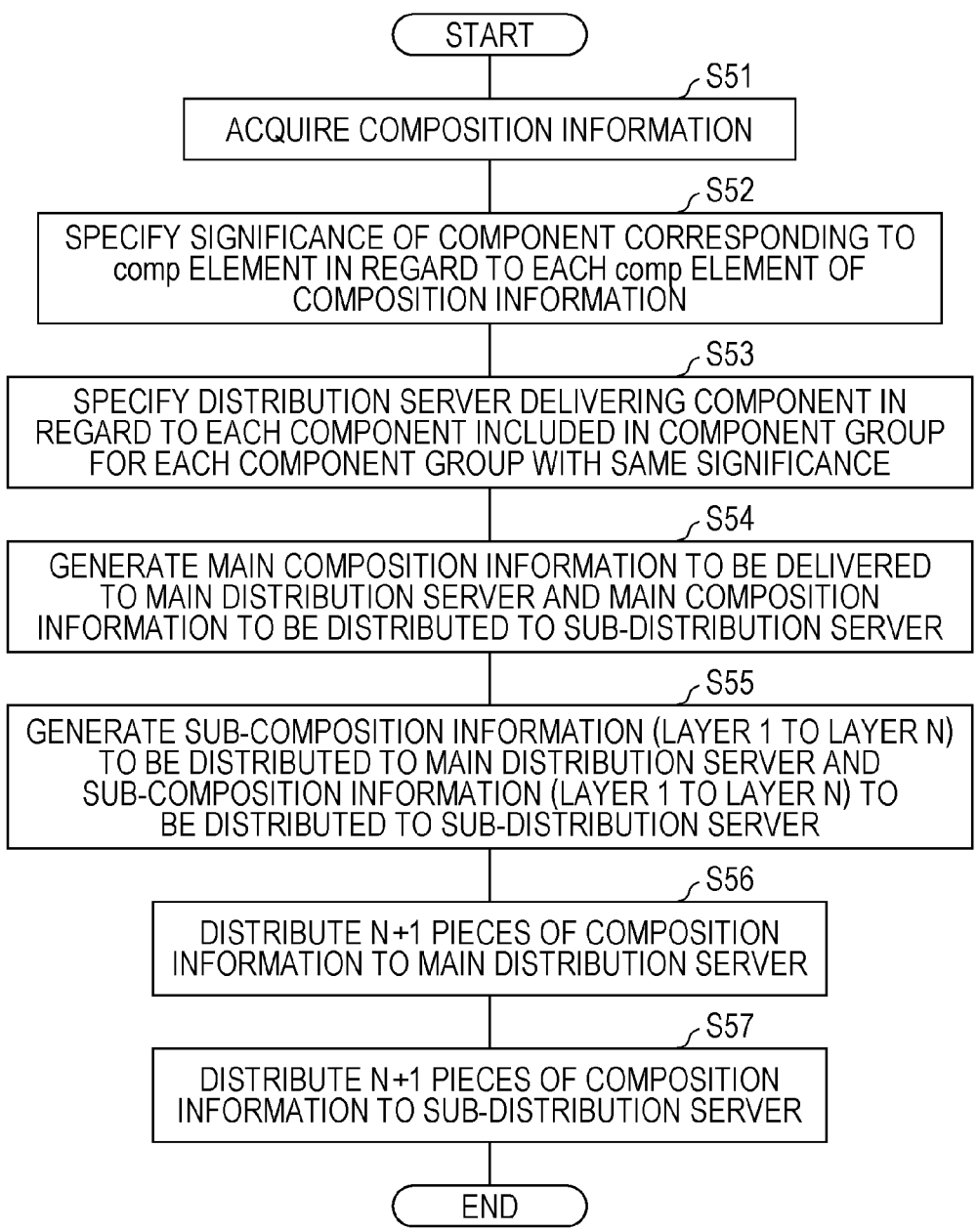
FIG. 32 is a flowchart illustrating an operation, according to a modification example, of the control server in FIG. 30.

FIG. 32 is a flowchart illustrating an operation of the control server 50c according to the modification example.

As illustrated in FIG. 32, the distribution control unit 51c of the control server 50c first reads the composition information 53 from the server storage unit 11 (S51).

After S51, the distribution control unit 51c specifies the significance of the component corresponding to the comp element for each comp element in the composition information 53 (S52).

After S52, for each component group having the same significance, the distribution control unit 51c specifies the distribution server distributing the component in regard to each component included in the component group (S53).

Specifically, in regard to each component of the component group belonging to a group with the highest significance among all of the component groups including the corresponding comp element in the composition information 53, the main distribution server 100c and the sub-distribution server 110c are inquired of whether the component is stored. Further, the same process is executed N times. That is, in regard to the component group belonging to the component group with the second highest significance, . . . , and the component group belonging to the group with the lowest significance (N+1-th highest significance), the same process is executed.

After S53, the distribution control unit 51c generates the main composition information 17A to be distributed to the main distribution server 100c and the main composition information 17a to be distributed to the sub-distribution server 110c (S54).

Specifically, from the comp element group corresponding to the component group in regard to the component groups distributed by the main distribution server among the component groups belonging to the group with the highest significance and the comp element group corresponding to the component group in regard to the component groups distributed by the sub-distribution server among the component groups belonging to the group with the highest significance, the main composition information 17A and the main composition information 17a are generated, and then the main composition information 17A including the external reference URL indicating a reference destination of the main composition information 17a is generated.

After S54, the distribution control unit 51c generates the sub-composition information 17B of layer 1 to be distributed to the main distribution server 100c and the composition information 17b of layer 1 to be distributed to the sub-distribution server 110c. Subsequently, up to the sub-composition information 17B of layer N to be distributed to the main distribution server 100c and the composition information 17b of layer N to be distributed to the sub-distribution server 110c are generated similarly (S55).

Specifically, from the comp element group corresponding to the component group in regard to the component groups distributed by the main distribution server among the component groups belonging to the group with the second highest significance and the comp element group corresponding to the component group in regard to the component groups distributed by the sub-distribution server among the component groups belonging to the group with the second highest significance, the sub-composition information 17B of layer 1 and the sub-composition information 17b of layer 1 are generated, and then the sub-composition information 17b of layer 1 including the external reference URL indicating a reference destination of the sub-composition information 17b of layer 1 is generated.

The same process is executed to generate the sub-composition information 17B and the sub-composition information 17b of layer 2 to layer N.

After S55, the distribution control unit 51c distributes the N+1 pieces of composition information generated in S54 and S55 to the main distribution server 100c (S56) and distributes the N+1 pieces of composition information generated in S54 and S55 to the sub-distribution server 110c (S57), and then the process ends.

As described above, in the process of generating the composition information 25 in the control server described with reference to FIGS. 31 and 32, the relation between the components distributed by one distribution server is described using the reference scheme of the second or third embodiment in which the insert element or the replace element is included in the sub-composition information, and the relation between the components distributed by another distribution server is described using the reference scheme of the first embodiment in which the external reference URL is included in the main composition information. In contrast, the relation between the components distributed by one distribution server may be described using the reference scheme of the first embodiment in which the external reference URL is included in the main composition information, and the relation between the components distributed by another distribution server may be described using the reference scheme of the second or third embodiment in which the insert element or the replace element is included in the sub-composition information.

<<Reproduction Process of Reproduction Client 2c>>

As understood from the description of the reproduction control unit 23c, the reproduction client 2c reproduces the components to be reproduced in the component groups distributed from the main distribution server 100c and the sub-distribution server 110c based on main composition information 17A acquired from the main distribution server 100c, the sub-composition information 17B of layer 1 to layer N sequentially distributed from the main distribution server 100c, the main composition information 17a acquired from the sub-distribution server 110c, and the sub-composition information 17b of layer 1 to layer M sequentially distributed from the sub-distribution server 110c.

<<Supplement 1 of Content Transmission/Reception System 300c>>

Until S45 (S53), based on the distribution server information 52, the distribution control unit 51c may determine whether the management entities of the main distribution server 100c and the sub-distribution server 110c are the same.

When the distribution control unit 51c determines that the management entities of the main distribution server 100c and the sub-distribution server 110c are the same, the composition information to be distributed to the sub-distribution server 110c may be generated as the composition information including the insert element and the replace element, instead of describing the external reference URL for the composition information to be distributed to the sub-distribution server 110c in the composition information to be distributed to the main distribution server 100c in S47 (S54 and S55).

In S45 and S46 (S54 and S55), the main composition information 17A to be distributed to the main distribution server 100c and the composition information to be distributed to the sub-distribution server 110c may be all generated as the composition information referring to the main composition information and the sub-composition information by the external reference URL.

<<Supplement 2 of Content Transmission/Reception System 300c>>

For each distribution server, the distribution server information 52 may include recognition information indicating whether the management entity of the main distribution server recognizes that the distribution server is an essential server.

In this case, until S46 (S55), based on the distribution server information 52, the distribution control unit 51c may determine whether the sub-distribution server 110c is recognized as an essential server.

When it is determined that the sub-distribution server 110c is recognized as the essential server, the main composition information 17A including the external reference URL and the sub-composition information 17B of version 1 to version N referred to by the external reference URL may be generated as the composition information to be distributed to the sub-distribution server 110c in S46 (S55).

<<Supplement 3 of Content Transmission/Reception System 300c>>

In S43 and S52, the distribution control unit 51c may specify the significance using the method described in the first embodiment.

As described above, the attribute indicating the significance of the component corresponding to the comp tag may be included as the attribute of each comp tag in the composition information 53, and information indicating the significance of the component may be included in a header portion of the component. The distribution control unit 51c may specify the significance of each component by inquiring of each distribution server of the main distribution server 100 and the sub-distribution server 110 about the significance of each component stored in the distribution server.

<<Other Supplements>>

Figure 33:
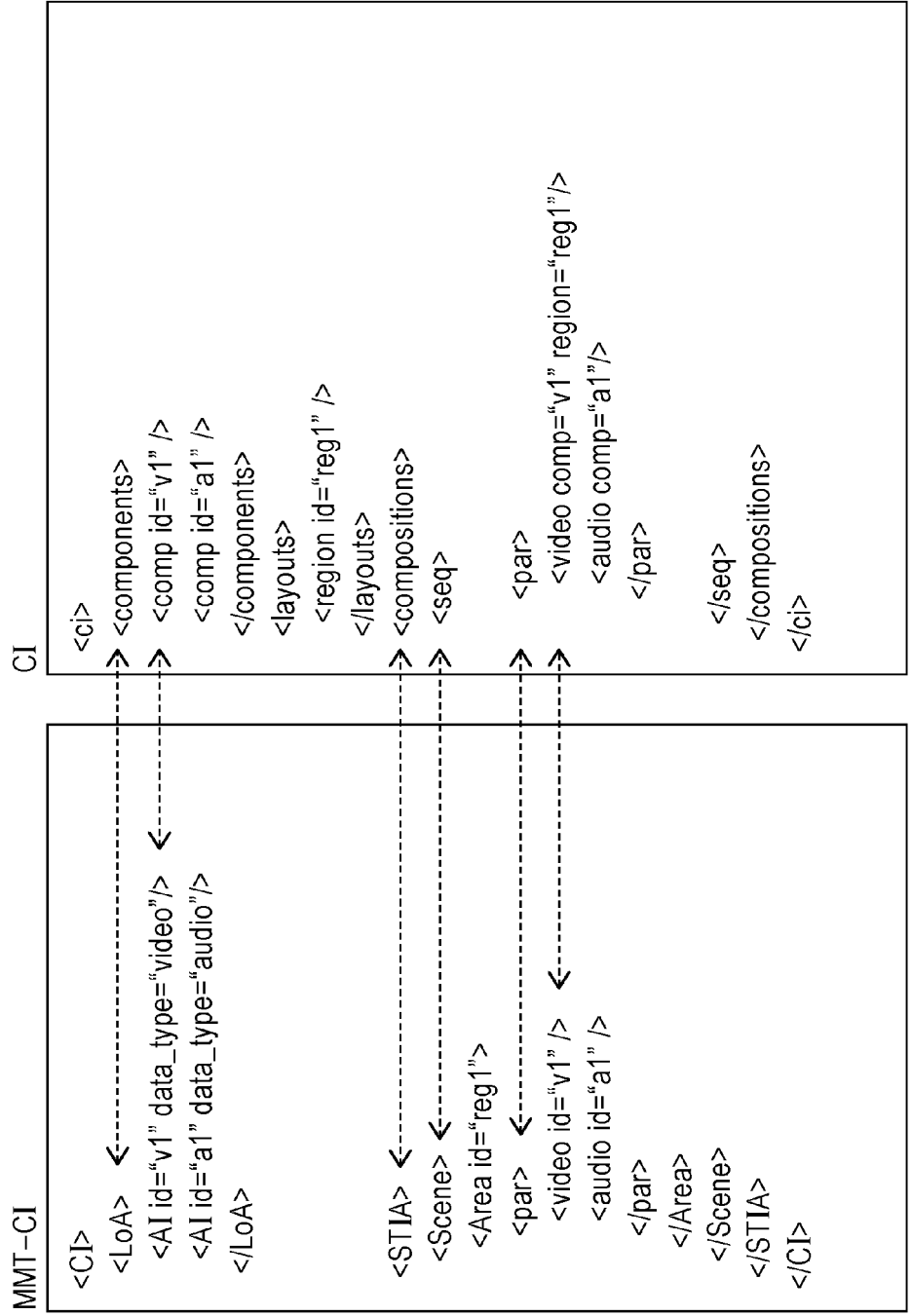
FIG. 33 is a diagram illustrating a comparison between composition information (CI) and MMT-CI used by the content transmission/reception system according to each embodiment of the present invention.

A correspondent relation between the composition information 25 and MMT-CI is illustrated in FIG. 33. A data structure of MMT-CI illustrated in FIG. 33 is temporary when the present specification has been filed.

As illustrated in FIG. 33, an LoA tag of MMT-CI corresponds to the components tag of the composition information 25 and an AI tag of MMT-CI corresponds to the comp tag of the composition information 25. An STIA tag of MMT-CI corresponds to the compositions tag of the composition information 25. A par tag, a video tag, and an audio tag of MMT-CI correspond to the par tag, the video tag, and the audio tag of the composition information 25, respectively. A Scene tag of MMT-CI is similar to the seq tag of the composition information 25.

In the content transmission/reception system 300b (300c) according to the fourth or fifth embodiment, instead of including the control server 50 (50c), the main distribution server may include the distribution control unit 51 (51c) of the control server 50 (50c) and may store the distribution server information 52 in the server storage unit 11 of the main distribution server. That is, the main distribution server may be allowed to have the functions of the control server.

(Configuration 1 of the Present Invention)

As understood from the description of the foregoing second to fifth embodiments, the distribution device according to the present invention preferably includes: first generation means for generating updated metadata indicating an updatable portion from reproduction metadata including information specifying components in regard to each of the plurality of components included in content and information indicating a reproduction mode of the components; second generation means for generating update metadata including update information, which is used to update the updatable portion in the updated metadata and includes information specifying all or some of the plurality of components and information indicating a reproduction mode of all or some of the components, from the reproduction metadata; first distribution control means for distributing the updated metadata; and second distribution control means for distributing the update metadata.

(Configuration 2 of the Present Invention)

In the distribution device according to configuration 1, the second generation means preferably generates the plurality of pieces of update metadata which are different from each other. The second distribution control means preferably distributes the plurality of pieces of update metadata one by one.

(Configuration 3 of the Present Invention)

In the distribution device according to configuration 2, each of the update metadata generated by the second generation means preferably includes version information indicating a version of the update metadata. The second distribution control means preferably distributes the update metadata in a smaller order (older order) of the version indicated by the version information.

(Configuration 4 of the Present Invention)

In the distribution device according to configuration 2, each of the update metadata generated by the second generation means preferably includes information indicating the number of times the updated metadata is updated to use the update metadata. Based on the information of each of the update metadata, the second distribution control means preferably distributes the update metadata to be used earlier for the update of the updated metadata faster.

(Configuration 5 of the Present Invention)

In the distribution device according to configurations 1 to 4, one or both of the first generation means and the second generation means may not be included in the distribution device.

(Configuration 6 of the Present Invention)

The present invention can also be realized as a distribution system that includes a first distribution device including first distribution control means and a second distribution device including second distribution control means (any second distribution control means among the second distribution control means included in the distribution device according to configurations 1 to 4).

(Configuration 7 of the Present Invention)

A reproduction device according to the present invention includes acquisition means for acquiring updated metadata and update metadata distributed from the distribution device according to configurations 1 to 5 or the distribution system according to configuration 6; and update means for updating the updateable portion in the update metadata using the update metadata in the update metadata.

(Configuration 8 of the Present Invention)

In the reproduction device according to configuration 7, the acquisition means is preferably configured to acquire the plurality of pieces of update metadata from the distribution device according to configuration 4. The update means preferably updates the updated metadata using the update metadata including information indicating that i ranging from 1 to N (where N is any integer) is used at the time of the update of an i-th updated metadata and at the time of the update of an i-th updated metadata.

(Configuration 9 of the Present Invention)

In the reproduction device according to configuration 7, the acquisition means is preferably configured to acquire the plurality of pieces of update metadata from the distribution device according to configuration 3. When the update metadata is previously used to update the updated metadata, the update means preferably updates the updated metadata using only the update metadata with a newer version than the version of the update metadata based on the version information.

<<Configuration Example of Software>>

Finally, each block of the distribution server 1, the main distribution server 100 (100', 100a, and 100c), the sub-distribution server 110 (110', 110a, and 110c), the reproduction client 2 (2' and 2c), and the control server (50 and 50c), particularly, the server control unit 10 and the client control unit 20, may be realized in a hardware manner by a logic circuit formed on an integrated circuit (IC chip) or may be realized in a software manner using a CPU (Central Processing Unit).

In the latter case, each server and each client include a CPU that executes a command of a program realizing each function, a ROM (Read-Only Memory) that stores the program, a RAM (Random Access Memory) that loads the program, and a storage device (recording medium) such as a memory that stores the program and various kinds of data. An object of the present invention can also be achieved by providing a recording medium that records program codes (an execution format program, an intermediate code program, and a source program) of control programs of each server and each client, which are software realizing the above-described functions to the distribution server 1 and the reproduction client 2, to be readable by a computer, and reading and executing the program codes recorded on the recording medium by the computer (or a CPU or an MPU).

As the recording medium, for example, kinds of tapes such as magnetic tapes or cassette tapes, kinds of discs including magnetic disks such as floppy (registered trademark) disks/hard disks and optical discs such as CD-ROM/MO/MD/DVD/CD-R, kinds of cards such as IC cards (including memory cards)/optical cards, kinds of semiconductor memories such as mask ROM/EPROM/EEPROM (registered trademark)/flash ROM, and kinds of logic circuits such as PLD (Programmable logic device) or FPGA (Field Programmable Gate Array) are available.

Since each server and each client are configured to be connected to the communication network, the program codes may be supplied via the communication network. The communication network may be able to transmit the program codes and is not particularly limited. For example, the Internet, an intra-net, an extra-net, a LAN, an ISDN, a VAN, a CATV communication network, a virtual private network, a telephone circuit network, a mobile communication network, a satellite communication network, and the like are available. A transmission medium included in the communication network may also be a medium capable of transmitting the program codes and is not particularly limited to a specific configuration or a specific kind of medium. For example, a wired medium such as an IEE1394, a USB, a power-line carrier, a cable TV circuit, a telephone line, and an ADSL (Asymmetric Digital Subscriber Line) circuit is also available and a wireless medium such as an infrared ray of IrDA, remote control, or the like, Bluetooth (registered trademark), IEEE802.11 wireless, HDR (High Data Rate), NFC (Near Field Communication), DLNA (Digital Living Network Alliance), a mobile telephone network, a satellite circuit, and a terrestrial digital network is also available. The present invention can also be realized in a form of a computer data signal in which the program codes are embodied in an electronic transmission manner and are embedded in carrier waves.

(Supplements of the Present Invention)

According to the foregoing configuration, the part of the information included in the acquired composition information is rewritten in the reference format in the reference format composition information, but the information rewritten in the reference format is included in the reference destination composition information. Therefore, by acquiring the reference format composition information and the reference destination composition information, it is possible to reproduce the content as in the case in which the acquired composition information is used.

The composition information generation means desirably rewrites at least one of the information specifying the component and the information indicating the reproduction mode in the reference format among the information included in the composition information acquired by the acquisition means to generate the reference format composition information. The distribution control means preferably distributes the reference format composition information at a lower frequency than distributing the reference destination composition information.

In the foregoing configuration, at least one of the information specifying the components included in the content and the information indicating the reproduction mode of the components is rewritten in the reference format among the information included in the acquired composition information to generate the reference format composition information. The reference format composition information is distributed at a lower frequency than distributing the reference destination composition information.

Here, the change frequency of the components included in the content or the reproduction mode is generally high. Therefore, the update frequency of the reference format composition information in which the components included in the content or the reproduction mode is set in the reference format among the information included in the acquired composition information is considered to be higher than that of the reference destination composition information.

That is, in the foregoing configuration, by decreasing the distribution frequency of the reference format composition information of which the change frequency is expected to be relatively low, the amount of distributed data is reduced. Further, by increasing the distribution frequency of the reference destination composition information of which the change frequency is expected to be relatively higher than that of the reference format composition information, it is possible reflect the change of a partial composition for a short time.

The composition information generation means desirably rewrites information regarding the component with relatively high significance and information regarding the component with relatively low significance in the reference format among the information included in the composition information acquired by the acquisition means to generate the reference format composition information and to generate reference destination composition information including the information regarding the component with the relatively high significance and sub-reference destination composition information including the information with the relatively low significance. The distribution control means preferably distributes the sub-reference destination composition information at a lower frequency than distributing the reference destination composition information.

In the foregoing configuration, the information regarding the component with relatively high significance and the information regarding the component with relatively low significance among the information included in the acquired composition information is rewritten in the reference format to generate the reference format composition information.

Further, the reference destination composition information including the information regarding the component with the relatively high significance and the sub-reference destination composition information including the information regarding the component with the relatively low significance are generated. The sub-reference destination composition information is distributed at the lower frequency than the reference destination composition information being distributed.

Here, the reference destination composition information including the information regarding the component with the relatively high significance is preferably distributed at as high a frequency as possible to shorten a period until start of the reproduction of the component. Conversely, it is considered that a problem occurs less even when the distribution frequency of the sub-reference destination composition information including the information regarding the component with the relatively low significance is low.

That is, in the foregoing configuration, the amount of distributed data is reduced by concurrently using the reference destination composition information and the sub-reference destination composition information and decreasing the distribution frequency of the sub-reference destination composition information for which it is considered that a problem occurs less even when the distribution frequency is decreased. Further, by increasing the distribution frequency of the reference destination composition information which is preferably distributed at a higher frequency than the sub-reference destination composition information being distributed, it is possible to quickly reproduce the component highly required to be promptly reproduced or essentially reproduced.

The component with the relatively high significance refers to, for example, a component highly required to be promptly reproduced or a component to be essentially reproduced. Further, the component with the relatively low significance refers to, for example, a component less required to be promptly reproduced or a component to be optionally reproduced.

For example, when content includes a video component, an audio component, and a text component superimposed on video, the video component and the audio component become the components highly required to be promptly reproduced.

The component highly required to be promptly reproduced can be determined based on attribute information indicating an attribute (video, audio, text, or the like) of the component. Further, an attribute used to set the component as the component highly required to be promptly reproduced may be determined in advance. The component to be essentially reproduced and the component to be optionally reproduced can be determined based on the reproduction mode of the component in the acquired composition information.

The distribution control means preferably describes information indicating that the reference format composition information is stored in a header of a payload storing the reference format composition information and preferably describes information indicating that the reference destination composition information is stored in a header of a payload storing the reference destination composition information.

In the foregoing configuration, the information indicating that the reference format composition information is stored is described in the header of the payload storing the reference format composition information and the information indicating that the reference destination composition information is stored is described in the header of the payload storing the reference destination composition information.

Thus, in the reproduction device receiving the payload, the payload storing the reference format composition information and the reference destination composition information can be specified by referring to the header of the payload without analysis of the information stored in the payload. That is, in the foregoing configuration, the reproduction device can be allowed to easily acquire the reference format composition information and the reference destination composition information.

The composition information generation means preferably generates the reference destination composition information including information referred to with the reference format composition information and generates alternative reference destination composition information including information referred to with the reference format composition information and different from the information included in the reference destination composition information among the information included in the composition information acquired by the acquisition means. The distribution control means preferably distributes the reference destination composition information and the alternative reference destination composition information at different timings.

In the foregoing configuration, the reference destination composition information including the information referred to with the reference format composition information is generated and the alternative reference destination composition information including information referred to with the reference format composition information and different from the information included in the reference destination composition information among the information included in the acquired composition information is generated. The reference destination composition information and the alternative reference destination composition information are distributed at the different timings.

Accordingly, when the reproduction device receives the reference destination composition information, the reproduction device reproduces the content referring to the reference destination composition information with the reference format composition information. When the reproduction device receives the alternative reference destination composition information, the reproduction device reproduces the content referring to the alternative reference destination composition information with the reference format composition information.

In the foregoing configuration, it is possible to change the reproduction mode (the use components and the reproduction mode of each component) of the content in the reproduction device without changing the reference format composition information.

The distribution control means preferably distributes the alternative reference destination composition information along with the component to be reproduced using the information included in the alternative reference destination composition information.

In the foregoing configuration, since the alternative reference destination composition information is distributed along with the component to be reproduced using the information included in the alternative reference destination composition information, the component can be reproduced smoothly. Further, it is possible to expect the advantage that the component to be reproduced using the information included in the alternative reference destination composition information is prevented from being erroneously reproduced using the information included in the reference destination composition information.

In the foregoing configuration, when it is necessary to change the composition of the content abruptly (emergency alert broadcast), the content can be quickly changed by distributing the alternative reference information describing the change destination component and the reproduction mode along with the change destination component. When the composition information is distributed on demand, the distribution of the component and the distribution of the composition information are asynchronous. Thus, it is difficult to handle the abrupt change in the composition.

The reference destination composition information preferably includes information indicating the reproduction mode of the components and the alternative reference destination composition information includes information indicating a reproduction mode different from the reference destination composition information. The distribution control means preferably distributes the reference destination composition information, and then distributes the alternative reference destination composition information at a timing at which the reproduction mode of the components is changed.

In the foregoing configuration, the reference destination composition information includes the information indicating the reproduction mode of the components and the alternative reference destination composition information includes the information indicating the reproduction mode different from the reference destination composition information. The reference destination composition information is distributed, and then the alternative reference destination composition information is distributed at the timing at which the reproduction mode of the components is changed.

Accordingly, the reproduction mode (the use components and the reproduction mode of each component) of the content in the reproduction device can be changed at the predetermined timing without the change in the reference format composition information.

The plurality of components preferably include the components of which reproduction periods are different. The composition information generation means preferably generates the reference destination composition information including information regarding the component to be reproduced during one of the reproduction periods and preferably generates the alternative reference destination composition information including information regarding the component to be reproduced during another reproduction period. The distribution control means preferably distributes the reference destination composition information or the alternative reference destination composition information according to the reproduction period.

In the foregoing configuration, the plurality of components included in the content include the components of which reproduction periods are different. The reference destination composition information including information regarding the component to be reproduced during one of the reproduction periods is generated and the alternative reference destination composition information including information regarding the component to be reproduced during another reproduction period is generated. The reference destination composition information or the alternative reference destination composition information is distributed according to the reproduction period.

Accordingly, since the information which can never be used in a certain reproduction period is not distributed during the reproduction period, it is possible to considerably reduce the amount of distributed data. The information regarding the component refers to information necessary to reproduce the component and is, for example, information specifying the component and the information indicating the reproduction mode.

The distribution control means preferably describes information indicating that the alternative reference destination composition information is stored in a header of a payload storing the alternative reference destination composition information.

In the foregoing configuration, the information indicating that the alternative reference destination composition information is stored is described in the header of the payload storing the alternative reference destination composition information. Thus, in the reproduction device receiving the payload, it can be specified that the alternative reference destination composition information is received by referring to the header of the payload without analysis of the information stored in the payload.

That is, in the foregoing configuration, the reproduction device can be allowed to easily recognize that the alternative reference destination composition information is received, and thus the reproduction can be started smoothly referring to the alternative reference destination composition information.

The composition information generation means preferably generates the reference format composition information including acquisition destination information indicating an acquisition destination of the reference destination composition information.

In the foregoing configuration, since the reference format composition information including the acquisition destination information indicating the acquisition destination of the reference destination composition information is generated, the reproduction device receiving the reference format composition information can access the acquisition destination indicated by the acquisition destination information to acquire the reference destination composition information promptly.

In the foregoing configuration, by waiting to receive the reference destination composition information, it is possible to prevent the start of the reproduction from being delayed.

The distribution control means preferably distributes the reference destination composition information using a transmission path different from a transmission path along which the reference format composition information is distributed.

In the foregoing configuration, since the reference destination composition information is distributed using the transmission path different from a transmission path along which the reference format composition information is distributed, it is possible to reduce the amount of data transmitted along each transmission path more than when the acquired composition information is directly distributed.

The composition information generation means preferably sets information for reproducing the component to be optionally reproduced in the reference format among the plurality of components to generate the reference format composition information including information for reproducing the component to be essentially reproduced and to generate the reference destination composition information including the information for reproducing the component to be optionally reproduced. The distribution control means preferably distributes the reference format composition information along with the component to be essentially reproduced and distributes the reference destination composition information along with the component to be optionally reproduced.

In the foregoing configuration, the information for reproducing the component to be optionally reproduced among the plurality of components is set in the reference format to generate the reference format composition information including information for reproducing the component to be essentially reproduced and to generate the reference destination composition information including the information for reproducing the component to be optionally reproduced. The reference format composition information is distributed along with the component to be essentially reproduced and the reference destination composition information is distributed along with the component to be optionally reproduced. The transmission paths used for the distribution are mutually different.

Accordingly, when the reproduction device does not reproduce the component to be optionally reproduced, the reproduction device can start to reproduce the component to be essentially reproduced by receiving the component to be essentially reproduced and the reference format composition information distributed using one transmission path.

That is, in the foregoing configuration, the reproduction device receiving no reference destination composition information can be allowed to start to reproduce the component to be essentially reproduced. Further, when the component to be essentially reproduced is reproduced, it is not necessary to use the transmission path along which the component to be optionally reproduced and the reference destination composition information are distributed. Therefore, it is also possible to considerably reduce resources of the transmission path to be used.

The acquisition means preferably acquires first composition information corresponding to first content and second composition information corresponding to second content. The composition information generation means preferably rewrites at least a part of information commonly included in the first composition information and the second composition information acquired by the acquisition means in the reference format to generate first reference format composition information corresponding to the first composition information and second reference format composition information corresponding to the second composition information and to generate the reference destination composition information including the information commonly included in the first composition information and the second composition information.

In the foregoing configuration, the first composition information corresponding to the first content and the second composition information corresponding to the second content are acquired. At least a part of information commonly included in the acquired first composition information and the acquired second composition information is rewritten in the reference format to generate the first reference format composition information corresponding to the first composition information and the second reference format composition information corresponding to the second composition information. Further, the reference destination composition information including the information commonly included in the first composition information and the second composition information is generated.

Thus, since the reference destination composition information is common to the first reference format composition information and the second reference format composition information, it is possible to reduce the amount of distributed data more than when the first composition information and the second composition information are distributed.

In the case of a reproduction device reproducing the content using the reference format composition information and the reference destination composition information distributed by the foregoing distribution device, it is possible to realize the reproduction based on the efficiently distributed reference format composition information and reference destination composition information.

In the foregoing data structure, information indicating that the reference format composition information is stored is preferably described in a header of a payload storing the reference format composition information. Information indicating that the reference destination composition information is stored is preferably described in a header of a payload storing the reference destination composition information.

Thus, in the reproduction device receiving the payload, the payload storing the reference format composition information and the reference destination composition information can be specified referring to the header without analysis of the information stored in the payload. That is, in the foregoing configuration, the reproduction device can be allowed to easily acquire the reference format composition information and the reference destination composition information.

In the foregoing data structure, the composition information preferably further includes alternative reference destination composition information including information referred to with the reference format composition information and different from the information included in the reference destination composition information. Information indicating that the alternative reference destination composition information is stored is preferably described in a header of a payload storing the alternative reference destination composition information.

In the foregoing configuration, the reproduction device can be allowed to easily recognize that the alternative reference destination composition information is received, and thus the reproduction can be started smoothly referring to the alternative reference destination composition information.

INDUSTRIAL APPLICABILITY

The present invention can be used, for example, to distribute content including a plurality of components.

REFERENCE SIGNS LIST

1 DISTRIBUTION SERVER (DISTRIBUTION DEVICE)
14 COMPOSITION INFORMATION ANALYSIS UNIT (ACQUISITION MEANS)
15 COMPOSITION INFORMATION GENERATION UNIT (COMPOSITION INFORMATION GENERATION MEANS)
16 DISTRIBUTION CONTROL UNIT (DISTRIBUTION CONTROL MEANS)
17 COMPOSITION INFORMATION
17a COMPOSITION INFORMATION (UPDATED METADATA)
17b COMPOSITION INFORMATION (UPDATING METADATA)
25 COMPOSITION INFORMATION (UPDATED METADATA)
18 CONTENT
19 CONFIGURATION INFORMATION
2 REPRODUCTION CLIENT (REPRODUCTION DEVICE)
22 CLIENT COMMUNICATION UNIT (ACQUISITION MEANS)
23 REPRODUCTION CONTROL UNIT (ACQUISITION MEANS, UPDATE MEANS)

50 CONTROL SERVER (DISTRIBUTION DEVICE)
51 DISTRIBUTION CONTROL UNIT (FIRST GENERATION MEANS, SECOND GENERATION MEANS, FIRST DISTRIBUTION CONTROL MEANS, SECOND DISTRIBUTION CONTROL MEANS)
53 COMPOSITION INFORMATION (REPRODUCTION METADATA)
100 MAIN DISTRIBUTION SERVER (FIRST DISTRIBUTION DEVICE)
100' MAIN DISTRIBUTION SERVER (DISTRIBUTION DEVICE)
100c MAIN DISTRIBUTION SERVER (DISTRIBUTION DEVICE)
110 SUB-DISTRIBUTION SERVER (SECOND DISTRIBUTION DEVICE)
110c SUB-DISTRIBUTION SERVER (DISTRIBUTION DEVICE, SECOND DISTRIBUTION DEVICE)
101b DISTRIBUTION CONTROL UNIT (FIRST DISTRIBUTION CONTROL MEANS, SECOND DISTRIBUTION CONTROL MEANS)
111b DISTRIBUTION CONTROL UNIT (SECOND DISTRIBUTION CONTROL MEANS)
111bc DISTRIBUTION CONTROL UNIT (FIRST DISTRIBUTION CONTROL MEANS, SECOND DISTRIBUTION CONTROL MEANS)

The invention claimed is:

1. A distribution device comprising:
acquisition circuitry that acquires composition information containing at least one component information specifying each of a plurality of components included in content;
partial composition information generation circuitry that generates more than one partial composition information as a portion of the composition information including one main partial composition information and at least one sub partial composition information; and
distribution control circuitry that distributes the partial composition information, wherein
the main partial composition information is meta data containing:
  first component information specifying each of a plurality of components included in the content,
  first order information indicating a processing order of the main partial composition information, and
  first version information indicating a version of the main partial composition information and used to update the main partial composition information,
the at least one sub partial composition information is meta data containing:
  second component information specifying each of a plurality of components included in the content,
  second order information indicating a processing order of the at least one sub partial composition information, and
  second version information indicating a version of the at least one sub partial composition information and used to update the at least one sub partial composition information, and
  in a case where the at least one sub partial composition information is updated with a first value of the version, other sub partial composition information with a second value of the version smaller than the first value of the version is not used to update the at least one sub partial composition information.

2. The distribution device according to claim 1, wherein an identifier of the partial composition information is stored in a header of a data format and in the partial composition information.

3. A reproduction device that reproduces the content using reference format composition information and reference destination composition information distributed by the distribution device according to claim 1.

4. A distribution method, comprising:
acquiring composition information containing at least one component information specifying each of a plurality of components included in content;
generating more than one partial composition information as a portion of the information including one main partial composition information and at least one sub partial composition information; and
distributing the partial composition information, wherein
the main partial composition information is meta data containing:
  first component information specifying each of a plurality of components included in the content,
  first order information indicating a processing order of the main partial composition information, and
  first version information indicating a version of the main partial composition information and used to update the main partial composition information,
the at least one sub partial composition information is meta data containing:
  second component information specifying each of a plurality of components included in the content,
  second order information indicating a processing order of the at least one sub partial composition information, and
  second version information indicating a version of the at least one sub partial composition information and used to update the at least one sub partial composition information, and
  in a case where the at least one sub partial composition information is updated with a first value of the version, other sub partial composition information with a second value of the version smaller than the first value of the version is not used to update the at least one sub partial composition information.

5. A non-transitory computer-readable medium including a computer program causing a computer to perform the distribution method of claim 4 when the computer program is executed by the computer.

* * * * *